United States Patent
Ichino et al.

(10) Patent No.: US 10,975,223 B2
(45) Date of Patent: *Apr. 13, 2021

(54) RESIN COMPOSITION AND USE THEREOF

(71) Applicant: MITSUI CHEMICALS, INC., Tokyo (JP)

(72) Inventors: Kotaro Ichino, Ichihara (JP); Yoshiharu Kikuchi, Ichihara (JP); Mitsunao Arino, Ichihara (JP); Mikio Hosoya, Ichihara (JP); Keisuke Shishido, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/558,987

(22) PCT Filed: Mar. 24, 2016

(86) PCT No.: PCT/JP2016/059364
§ 371 (c)(1),
(2) Date: Sep. 15, 2017

(87) PCT Pub. No.: WO2016/158661
PCT Pub. Date: Oct. 6, 2016

(65) Prior Publication Data
US 2018/0244896 A1   Aug. 30, 2018

(30) Foreign Application Priority Data

Mar. 31, 2015 (JP) .............................. JP2015-072198
Mar. 31, 2015 (JP) .............................. JP2015-072199
(Continued)

(51) Int. Cl.
*C08K 5/14* (2006.01)
*C08L 23/16* (2006.01)
(Continued)

(52) U.S. Cl.
CPC .............. *C08K 5/14* (2013.01); *C08F 210/18* (2013.01); *C08K 3/04* (2013.01); *C08L 23/16* (2013.01);
(Continued)

(58) Field of Classification Search
CPC . C08K 5/14; C08K 3/04; C08F 210/18; C08F 2420/02; C08F 4/65912;
(Continued)

(56) References Cited

U.S. PATENT DOCUMENTS 4,938,910 A * 7/1990 Abe ........................ B29C 33/40
156/195
4,990,640 A   2/1991 Tsutsui et al.
(Continued)

FOREIGN PATENT DOCUMENTS

EP   0 427 696 A2   5/1991
EP   0 427 697 A2   5/1991
(Continued)

OTHER PUBLICATIONS

Extended European Search Report dated Nov. 19, 2018 in corresponding application No. 16772542.3.
(Continued)

*Primary Examiner* — Rachel Kahn
*Assistant Examiner* — Ha S Nguyen
(74) *Attorney, Agent, or Firm* — Foley & Lardner LLP

(57) ABSTRACT

[Means for solving problem] The resin composition of the present invention comprises 100 parts by mass of a specific ethylene/α-olefin/non-conjugated polyene copolymer (A) and 0.1 to 5 parts by mass of a peroxide (B), and the copolymer (A) comprises structural units derived from ethylene (a1), an α-olefin (a2) having 3 to 20 carbon atoms, and a non-conjugated polyene (a3) including intramolecularly
(Continued)

two or more partial structures in total selected from the group consisting of structures represented by the following formulae (I) and (II),

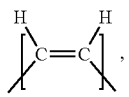
(I)

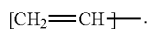

(II)

[Effect] The resin composition of the present invention is excellent in crosslinking properties and the resin composition and its crosslinked shaped article of the present invention can be used, without any limitation, in various applications known as applications of rubber composition, and can be suitably used, for example, for interior and exterior parts for automobiles and applications requiring heat resistance.

41 Claims, 1 Drawing Sheet

(30) Foreign Application Priority Data

Mar. 31, 2015 (JP) .............................. JP2015-072200
Mar. 31, 2015 (JP) .............................. JP2015-072201

(51) Int. Cl.
| | |
|---|---|
| *C08F 210/18* | (2006.01) |
| *C09K 3/10* | (2006.01) |
| *C08K 3/04* | (2006.01) |
| *F16L 11/04* | (2006.01) |
| *C08F 4/6592* | (2006.01) |
| *C08F 4/659* | (2006.01) |
| *B60S 1/38* | (2006.01) |
| *F02M 35/10* | (2006.01) |
| *F16J 15/02* | (2006.01) |

(52) U.S. Cl.
CPC ................ *C09K 3/10* (2013.01); *F16L 11/04* (2013.01); *B60S 1/38* (2013.01); *B60S 2001/3829* (2013.01); *C08F 4/6592* (2013.01); *C08F 4/65908* (2013.01); *C08F 4/65912* (2013.01); *C08F 4/65927* (2013.01); *C08F 2420/02* (2013.01); *C09K 2200/0642* (2013.01); *F02M 35/10137* (2013.01); *F16J 15/022* (2013.01)

(58) Field of Classification Search
CPC ................ C08F 4/6592; C08F 4/65927; C08F 4/65908; C09K 3/10; C09K 2200/0642; F16L 11/04; C08L 23/16; B60S 2001/3829; B60S 1/38; F16J 15/022; F02M 35/10137
See application file for complete search history.

(56) References Cited

U.S. PATENT DOCUMENTS

| | | | |
|---|---|---|---|
| 5,155,080 A | 10/1992 | Elder et al. | |
| 5,321,106 A | 6/1994 | Lapointe | |
| 5,387,568 A | 2/1995 | Ewen et al. | |
| 5,519,100 A | 5/1996 | Ewen et al. | |
| 5,614,457 A | 3/1997 | Ewen et al. | |
| 5,663,249 A | 9/1997 | Ewen et al. | |
| 5,883,202 A | 3/1999 | Ewen et al. | |
| 6,047,740 A * | 4/2000 | Ikeda | C08K 3/22 138/177 |
| 6,939,928 B1 | 9/2005 | Kawai et al. | |
| 2005/0228155 A1 | 10/2005 | Kawai et al. | |
| 2006/0161013 A1 | 7/2006 | Tohi et al. | |
| 2006/0270812 A1 | 11/2006 | Tohi et al. | |
| 2007/0004854 A1 | 1/2007 | Wu et al. | |
| 2007/0004855 A1 | 1/2007 | Wu et al. | |
| 2008/0220193 A1 | 9/2008 | Tohi et al. | |
| 2009/0239014 A1* | 9/2009 | Noguchi | C08K 3/22 428/36.8 |
| 2010/0004393 A1 | 1/2010 | Ikenaga et al. | |
| 2014/0088214 A1* | 3/2014 | Okamoto | C08F 210/06 521/140 |
| 2016/0280819 A1 | 9/2016 | Tohi et al. | |

FOREIGN PATENT DOCUMENTS

| | | | |
|---|---|---|---|
| EP | 0 765 908 A1 | 4/1997 | |
| EP | 3 106 481 A1 | 12/2016 | |
| JP | H01-501950 A | 7/1989 | |
| JP | H01-502036 A | 7/1989 | |
| JP | H02-078687 A | 3/1990 | |
| JP | H03-179005 A | 8/1991 | |
| JP | H03-179006 A | 8/1991 | |
| JP | H03-207703 A | 9/1991 | |
| JP | H03-207704 A | 9/1991 | |
| JP | H09-207143 | 8/1997 | |
| JP | H10-100161 | 4/1998 | |
| JP | H10-237241 | 9/1998 | |
| JP | H11-021395 | 1/1999 | |
| JP | 2000080224 A * | 3/2000 | |
| JP | 2000-212194 A | 8/2000 | |
| JP | 2002-012194 | 8/2000 | |
| JP | 2000-239465 | 9/2000 | |
| JP | 2001-151038 | 6/2001 | |
| JP | 2003-277558 | 10/2003 | |
| JP | 2004-168744 A | 6/2004 | |
| JP | 2004-175759 A | 6/2004 | |
| JP | 2004-256803 | 9/2004 | |
| JP | 2005-319775 | 11/2005 | |
| JP | 2008-254697 | 10/2008 | |
| JP | 2009-500473 | 1/2009 | |
| JP | 2012-131959 | 7/2012 | |
| JP | 2013-221580 | 10/2013 | |
| JP | 2014-051562 | 3/2014 | |
| WO | WO-88/05792 A1 | 8/1988 | |
| WO | WO-88/05793 A1 | 8/1988 | |
| WO | WO-01/27124 A1 | 4/2001 | |
| WO | WO-2005/100410 A1 | 10/2005 | |
| WO | WO-2006/123759 A1 | 11/2006 | |
| WO | WO-2008/026628 | 3/2008 | |
| WO | WO-2012/157709 | 11/2012 | |
| WO | WO-2012157709 A1 * | 11/2012 | ............ C08F 210/06 |
| WO | WO-2013/137231 A1 | 9/2013 | |

OTHER PUBLICATIONS

Journal of Organometallic Chemistry 63,509 (1996). The synthesis, characterization and polymerization behavior of ansa cyclopentadienyl fluorenyl complexes; the X-ray structures of the complexes.
International Search Report and Written Opinion, PCT/JP2016/059364, Mitsui Chemicals, Inc., Jun. 21, 2016.

* cited by examiner

[FIG. 1]
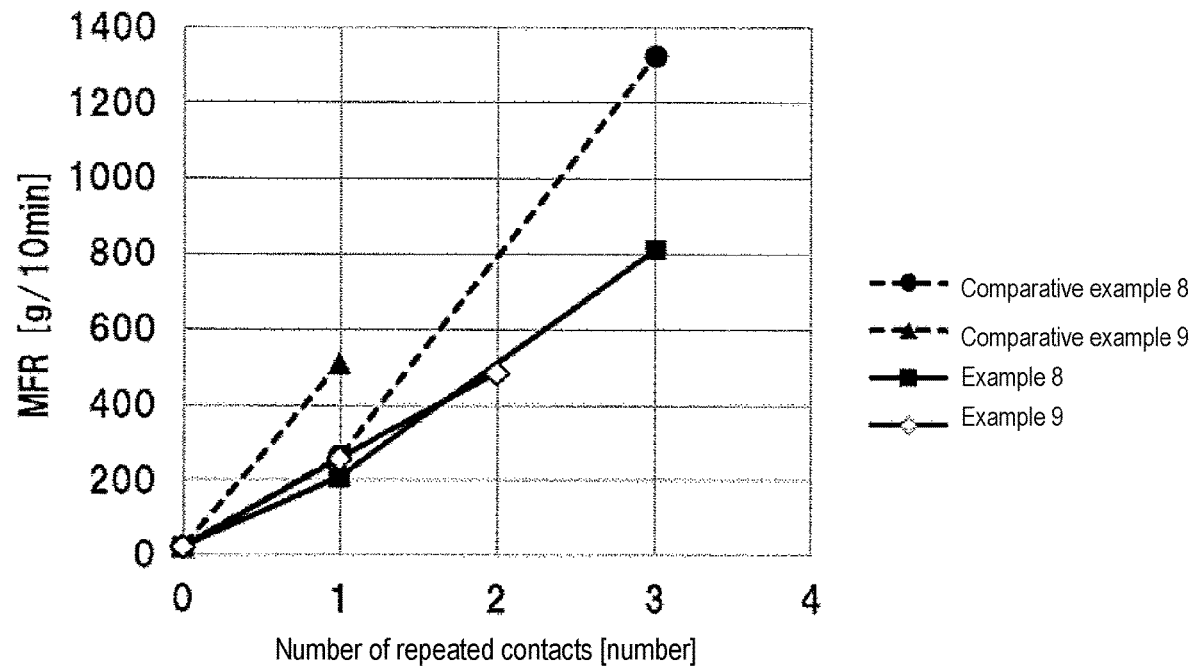
[FIG. 2]
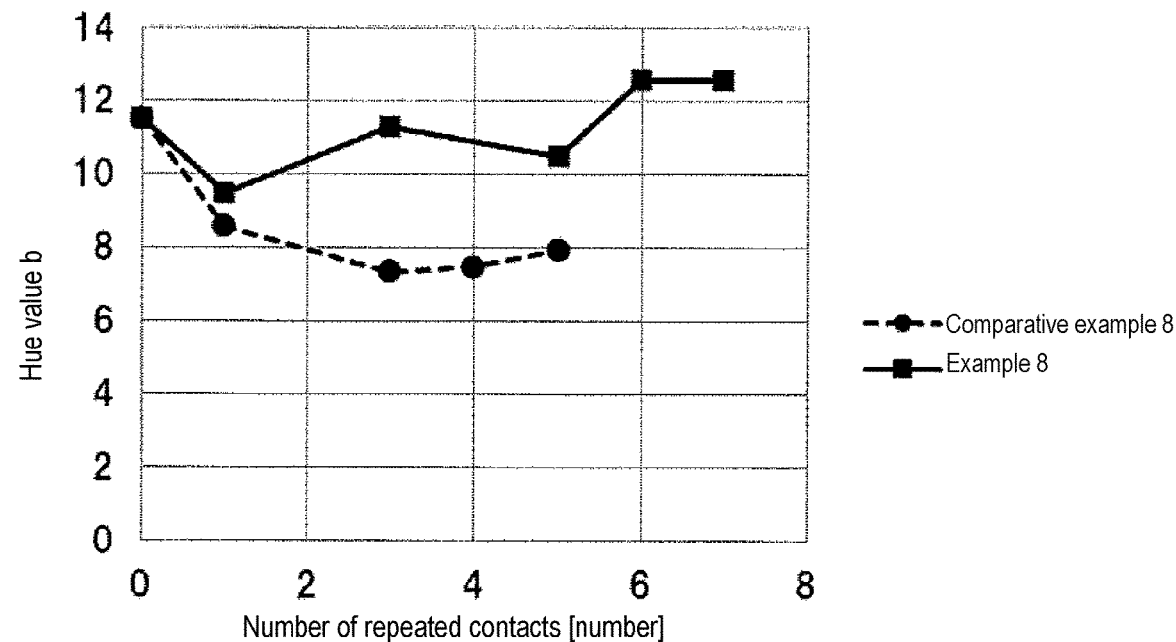

RESIN COMPOSITION AND USE THEREOF

CROSS-REFERENCE TO RELATED APPLICATIONS

This application claims priority under 35 U.S.C. § 371 to International Patent Application No. PCT/JP2016/059364, filed Mar. 24, 2016, which claims priority to Japanese Patent Application No. 2015/072198, filed Mar. 31, 2015, Japanese Patent Application No. 2015/072199, filed Mar. 31, 2015, Japanese Patent Application No. 2015/072200, filed Mar. 31, 2015, and Japanese Patent Application No. 2015/072201, filed Mar. 31, 2015, the entire contents of each of which are incorporated herein by reference.

TECHNICAL FIELD

The present invention relates to a resin composition containing an ethylene/α-olefin/non-conjugated polyene copolymer and a use thereof.

Specifically, the present invention relates to resin compositions containing an ethylene/α-olefin/non-conjugated polyene copolymer, including 1) a resin composition which enables producing a crosslinked shaped article excellent in heat resistance, 2) a resin composition which enables producing a crosslinked shaped article excellent in sealing properties, 3) a resin composition which enables producing a crosslinked shaped article excellent in fatigue resistance and impact resilience, and 4) a resin composition which enables producing a crosslinked shaped article having excellent mechanical strength and heat aging resistance by compounding a small amount of a crosslinking agent, and also relates to a crosslinked shaped article using the above resin compositions.

BACKGROUND ART

In various apparatuses such as automobiles, a material having elasticity and excellent heat resistance may be required, such as a hose used under high thermal conditions.

In recent years, engines for automobiles are increasingly downsized and equipped with a turbocharger for improving fuel efficiency. An engine with a turbocharger is configured so that air compressed by a compressor wheel is cooled by a charge air cooler and then sent to the engine, and the compressor wheel is connected to the charge air cooler by a rubber hose. This turbocharger hose is required to have high heat aging resistance because air at high pressure and high temperature (about 180° C.) flows therethrough. It is also required to have fatigue resistance to withstand continuous pressure oscillation caused by the passage of the air. In such an application, a material with high heat aging resistance such as acrylic rubber and silicone elastomer is currently adopted.

Patent Document 1 describes a composition containing an ethylene/alkyl acrylate copolymer and a cured product of the composition, which is a product of vulcanizate exhibiting improved impact fatigue resistance and heat resistance in comparison with conventional vulcanizates.

Patent Document 2 proposes a tube-engagement structure including an innermost rubber layer and an envelope rubber layer, the innermost layer being made of a fluorocarbon rubber to exhibit excellent heat resistance and fatigue resistance and protect the inner layer of tubes from cracking, and the envelope layer being made of a rubber such as silicone rubber, acrylic rubber, and ethylene/acrylic rubber.

Under such circumstances, a material excellent in not only heat resistance but also fatigue resistance has been desired to emerge.

In addition to the above properties, lamps for automobiles and motorbikes such as head lamps and fog lamps, and the display part of meters are desirably not cloudy. For this reason, materials for packing such as lamp seal packings (lamp seal rubber packings) used for lamps of automobiles and motorbikes and meter packings used for meters are required to have fogging resistance so as not to cloud lamps and glass.

Patent Document 3 proposes a sealing material for automobiles, which includes a hollow sealing portion and a base portion for attachment, both extrusion-molded integrally, the sealing portion being configured by a shaped article of shape memory rubber consisting of a vulcanizable rubber and a particulate resin material dispersed and compounded therein, and the document also describes the use of, as the resin material, a crystalline resin such as a homopolymer and a copolymer of α-olefin, and a resin such as polystyrene, ABS resin, acrylonitrile, and AAS resin, and the use of an ethylene/α-olefin/non-conjugated polyene copolymer rubber as the vulcanizable rubber. However, Patent Document 3 neither specifically describes a specific method of compounding and preparing the rubber shaped article, nor recognizes a problem involving fogging resistance.

The fogging phenomenon which clouds lamps of automobiles and motorcycles and glass in the display part of meters is caused by the reduction of light transmittance owing to the volatilization of a low volatile content compounded in rubber packings and the adhesion thereof to the surface of such lamps and glass. Examples of the causative substance of the fogging phenomenon include a decomposition product from a softening agent, a mold releasing agent, a vulcanizing agent, and a crosslinking agent, and a low volatile content such as an activator, compounded in a resin composition forming packings. Under a high temperature condition caused by the lighting of the lamp or by a usage environment of the meter, the fogging phenomenon is likely to occur owing to the volatilization of a larger amount of the low volatile content. The fogging phenomenon can be reduced unless a low volatile content such as a softening agent is compounded, but in this case, a problem may occur such as the deterioration of moldability, namely, the deterioration of mold fluidity during vulcanization molding and the difficulty in adjusting the hardness of resultant packings.

For this reason, a resin composition has been desired to emerge which enables producing a packing excellent in moldability and fogging resistance.

Patent Document 4 describes an article to be used for lamp seals or packings for meters, which article is a rubber composition crosslinked by organic peroxide, wherein the composition contains an ethylene/α-olefin copolymer rubber or an ethylene/α-olefin/non-conjugated polyene copolymer rubber, and a copolymerized liquid rubber as a synthetic softening agent containing no substance causative of fogging.

In addition to the above properties, rubber shaped articles used for wiper blades of vehicles, such as automobiles, motorbikes, trains, aircrafts, and ships are required to be excellent in heat aging resistance, weather resistance, and ozone resistance since they are always exposed to sunlight, wind, and rain. Further, they are required not to cause fatigue rupture under so-called dynamic conditions, particularly with violent vibration, and to have good reversibility (high impact resilience) for good wiping performance.

Patent Document 5 proposes a mechanical structure of a wiper blade which is useful for smoothly reversing the blade rubber at the turning points of the reciprocating wiper blade without reducing the wiping performance of the wiper blade.

However, the wiping performance and durability of wiper blades is greatly affected by characteristics of their blade rubber portion.

Conventionally, a material, such as natural rubber (NR), butadiene rubber (BR), and chloroprene rubber (CR) is used for constituting the blade rubber portion of wiper blades. In recent years, attempts have been made to use EPDM as a raw material for blade rubber from the viewpoint of its environmental resistance, but its fatigue resistance and impact resilience is insufficient and it has not yet been put into practical use.

Patent Document 6 describes that a rubber composition containing a specific ethylene/α-olefin/non-conjugated polyene copolymer rubber is suitable as a rubber composition for wiper blades, and a resultant rubber shaped article for wiper blades has a long service life time. Further, Patent Document 7 describes that a wiper blade including a polymer composition applied thereto containing an ethylene polymer having a specific particle size and a binder resin is excellent in both slidability and wiping property, and moreover, durability.

However, a wiper blade having more excellent fatigue resistance and impact resilience has been required.

Besides the above described wiper blade, various shaped hoses such as automobile radiator hoses and air hoses tend to be formed, in recent years, by using heat-resistant rubber materials, and peroxides are often used as crosslinking agents in many cases. These shaped hoses are often curved tubes in order to be arranged efficiently in an engine room.

Such curved tubes are produced, for example, by using a mandrel having a curved shape conformed to the shape of rubber hoses to be produced. The material of conventionally used mandrels has been exclusively metal (iron) (for example, Patent Documents 8 and 9), but mandrels made of a heat-resistant resin, especially mandrels made of TPX (polymethylpentene resin) (for example, Patent Documents 10 and 11) are also used from the viewpoint of weight reduction. Mandrels made of resin are not discarded immediately after they were used for forming a bent tube, and are used repeatedly.

DOCUMENTS OF RELATED ART

Patent Documents

Patent Document 1: JP-T-2009-500473
Patent Document 2: JP-A-2013-221580
Patent Document 3: JP-A-2001-151038
Patent Document 4: JP-A-2000-239465
Patent Document 5: JP-A-2008-254697
Patent Document 6: JP-A-2004-256803
Patent Document 7: JP-A-2012-131959
Patent Document 8: JP-A-2005-319775
Patent Document 9: JP-A-09-207143
Patent Document 10: JP-A-10-237241
Patent Document 11: JP-A-10-100161

SUMMARY OF THE INVENTION

Problems to be Solved by the Invention

An object of the present invention is to provide a resin composition which enables producing a crosslinked rubber excellent in not only heat aging resistance, but also fatigue resistance, and a crosslinked shaped article and a hose which are obtained by using the resin composition.

Another object of the present invention is to provide a resin composition which enables producing a packing excellent in formability and anti-fogging property, a sealing material using the resin composition, and a lamp seal packing or a packing for meters which are excellent in heat aging resistance and fogging resistance.

Still another object of the present invention is to provide a resin composition which enables producing a crosslinked shaped article excellent in fatigue resistance and impact resilience, a crosslinked shaped article obtained by using the resin composition, and a sliding member and a wiper blade which are excellent in fatigue resistance and impact resilience.

Conventionally used crosslinking agents, which are contained in non-crosslinked rubbers are mainly reactive organic-peroxide-based compounds. Therefore, a resin mandrel in repeated contacts with the non-crosslinked rubber causes the roughness (owing to oxidation deterioration) of its surface which is attributed to the migration of the crosslinking agent among others, necessitating frequent replacement of the mandrel. Accordingly, a crosslinked shaped article has been desired to emerge which enables reducing the oxidative deterioration of the mandrel surface and the frequency of replacing the mandrel, and can be suitably crosslinked by a small amount of a crosslinking agent so as to reduce resource consumption and waste generation, and which is excellent in mechanical strength and heat resistance.

The present invention has been made to solve such conventional problems and an object of the present invention is to provide a resin composition which enables producing suitably a crosslinked shaped article excellent in mechanical strength and heat aging resistance by compounding a small amount of a crosslinking agent, and to provide a crosslinked shaped article and rubber hoses which are obtained by using the resin composition.

Means for Solving the Problem

As a result of intensive studies under such circumstances, the present inventors have found that when a resin composition containing a specific ethylene/α-olefin/non-conjugated polyene copolymer is used, a crosslinked shaped article can be produced which has a heat aging resistance comparable to that of acrylic rubber and exhibits fatigue resistance higher than that of the acrylic rubber, and that even when a small amount of a crosslinking agent and a crosslinking aid are used or when no crosslinking aid is used, a crosslinked shaped article can be obtained which is more excellent in mechanical strength and heat aging resistance than ethylene/propylene copolymer conventionally used as a packing material, enabling a significant suppression of a fogging phenomenon caused by such as the crosslinking agent or the crosslinking aid, and further, that even when crosslinking densities are comparable, a crosslinked shaped article can be produced which is more excellent in fatigue resistance and impact resilience than that produced by using a resin composition containing a conventional ethylene/propylene terpolymer (EPT) obtained by using 5-ethylidene-2-norbornene (ENB) as a non-conjugated polyene (EPT), and still further, that even when a small amount of a crosslinking agent is compounded, a crosslinked shaped article can be suitably obtained which is superior to a crosslinked shaped article such as a rubber hose containing a conventional ethylene/α-olefin/non-conjugated polyene copolymer in terms of mechanical strength and heat aging resistance, and even still further, that when a crosslinked shaped article such as a rubber hose (in particular, a curved tube) is produced by using a resin mandrel, the resin composition of the present invention requires a small amount of crosslinking agent to be compounded, and therefore, the oxidation deterioration of the resin mandrel is small, enabling reducing the frequency of replacing the mandrel and reducing largely its environmental load, and thus, the present invention has been completed.

In other words, the present invention relates to the following items [1] to [41].

[1] A resin composition comprising
(A) 100 parts by mass of an ethylene/α-olefin/non-conjugated polyene copolymer and
(B) 0.1 to 5 parts by mass of organic peroxide,
wherein the ethylene/α-olefin/non-conjugated polyene copolymer (A) comprises structural units derived from ethylene (a1), an α-olefin (a2) having 3 to 20 carbon atoms, and a non-conjugated polyene (a3) comprising intramolecularly two or more partial structures in total selected from the group consisting of structures represented by the following general formulae (I) and (II),

[Chem. 1]

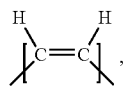 (I)

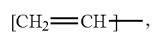 (II)

and satisfies the following requirements (i) to (v):
(i) a molar ratio of ethylene/α-olefin is from 40/60 to 99.9/0.1;
(ii) a weight fraction of the structural unit derived from the non-conjugated polyene (a3) is from 0.07% by weight to 10% by weight in 100% by weight of the ethylene/α-olefin/non-conjugated polyene copolymer;
(iii) a weight-average molecular weight (Mw) of the ethylene/α-olefin/non-conjugated polyene copolymer, a weight fraction of the structural unit derived from the non-conjugated polyene (a3) (weight fraction of (a3)), and a molecular weight of the non-conjugated polyene (a3) (molecular weight of (a3)) satisfy the following Formula (1), $$4.5 \leq Mw \times \text{weight fraction of } (a3)/100/(\text{molecular weight of } (a3)) \leq 40; \quad \text{Formula (1)}$$

(iv) a ratio P of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by ($\eta^*_{(\omega=0.1)}/\eta^*_{(\omega=100)}$), an intrinsic viscosity [η], and the weight fraction (weight fraction of (a3)) of the structural unit derived from the conjugated polyene (a3) satisfy the following Formula (2), $$P/([\eta]^{2.9}) \leq \text{weight fraction of } (a3) \times 6; \quad \text{Formula (2)}$$

and
(v) a number of long-chain branches per 1000 carbon atoms ($LCB_{1000C}$) and a natural logarithmic number of the weight-average molecular weight (Mw) represented by [Ln (Mw)], obtained using 3D-GPC, satisfy the following Formula (3), $$LCB_{1000C} \leq 1 - 0.07 \times Ln(Mw). \quad \text{Formula (3)}$$

[2] The resin composition according to [1], wherein the ethylene/α-olefin/non-conjugated polyene copolymer (A) has an intrinsic viscosity [η] of 1.0 to 4.0 dl/g which is measured in decalin at 135° C.

[3] The resin composition according to [1] or [2], wherein the non-conjugated polyene (a3) comprises 5-vinyl-2-norbornene (VNB).

[4] The resin composition according any one of [1] to [3], comprising
(C) 10 to 300 parts by mass of carbon black, and
(D) 0.5 to 5 parts by mass of antioxidant,
with respect to 100 parts by mass of the ethylene/α-olefin/non-conjugated polyene copolymer (A).

[5] The resin composition according to any one of [1] to [4], comprising
(E) a softening agent in an amount of less than 20 parts by mass, with respect to 100 parts by mass of the ethylene/α-olefin/non-conjugated polyene copolymer (A).

[6] The resin composition according to any one of [1] to [5], comprising
(F) a crosslinking aid in an amount of 0 to 4 parts by mass, with respect to 100 parts by mass of the ethylene/α-olefin/non-conjugated polyene copolymer (A).

[7] A crosslinked shaped article obtained by crosslinking the resin composition according to any one of [1] to [6].

[8] A process for producing a crosslinked shaped article comprising a step of crosslinking the resin composition according to any one of [1] to [6].

[9] A hose comprising a layer formed by crosslinking the resin composition according to any one of [1] to [6].

[10] The hose according to [9], which is used in any one of applications for an automobile, a motorbike, industrial machinery, construction machinery, and agricultural machinery.

[11] The hose according to [9], which is used for a turbocharger hose for an automobile.

[12] A process for producing a hose, comprising a step of shaping and crosslinking the resin composition according to any one of [1] to [6] to form a layer of a crosslinked shaped article.

[13] The resin composition according to [1] to [3], comprising
(G) 10 to 250 parts by mass of a white filler, except for silica, with respect to 100 parts by mass of the ethylene/α-olefin/non-conjugated polyene copolymer (A).

[14] The resin composition according to [13], comprising
(E) 0 to 40 parts by mass of a softening agent, with respect to 100 parts by mass of the ethylene/α-olefin/non-conjugated polyene copolymer (A).

[15] The resin composition according to any one of [13] or [14], comprising:
(D) 0 to 5 parts by mass of an antioxidant; and
(F) 0 to 4 parts by mass of a crosslinking aid,
with respect to 100 parts by mass of the ethylene/α-olefin/non-conjugated polyene copolymer (A).

[16] A crosslinked shaped article obtained by crosslinking the resin composition according to any one of [13] to [15].

[η] A process for producing a crosslinked shaped article, comprising a step of crosslinking the resin composition according to any one of [13] to [15].

[18] A sealing material using the crosslinked shaped article according to [16].

[19] The sealing material according to [18], which is used in any one of applications for an automobile, a motorbike, industrial machinery, construction machinery, and agricultural machinery.

[20] The sealing material according to [18] or [19], which is used for a lamp seal packing or a packing for a meter.

[21] The resin composition according to any one of [1] to [3], comprising:
(C) 10 to 300 parts by mass of a carbon black;
(E) 5 to 50 parts by mass of a softening agent; and
(F) 0.1 to 4 parts by mass of a crosslinking aid,
with respect to 100 parts by mass of the ethylene/α-olefin/non-conjugated polyene copolymer (A).

[22] The resin composition according to [21], containing (D) 0 to 5 parts by mass of an antioxidant,
with respect to 100 parts by mass of the ethylene/α-olefin/non-conjugated polyene copolymer (A).

[23] A crosslinked shaped article obtained by crosslinking the resin composition according to [21] or [22].

[24] A process for producing a crosslinked shaped article, comprising a step of crosslinking the resin composition according to any one of [21] to [23].

[25] A sliding member using the crosslinked shaped article according to [23].

[26] The sliding member according to [25], which is used in any one of applications for an automobile, a motorbike, industrial machinery, construction machinery, and agricultural machinery.

[27] A wiper blade using the crosslinked shaped article according to [23].

[28] The resin composition according to any one of [1] to [3], which comprises
(H) 0.1 to 10 parts by mass of magnesium oxide,
with respect to (A) 100 parts by mass of the ethylene/α-olefin/non-conjugated polyene copolymer (A), wherein the resin composition is substantially free from zinc oxide (I).

[29] The resin composition according to [28], comprising the antioxidant (D) in an amount of 5 parts by mass or less, with respect to 100 parts by mass of the ethylene/α-olefin/non-conjugated polyene copolymer (A).

[30] The resin composition according to [28] or [29], comprising the softening agent (E) in an amount of 80 parts by mass or less with respect to 100 parts by mass of the ethylene/α-olefin/non-conjugated polyene copolymer (A).

[31] The resin composition according to any one of [28] to [30], comprising the crosslinking aid (F) in an amount of 4 parts by mass or less with respect to 100 parts by mass of the ethylene/α-olefin/non-conjugated polyene copolymer (A).

[32] A crosslinked shaped article obtained by crosslinking the resin composition according to any one of [28] to [31].

[33] A process for producing a crosslinked shaped article, comprising a step of crosslinking the resin composition according to any one of [28] to [31].

[34] A rubber hose including a layer formed by crosslinking the resin composition according to any one of [28] to [31] by using a resin mandrel.

[35] The rubber hose according to [34], wherein a resin constituting the resin mandrel is a 4-methyl-1-pentene-based polymer.

[36] A process for producing a rubber hose comprising a step of crosslinking and shaping the resin composition according to any one of [28] to [31] by using a resin mandrel.

[37] The process for producing a hose according to [36], wherein a resin constituting the resin mandrel is a 4-methyl-1-pentene-based polymer.

[38] The crosslinked shaped article according to [32], which is used in any one of applications for an automobile, a motorbike, industrial machinery, construction machinery, and agricultural machinery.

[39] The crosslinked shaped article according to [32], which is used for a water hose for an automobile.

[40] The rubber hose according to [34] or [35], which is used in any one of applications for an automobile, a motorbike, industrial machinery, construction machinery, and agricultural machinery.

[41] The rubber hose according to [34] or [35], which is used for a water hose for an automobile.

Effect of the Invention

The resin composition of the present invention is excellent in crosslinking properties.

According to the resin composition of the present invention, a crosslinked shaped article excellent in heat aging resistance and fatigue resistance can be produced. The crosslinked shaped article of the present invention exhibits excellent heat aging resistance and fatigue resistance and can be suitably used in applications at high temperature, and therefore, it can be suitably used in applications such as hoses for automobiles, motorbikes, industrial machinery, construction machinery, agricultural machinery, and in particular, turbocharger hoses among others.

According to the present invention, the inclusion of a specific ethylene/α-olefin/non-conjugated polyene copolymer also can provide a resin composition which enables producing a crosslinked shaped article excellent in crosslinking properties and thermal aging resistance even when the content of a crosslinking agent is small. The crosslinked shaped article of the present invention is obtained by a resin composition which comprises a specific ethylene/α-olefin/non-conjugated polyene copolymer and is obtained from a resin composition containing small contents of a crosslinking agent and a crosslinking aid, and therefore, the article is excellent in heat aging resistance, releases a small amount of volatile even when used under high temperature conditions, and is excellent in not only mechanical properties for use in packings, but also fogging resistance, allowing a suitable use thereof as a lamp seal packing or a packing for meters. Further, according to the present invention, it can provide lamp seal packings or packings for meters which are excellent in heat aging resistance and fogging resistance.

According to the resin composition of the present invention, a crosslinked shaped article excellent not only in fatigue resistance and impact resilience, but also in abrasion resistance also can be produced. Since the crosslinked shaped article of the present invention exhibits excellent fatigue resistance and impact resilience and is excellent in abrasion resistance, it can be suitably used for various sliding members for automobiles, motorbikes, industrial machinery, construction machinery, and agricultural machinery, and in particular, suitably used for wiper blades of vehicles such as automobiles, motorbikes, trains, aircrafts, and ships. Sliding members and wiper blades of the present invention are not only excellent in fatigue resistance and impact resilience, but also excellent in abrasion resistance.

According to the resin composition of the present invention, a crosslinked shaped article excellent in mechanical strength and heat aging resistance also can be produced, even with a small amount of crosslinking agent compounded. Further, according to the resin composition of the present invention, even when a resin mandrel is used in producing a crosslinked shaped article, the oxidative deterioration of the resin mandrel is small and the frequency of replacing the mandrel can be reduced, resulting in a greatly reduced environmental load.

Since the crosslinked shaped article of the present invention exhibits excellent mechanical strength and heat aging resistance, it is also suitable in application for hoses, such as hoses for automobiles, motorbikes, industrial machinery, construction machinery, and agricultural machinery, and in particular, suitable in an application for water hoses for automobiles among others.

BRIEF DESCRIPTION OF THE DRAWINGS

FIG. 1 is a graph indicating a relation between the number of repeated contacts with a resin composition and values of MFR of TPX at the measurement in a TPX durability test.

FIG. 2 is a graph indicating the relation between the number of repeated contacts with the resin composition and hue values b of TPX at the measurement in the TPX durability test.

DETAILED DESCRIPTION OF THE INVENTION

Hereinafter, the present invention will be described in detail.

Resin Composition

The resin composition of the present invention contains (A) an ethylene/α-olefin/non-conjugated polyene copolymer and (B) an organic peroxide as essential components, and as necessary, may further contain one or more selected from the group consisting of (C) carbon black, (D) an antioxidant, (E) a softener, (F) a crosslinking aid, (G) a white filler, and (H) magnesium oxide, and as necessary, (J) other components.

<Each Component of Resin Composition>

(A) Ethylene/α-Olefin/Non-Conjugated Polyene Copolymer

The ethylene/α-olefin/non-conjugated polyene copolymer (A) according to the present invention contains structural units derived from ethylene (a1), an α-olefin (a2) having 3 to 20 carbon atoms, and a non-conjugated polyene (a3) containing intramolecularly two or more of partial structures selected from the group consisting of structures represented by the following general formulae (I) and (II),

[Chem. 2]

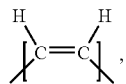

The ethylene/α-olefin/non-conjugated polyene copolymer (A) according to the present invention may further contain, in addition to the structural units derived from the above components (a1), (a2), and (a3), a structural unit derived from a non-conjugated polyene (a4) containing intramolecularly only one partial structure selected from the group consisting of structures represented by the above general formulae (I) and (II).

Examples of the α-olefin (a2) having 3 to 20 carbon atoms include, for example, propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among them, α-olefins having 3 to 8 carbon atoms are preferable, such as propylene, 1-butene, 1-hexene, and 1-octene, and in particular, propylene is preferable. Such α-olefins are preferable because they are relatively inexpensive in raw material cost, and provide not only an ethylene/α-olefin/non-conjugated polyene copolymer excellent in mechanical properties but also a shaped article exhibiting rubber elasticity. These α-olefins may be used singly or in combination of the two or more kinds.

In other words, the ethylene/α-olefin/non-conjugated polyene copolymer (A) according to the present invention contains a structural unit derived from at least one kind of α-olefin (a2) having 3 to 20 carbon atoms, and may contain a structural unit derived from two or more kinds of α-olefins (a2) having 3 to 20 carbon atoms.

Examples of the non-conjugated polyene (a3) containing intramolecularly two or more partial structures in total selected from the group consisting of the structures represented by the above general formulae (I) and (II) includes 5-vinyl-2-norbornene (VNB), norbornadiene, 1,4-hexadiene, dicyclopentadiene, and the like. The non-conjugated polyene (a3) contains preferably VNB, and more preferably, is VNB because VNB, among them, is easily available and excellent in crosslinking reactivity with organic peroxide during its crosslinking reaction after polymerization, enabling easy improvement in the thermal resistance of its polymerized composition. The non-conjugated polyene (a3) may be used singly or in combination of the two or more kinds.

The ethylene/α-olefin/non-conjugated polyene copolymer (A) according to the invention may contain a structural unit derived from the non-conjugated polyene (a4) containing intramolecularly only one partial structure selected from the group consisting of the structures represented by the above general formulae (I) and (II), as well as the structural units derived from ethylene (a1), the α-olefin (a2) having 3 to 20 carbon atoms, and the non-conjugated polyene (a3). Examples of such non-conjugated polyene (a4) include 5-ethylidene-2-norbornene (ENB), 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, and the like. Among them, ENB is preferable because it is easily available, highly reactive with sulphur and vulcanization enhancers during its crosslinking reaction after polymerization, easily controllable in its crosslinking rate, and easy to yield sufficient mechanical physical properties. The non-conjugated polyene (a4) can be used singly or in combination of the two or more kinds thereof. When the ethylene/α-olefin/non-conjugated polyene copolymer of the invention contains a structural unit derived from the non-conjugated polyene (a4) containing intramolecularly only one partial structure selected from the group consisting of the structures represented by the above general formulae (I) and (II), the unit is usually contained in a weight fraction of from about 0 to about 20% by weight, preferably from about 0 to about 8% by weight, and more preferably from about 0.01 to about 8% (with the proviso that the sum of the weight fractions of (a1), (a2), (a3), and (a4) is 100% by weight) although the fraction of the unit is not especially limited so long as the purposes of the present invention are not harmed.

The ethylene/α-olefin/non-conjugated polyene copolymer (A) according to the invention is, as described above, a copolymer containing structural units derived from ethylene (a1), an α-olefin (a2) having 3 to 20 carbon atoms, the above-described non-conjugated polyene (a3), and as necessary, the above non-conjugated polyene (a4), and satisfies the following requirements (i) to (v):

(i) the molar ratio of ethylene/α-olefin is from 40/60 to 99.9/0.1;

(ii) the weight fraction of the structural unit derived from the non-conjugated polyene (a3) is 0.07% by weight to 10% by weight;

(iii) the weight-average molecular weight (Mw) of the ethylene/α-olefin/non-conjugated polyene copolymer, the weight fraction of the structural unit derived from the non-conjugated polyene (a3) (weight fraction of (a3) (% by weight)), and the molecular weight of the non-conjugated polyene (a3) (molecular weight of (a3)) satisfy the following Formula (1), $$4.5 \leq Mw \times \text{weight fraction of } (a3)/100/\text{molecular weight of } (a3) \leq 40; \quad \text{Formula (1)}$$

(iv) the ratio of a complex viscosity $\eta^*_{(\omega=0.1)}$ (Pa·sec) at a frequency of $\omega=0.1$ rad/s to a complex viscosity $\eta^*_{(\omega=100)}$ (Pa·sec) at a frequency of $\omega=100$ rad/s, both obtained by linear viscoelastic measurement (190° C.) by using a rheometer, represented by $P(\eta^*_{(\omega=0.1)}/\eta^*_{(\omega=100)})$, an intrinsic viscosity represented by $[\eta]$, and the weight fraction of the structural unit derived from the non-conjugated polyene (a3) (weight fraction of (a3)) satisfy the following Formula (2), $$P/([\eta]^{2.9}) \leq \text{weight fraction of } (a3) \times 6; \quad \text{Formula (2)}$$

(v) the number of long-chain branches per 1000 carbon atoms represented by ($LCB_{1000C}$) and the natural logarithmic number of the weight-average molecular weight (Mw) represented by $[Ln(Mw)]$, obtained by using 3D-GPC, satisfy the following Formula (3), $$LCB_{1000C} \leq 1-0.07 \times Ln(Mw). \quad \text{Formula (3)}$$

In this specification, the above requirements (i) to (v) are also described as Requirements (i) to (v). In the present specification, "α-olefin having 3 to 20 carbon atoms" is also simply described as "α-olefin."

(Requirement (i))

Requirement (i) specifies that the molar ratio of ethylene/α-olefin in the ethylene/α-olefin/non-conjugated polyene copolymer (A) according to the invention falls within a range from 40/60 to 99.9/0.1, and this molar ratio preferably falls within a range from 50/50 to 90/10, more preferably from 55/45 to 85/15, and still preferably from 55/45 to 78/22.

Such an ethylene/α-olefin/non-conjugated polyene copolymer of the invention is preferable because when it is used as a raw material for crosslinked shaped articles, resultant crosslinked shaped articles not only exhibits excellent rubber elasticity, but also is excellent in mechanical strength and flexibility.

The amount of ethylene (content of a structural unit derived from the ethylene (a1)) and the amount of α-olefin (content of a structural unit derived from the α-olefin (a2)) in the ethylene/α-olefin/non-conjugated polyene copolymer can be determined by using $^{13}$C-NMR.

(Requirement (ii))

Requirement (ii) specifies that in the ethylene/α-olefin/non-conjugated polyene copolymer (A) according to the invention, the weight fraction of the structural unit derived from the non-conjugated polyene (a3) is within a range from 0.07% by weight to 10% by weight in 100% by weight of the ethylene/α-olefin/non-conjugated polyene copolymer (i.e. 100% by weight in total of the weight fractions of all the structural units). This weight fraction of the structural unit derived from the non-conjugated polyene (a3) is preferably from 0.1% by weight to 8.0% by weight, and more preferably from 0.5% by weight to 5.0% by weight.

It is preferable that the ethylene/α-olefin/non-conjugated polyene copolymer (A) according to the invention satisfies Requirement (ii) not only because it has sufficient hardness and exhibits excellent mechanical properties, but also because the ethylene/α-olefin/non-conjugated polyene copolymer (A) according to the invention is suitable for producing crosslinked shaped articles owing to its rapid crosslinking rate when crosslinked by using organic peroxide.

The amount of the non-conjugated polyene (a3) (content of the structural unit derived from the non-conjugated polyene (a3)) in the ethylene/α-olefin/non-conjugated polyene copolymer can be obtained by using $^{13}$C-NMR.

(Requirement (iii))

Requirement (iii) specifies that in the ethylene/α-olefin/non-conjugated polyene copolymer (A) according to the invention, the weight-average molecular weight (Mw) of the ethylene/α-olefin/non-conjugated polyene copolymer, the weight fraction of the structural unit derived from the non-conjugated polyene (a3) in the copolymer (weight fraction of (a3) in % by weight), and the molecular weight of the non-conjugated polyene (a3) (molecular weight of (a3)) satisfy the following Formula (1), $$4.5 \leq Mw \times \text{weight fraction of } (a3)/100/\text{molecular weight of } (a3) \leq 40. \quad \text{Formula (1)}$$

It is preferable that the ethylene/α-olefin/non-conjugated polyene copolymer (A) according to the invention satisfies Requirement (iii) not only because the copolymer has an appropriate content of the structural unit derived from the non-conjugated polyene (a3) such as VNB and exhibits sufficient crosslinking performance, but also because when the ethylene/α-olefin/non-conjugated polyene copolymer of the invention is used to produce a crosslinked shaped article, it is excellent in crosslinking rate, resulting in the crosslinked shaped article excellent in mechanical properties after crosslinking.

The ethylene/α-olefin/non-conjugated polyene copolymer (A) according to the invention more preferably satisfies the following Formula (1'), $$4.5 \leq Mw \times \text{weight fraction of } (a3)/100/\text{molecular weight of } (a3) \leq 35. \quad \text{Formula (1')}$$

The weight-average molecular weight (Mw) of the ethylene/α-olefin/non-conjugated polyene copolymer can be obtained as a numerical value in terms of polystyrene by using Gel Permeation Chromatography (GPC).

When "Mw×weight fraction of (a3)/100/(molecular weight of (a3))" satisfies the Formula (1) or (1'), the ethylene/α-olefin/non-conjugated polyene copolymer (A) according to the invention has an appropriate degree of crosslinking, enabling producing shaped articles well-balanced between their mechanical physical properties and heat aging resistance. When "Mw×weight fraction of (a3)/100/molecular weight of (a3)" is too low, the crosslinkability may be insufficient, causing a slow crosslinking rate, and when it is too high, excessive crosslink may occur, causing worsened the mechanical physical properties.

(Requirement (iv))

Requirement (iv) specifies that the ratio of a complex viscosity $\eta^*_{(\omega=0.1)}$ (Pa·sec) at a frequency of $\omega=0.1$ rad/s to a complex viscosity $\eta^*_{(\omega=100)}$ (Pa·sec) at a frequency of $\omega=100$ rad/s, both obtained by linear viscoelastic measurement (190° C.) by using a rheometer, represented by $P(\eta^*_{(\omega=0.1)}/\eta^*_{(\omega=100)})$, and the intrinsic viscosity [η], of the ethylene/α-olefin/non-conjugated polyene copolymer (A) according to the invention, and the weight fraction of the structural unit derived from the non-conjugated polyene (a3) (weight fraction of (a3) in % by weight) satisfy the following Formula (2), $$P/([\eta]^{2.9}) \leq \text{weight fraction of } (a3) \times 6, \quad \text{Formula (2)}$$

where the ratio of the complex viscosity $\eta^*_{(\omega=0.1)}$ at the frequency $\omega=0.1$ rad/s to the complex viscosity $\eta^*_{(\omega=100)}$ at the frequency $\omega=100$ rad/s, represented by $P(\eta^*_{(\omega=0.1)}/\eta^*_{(\omega=100)})$, represents a frequency dependence of the viscosity, and $P/([\eta]^{2.9})$ which corresponds to the left side of the Formula (2) tends to be higher with increase in the number of long-chain branches although depending on quantities such as short-chain branching and the molecular weight. In general, ethylene/α-olefin/non-conjugated polyene copolymers containing a larger amount of structural unit derived from non-conjugated polyene tend to contain a larger number of long-chain branches, but the ethylene/α-olefin/non-conjugated polyene copolymer of the invention is thought to be able to satisfy the above Formula (2) owing to its fewer long-chain branches than those of conventional well-known ethylene/α-olefin/non-conjugated polyene copolymers.

In the present invention, the P value is a ratio (η* ratio) calculated from complex viscosities at 0.1 rad/s and 100 rad/s obtained by using a viscoelastic measurement apparatus Ares (from Rheometric Scientific) under a measurement condition of 190° C. and 1.0% of distortion at the different frequencies.

The ethylene/α-olefin/non-conjugated polyene copolymer (A) according to the present invention preferably satisfies the following Formula (2'), $$P/([\eta]^{2.9}) \leq \text{weight fraction of } (a3) \times 5.7, \quad \text{Formula (2')}$$

The intrinsic viscosity [η] means a value measured in decalin at 135° C.

(Requirement (v))

Requirement (v) specifies that the number of long-chain branching per 1000 carbon atoms ($LCB_{1000C}$) and the natural logarithmic number of the weight-average molecular weight (Mw) represented by [Ln(Mw)], obtained by using 3D-GPC, of the ethylene/α-olefin/non-conjugated polyene copolymer satisfy the following Formula (3), $$LCB_{1000C} \leq 1 - 0.07 \times Ln(Mw), \quad \text{Formula (3)}$$

The Formula (3) specifies the upper limit of the long-chain branch content per carbon of the ethylene/α-olefin/non-conjugated polyene copolymer.

Such an ethylene/α-olefin/non-conjugated polyene copolymer is preferable not only because it is excellent in curing properties owing to its small fraction of the number of long-chain branches when crosslinked by organic peroxide, but also because shaped articles obtained from the copolymer are excellent in heat aging resistance.

The ethylene/α-olefin/non-conjugated polyene copolymer (A) according to the invention preferably satisfies the following Formula (3'), $$LCB_{1000C} 1 - 0.071 \times Ln(Mw), \quad \text{Formula (3')}$$

where Mw and the number of long-chain branches per 1000 carbon atoms ($LCB_{1000C}$) can be obtained by a structural analysis using 3D-GPC. In this specification, they were specifically obtained as follows.

Absolute molecular weight distribution was obtained by using 3D-high temperature GPC apparatus, Model PL-GPC220 (from Polymer Laboratories Ltd.), and intrinsic viscosity was also obtained by a viscometer. Main measurement conditions are as follows.

Detector: Refractive Index Detector/Incorporated GPC Apparatus

Two-angle light scattering detector, Model PD2040 (manufactured by Precision Detectors Inc.)

Bridge viscometer, Model PL-BV400 (manufactured by Polymer Laboratories Ltd.)

Columns: TSKgel $GMH_{HR}$-H(S)HT×2+TSKgel $GMH_{HR}$-M (S)×1 (each 7.8 mm φ in internal diameter×300 mm in length)

Temperature: 140° C.

Mobile phase: 1,2,4-trichlorobenzene (containing 0.025% of BHT)

Loaded quantity: 0.5 mL

Sample concentration: ca 1.5 mg/mL

Sample filtration: filtration by a sintered filter with pore diameter of 1.0 μm

Values of dn/dc necessary for determining absolute molecular weights were determined for respective samples by using a dn/dc value of 0.053 of a polystyrene standard (molecular weight 190,000) and a response intensity of the refractive index detector per unit loaded mass.

Based on a relation between the intrinsic viscosity obtained by the viscometer and the absolute molecular weight obtained by the light scattering detector, a long-chain branch parameter $g'_i$ for each eluted component was calculated by using Formula (v-1),

[Exp. 1]

$$g'^i = \frac{[\eta]^{i,br}}{[\eta]^{i,lin}} \quad (v-1)$$

[η]i.br: measured intrinsic viscocity of i-th sliced component

[η]i.lin: intrinsic viscosity under the assumption that the i-th sliced component does not have a long-chain branching structure and has only a short-chain branching structure where a relation $[\eta]=KM^v$ with $v=0.725$ was used.

Respective average values represented by the following parameters, g's, were calculated by using Formulae (v-2), (v-3), and (v-4). A trend line based on an assumption that only short-chain branches were contained was determined for each sample.

[Exp. 2]

$$\text{number average long-chain branching parameter } g'^n = \frac{\Sigma(C^i/M^i \times g'^i)}{\Sigma(C^i/M^i)} \quad (v-2)$$

$$\text{weight average long-chain branching parameter } g'^w = \frac{\Sigma(C^i \times g'^i)}{\Sigma C^i} \quad (v-3)$$

$$\text{z-average long-chain branching parameter } g'^z = \frac{\Sigma(C^i \times M^{i2} \times g'^i)}{\Sigma(C^i \times M^{i2})} \quad (v-4)$$

$C^i$: concentration for respective eluted components $M^i$: absolute molecular weight for respective eluted components The parameter $g^{'w}$, was also used to calculate the number of branching sites per molecular chain BrNo, the number of long-chain branches per 1000 carbon atoms $LCB_{1000C}$, and the degree of branching per unit molecular weight λ. The Zimm-Stockmayer Formula (v-5) was used to calculate BrNo, and the Formulae (v-6) and (v-7) were used to calculate $LCB_{1000C}$ and λ. The parameter g is a long-chain branching parameter determined from the radius of the gyration Rg, and is supposed to have the following simple correlation with g' determined from intrinsic viscosity. Various values are proposed for ε taken into account in the equation, depending on the shape of the molecule. Herein, ε=1 (i.e. g'=g) was assumed for calculation.

[Exp. 3]

$$g^{'w} = \frac{1}{\sqrt{\sqrt{1+BrNo/7}+4\times BrNo/9\,\pi}} \quad \text{(v-5)}$$

$$\lambda = BrNo/M \quad \text{(v-6)}$$

$$LCB_{1000c} = \lambda \times 14{,}000 \quad \text{(v-7)}$$

*In the Formula (v-7), the value of 14,000 indicates a molecular weight of 1,000 methylene ($CH_2$) units.

The ethylene/α-olefin/non-conjugated polyene copolymer (A) according to the present invention has an intrinsic viscosity [η] within a range preferably from 0.1 to 5 dL/g, more preferably from 0.5 to 5.0 dL/g, still more preferably from 0.9 to 4.0 dL/g.

The ethylene/α-olefin/non-conjugated polyene copolymer (A) according to the present invention also has a weight-average molecular weight (Mw) within a range preferably from 10,000 to 600,000, more preferably from 30,000 to 500,000, and still more preferably from 50,000 to 400,000.

In the present invention, an ethylene/α-olefin/non-conjugated polyene copolymer having suitable characteristics depending on its use can be selected to be used as the component (A) of the resin composition, within a scope satisfying the above-mentioned requirements.

For example, in an application for a heat-resistant hose, such as a turbocharger hose for automobiles, having a layer formed by crosslinking the resin composition of the present invention, an ethylene/α-olefin/non-conjugated polyene copolymer having a relatively high molecular weight can be suitably used, and specifically, an ethylene/α-olefin/non-conjugated polyene copolymer having a weight-average molecular weight (Mw) of 200,000 to 600,000 can be suitably used.

The ethylene/α-olefin/non-conjugated polyene copolymer (A) according to the invention preferably satisfies the above intrinsic viscosity [η] and the above weight-average molecular weight (Mw) simultaneously.

For the ethylene/α-olefin/non-conjugated polyene copolymer of the present invention, the non-conjugated polyene (a3) preferably contains VNB, and more preferably is VNB. In other words, in the Formulae (1) and (2), and a Formula (4) described later, the "weight fraction of (a3)" is preferably the "weight fraction of VNB" (% by weight).

As described above, the ethylene/α-olefin/non-conjugated polyene copolymer (A) according to the present invention also preferably contains, in addition to the structural units derived from (a1), (a2), and (a3), the structural unit derived from the non-conjugated polyene (a4) containing intramolecularly only one partial structure selected from the group consisting of the structures represented by the general formulae (I) and (II), in a weight fraction within a range from 0% by weight to 20% by weight (with the proviso that the sum of the weight fractions of (a1), (a2), (a3), and (a4) is 100% by weight). In this case, Requirement (vi) below is preferably satisfied.

(Requirement (vi))

The weight-average molecular weight (Mw) of the ethylene/α-olefin/non-conjugated polyene copolymer, the weight fraction of the structural unit derived from the non-conjugated polyene (a3) (the weight fraction of (a3) (% by weight)), the weight fraction of the structural unit derived from the non-conjugated polyene (a4) (weight fraction of (a4) (% by weight)), the molecular weight of the non-conjugated polyene (a3) (molecular weight of (a3)), and the molecular weight of the non-conjugated polyene (a4) (molecular weight of (a4)) satisfy the following Formula (4), $$4.5 \leq Mw \times \{(\text{weight fraction of } (a3)/100/\text{molecular weight of } (a3))+(\text{weight fraction of } (a4)/100/\text{molecular weight of } (a4))\} \leq 45. \quad \text{Formula (4)}$$

The Formula (4) specifies the content of the non-conjugated polyene in one molecule of the copolymer (sum of (a3) and (a4)).

It is preferable that the ethylene/α-olefin/non-conjugated polyene copolymer containing the structure unit derived from the above (a4) satisfies the Formula (4), because shaped articles obtained from the ethylene/α-olefin/non-conjugated polyene copolymer are excellent in mechanical physical properties and heat aging resistance.

When Requirement (vi) is not satisfied and "Mw×{(weight fraction of (a3)/100/molecular weight of (a3))+(weight fraction of (a4)/100/molecular weight of (a4))}" is too small in the Formula (4), in other words, when the content of the non-conjugated diene is too small, crosslinking may not be enough to obtain sufficient mechanical physical properties, and in contrast, when the content of the non-conjugated diene is too large, crosslinking may be excessive, causing worsening of not only the mechanical physical properties but also heat aging resistance.

(Requirement (vii))

The ethylene/α-olefin/non-conjugated polyene copolymer (A) according to the present invention preferably does not have any particular limitation, but it is preferable that a complex viscosity $\eta^*_{(\omega=0.01)}$ (Pa·sec) at a frequency of ω=0.01 rad/s and a complex viscosity $\eta^*_{(\omega=10)}$ (Pa·sec) at a frequency of ω=10 rad/s, obtained by linear viscoelastic measurement (190° C.) by using a rheometer, and an apparent iodine value derived from the non-conjugated polyene (a3) satisfy the following Formula (5), $$\text{Log }\{\eta^*_{\omega=0.01}\}/\text{Log }\{\eta^*_{\omega=10}\} \leq 0.0753 \times \{\text{apparent iodine value originated from non-conjugated polyene}(a3)\}+1.42. \quad \text{Formula (5)}$$

In this Formula, the complex viscosity $\eta^*_{(\omega=0.01)}$ and the complex viscosity $\eta^*_{(\omega=10)}$ are obtained in the same manner as in the case of the complex viscosity $\eta^*_{\omega=0.1)}$ and the complex viscosity $\eta^*_{(\omega=100)}$ in Requirement (vi) except for the measurement frequencies.

The apparent iodine value derived from the non-conjugated polyene (a3) is obtained from the following formula, Apparent iodine value derived from (a3)=weight fraction of (a3)×253.81/molecular weight of (a3).

In the above Formula (5), the left side represents shear speed dependence, which is an index of the amount of long-chain branch, and the right side represents an index of the content of the non-conjugated polyene (a3) which is not consumed as a long-chain branch during polymerization. Requirement (vii) and the Formula (5) are preferably satisfied because the degree of long-chain branching is not too high. In contrast, when the Formula (5) is not satisfied, it is easily understood that a large fraction of the copolymerized non-conjugated polyene (a3) was consumed for the formation of long-chain branches.

The ethylene/α-olefin/non-conjugated polyene copolymer (A) of the present invention also preferably contains a sufficient amount of the structural unit derived from the non-conjugated polyene (a3), and the weight fraction of the structural unit derived from the non-conjugated polyene (a3) in the copolymer (weight fraction of (a3) (% by weight)) and the weight-average molecular weight (Mw) of the copolymer preferably satisfy the following Formula (6), $$6-0.45 \times \mathrm{Ln(Mw)} \leq \text{weight fraction of } (a3) \leq 10. \quad \text{Formula (6)}$$

Further, the ethylene/α-olefin/non-conjugated polyene copolymer (A) according to the present invention has a number of the structural units derived from the non-conjugated polyene (a3) per weight-average molecular weight (Mw), represented by ($n_C$), which is preferably 6 or more, more preferably 6 or more and 40 or less, still more preferably 7 or more and 39 or less, and still more preferably 10 or more and 38 or less.

Such an ethylene/α-olefin/non-conjugated polyene copolymer of the prevent invention contains a sufficient number of structural units derived from a non-conjugated polyene (a3) such as VNB and a small content of long-chain branch, and is excellent not only in curing properties when crosslinked by using organic peroxide but also in formability, and moreover, it is well balanced between physical properties such as mechanical properties, and is excellent particularly in heat aging resistance.

The ethylene/α-olefin/non-conjugated polyene copolymer (A) according to the present invention also has a number of the structural units derived from the non-conjugated polyene (a4) per weight-average molecular weight (Mw), represented by ($n_D$), which is preferably 29 or less, more preferably 10 or less, still more preferably less than one.

Such an ethylene/α-olefin/non-conjugated polyene copolymer (A) according to the present invention is preferable not only because the number of the structural units derived from a non-conjugated polyene (a4) such as ENB is controlled within a range unharmful to the purpose of the invention but also because the copolymer is unlikely to cause post-crosslinking and sufficient in heat aging resistance.

The number of structural units derived from the non-conjugated polyene (a3), represented by ($n_C$), or the number of structural units derived from the non-conjugated polyene (a4), represented by ($n_D$), per weight-average molecular weight (Mw) of the ethylene/α-olefin/non-conjugated polyene copolymer can be obtained from the molecular weight of the non-conjugated polyene (a3) or (a4), the weight fraction (% by weight) of the structural unit derived from the non-conjugated polyene (a3) or (a4) in the copolymer (weight fraction of (a3) or (a4)), and the weight-average molecular weight (Mw) of the copolymer, by using the following formulae, $$(n_C)=(\mathrm{Mw}) \times \{\text{weight fraction of } (a3)/100\}/\text{molecular weight of non-conjugated polyene}(a3), \text{ and}$$

$$(n_D)=(\mathrm{Mw}) \times \{\text{weight fraction of } (a4)/100\}/\text{molecular weight of non-conjugated polyene}(a4).$$

When the numbers of the structural units ($n_C$) and ($n_D$) per weight-average molecular weight (Mw) derived from the non-conjugated polyenes (a3) and (a4) both satisfy the above described ranges, the ethylene/α-olefin/non-conjugated polyene copolymer (A) according to the present invention is preferable not only because it has a small content of long-chain branch, with excellent curing properties when crosslinked by using organic peroxide and good formability, but also because it is well balanced between physical properties such as mechanical properties, unlikely to cause post-crosslinking, and particularly excellent in heat aging resistance.

<Production of Ethylene/α-Olefin/Non-Conjugated Polyene Copolymer>

The ethylene/α-olefin/non-conjugated polyene copolymer (A) according to the present invention is a copolymer obtained by copolymerizing monomers consisting of ethylene (a1), an α-olefin (a2) having 3 to 20 carbon atoms, a non-conjugated polyene (a3) containing intramolecularly two or more partial structures in total selected from the group consisting of the structures represented by the aforementioned general formulae (I) and (II), and as necessary, a non-conjugated polyene (a4) containing intramolecularly only one partial structure selected from the group consisting of the structures represented by the aforementioned general formulae (I) and (II).

Although the ethylene/α-olefin/non-conjugated polyene copolymer of the present invention may be prepared by any process so long as aforementioned Requirements (i) to (v) are satisfied, it is preferably a copolymer obtained by copolymerizing monomers in the presence of a metallocene compound, more preferably a copolymer obtained by copolymerizing monomers in the presence of a catalyst system containing a metallocene compound.

Metallocene Compound

The ethylene/α-olefin/non-conjugated polyene copolymer (A) according to the present invention is desirably a copolymer obtained by copolymerizing monomers in the presence of at least one kind of metallocene compound selected from compounds represented by the following general formula [A1]. The copolymerization of monomers carried out by using a catalyst system containing such a metallocene compound yields a copolymer containing suppressed long-chain branching, facilitating preparing the ethylene/α-olefin/non-conjugated polyene copolymer (A) according to the present invention satisfying the above requirements.

[Chem. 3]

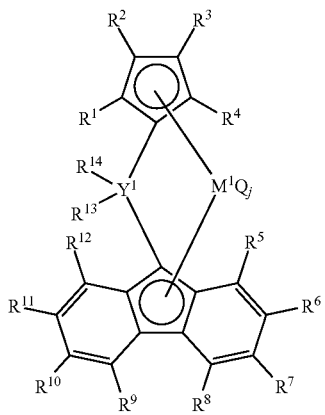

[A1]

In the above formula [A1], $R^1$, $R^2$, $R^3$, $R^4$, $R^5$, $R^8$, $R^9$, and $R^{12}$ are each independently a hydrogen atom, a hydrocarbon group, a silicon-containing group, or a heteroatom-containing group other than any silicon-containing group, and among $R^1$ to $R^4$ adjacent two groups may together form a ring.

The hydrocarbon group is preferably a hydrocarbon group having 1 to 20 carbon atoms, and specific examples thereof include an alkyl group having 1 to 20 carbon atoms, an arylalkyl group having 7 to 20 carbon atoms, an aryl group or substituted aryl group having 6 to 20 carbon atoms, and the like. For example, they include methyl, ethyl, n-propyl, isopropyl, allyl, n-butyl, iso-butyl, sec-butyl, t-butyl, amyl, n-pentyl, neopentyl, n-hexyl, n-heptyl, n-octyl, n-nonyl, n-decanyl, 3-methylpentyl, 1,1-diethylpropyl, 1,1-dimethylbutyl, 1-methyl-1-propyl butyl, 1,1-propyl butyl, 1,1-dimethyl-2-methyl propyl, 1-methyl-1-isopropyl-2-methyl propyl, cyclopentyl, cyclohexyl, cycloheptyl, cyclooctyl, norbornyl, adamantyl, phenyl, o-tolyl, m-tolyl, p-tolyl, xylyl, isopropylphenyl, t-butylphenyl, naphthyl, biphenyl, terphenyl, phenanthryl, anthracenyl, benzyl, and cumyl groups, and also include oxygen-containing groups, such as methoxy, ethoxy, and phenoxy groups, nitrogen-containing groups, such as nitro, cyano, N-methylamino, N,N-dimethylamino, and N-phenylamino groups, boron-containing groups, such as boranetriyl, and diboranyl groups, sulfur-containing groups, such as sulfonyl, and sulphenyl groups.

The above hydrocarbon groups may have a hydrogen atom substituted by a halogen atom, and examples thereof include trifluoromethyl, trifluoromethylphenyl, pentafluorophenyl, and chlorophenyl groups.

Examples of the silicon-containing group include silyl, siloxy, hydrocarbon-substituted silyl, and hydrocarbon-substituted siloxy groups. For example, they include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, dimethyl(pentafluorophenyl)silyl groups, and the like.

$R^6$ and $R^{11}$ are the same atom or the same group selected from a hydrogen atom, a hydrocarbon group, a silicon-containing group, and a heteroatom-containing group other than any silicon-containing group, $R^7$ and $R^{10}$ are the same atom or the same group selected from a hydrogen atom, a hydrocarbon group, a silicon-containing group, and a heteroatom-containing group other than any silicon-containing group, $R^6$ and $R^7$ may together form a ring, and $R^{10}$ and $R^{11}$ may together form a ring. However, all of $R^6$, $R^7$, $R^{10}$, and $R^{11}$ are not a hydrogen atom simultaneously.

$R^{13}$ and $R^{14}$ each independently represent an aryl group.

$M^1$ represents a zirconium atom.

$Y^1$ represents a carbon atom or a silicon atom.

Q represents a halogen atom, a hydrocarbon group, a halogenated hydrocarbon group, a neutral conjugated or non-conjugated diene having 4 to 20 carbon atoms, and a neutral ligand coordinatable by an anionic ligand or a lone pair, and j represents an integer from 1 to 4, and when j is an integer of 2 or more a plurality of Qs may be the same or different from each other.

Examples of the halogen atom include a fluorine atom, a chlorine atom, a bromine atom, and an iodine atom, and the chlorine atom is preferable.

The hydrocarbon groups are preferably those having 1 to 10 carbon atoms, and specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, t-butyl, 1,1-dimethylbutyl, 1,1,3-trimethylbutyl, neopentyl, cyclohexylmethyl, cyclohexyl, 1-methyl-1-cyclohexyl, benzyl groups, and the like, and methyl, ethyl, and benzyl groups are preferable.

The neutral conjugated or non-conjugated diene having 4 to 20 carbon atoms is preferably a neutral conjugated or non-conjugated diene having 4 to 10 carbon atoms. Specific examples of the neutral conjugated or non-conjugated diene include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditoryl-1,3-butadiene, s-cis- or s-trans-$\eta^4$-1,4-bis(trimethylsilyl)-1,3-butadiene, and the like.

Specific examples of the anionic ligand include alkoxy groups, such as methoxy, t-butoxy, and phenoxy groups, carboxylate groups, such as acetate and benzoate groups, and sulfonate groups, such as mesylate and tosylate groups, and the like.

Specific examples of the neutral ligand coordinatable by a lone pair include organic phosphorus compounds, such as trimethylphosphine, triethylphosphine, triphenylphosphine, and diphenylmethylphosphine, or ethers, such as tetrahydrofuran, diethylether, dioxane, and 1,2-dimethoxyethane.

Examples of the cyclopentadienyl group having substituents from $R^1$ to $R^4$ in the formula [A1] include, but are not limited to, non-substituted cyclopentadienyl groups having substituents from $R^1$ to $R^4$ which are a hydrogen atom, cyclopentadienyl groups monosubstituted at position 3, such as 3-t-butylcyclopentadienyl, 3-methylcyclopentadienyl, 3-trimethylsilylcyclopentadienyl, 3-phenylcyclopentadienyl, 3-adamantylcyclopentadienyl, 3-amylcyclopentadienyl, and 3-cyclohexylcyclopentadienyl groups, and cyclopentadienyl groups disubstituted at positions 3 and 5, such as 3-t-butyl-5-methylcyclopentadienyl, 3-t-butyl-5-ethylcyclopentadienyl, 3-phenyl-5-methylcyclopentadienyl, 3,5-di-t-butylcyclopentadienyl, 3,5-dimethylcyclopentadienyl, 3-phenyl-5-methylcyclopentadienyl, and 3-trimethylsilyl-5-methylcyclopentadienyl groups.

The non-substituted cyclopentadienyl groups ($R^1$ to $R^4$ are a hydrogen atom) are preferable from the view point of easiness to synthesize metallocene compounds, and their production cost and copolymerization ability for non-conjugated polyenes.

Examples of a fluorenyl group having the substituents from $R^5$ to $R^{12}$ in the formula [A1] include, but are not limited to, non-substituted fluorenyl groups having substituents from $R^5$ to $R^{12}$ which are a hydrogen atom, fluorenyl groups monosubstituted at position 2, such as 2-methylfluorenyl, 2-t-butylfluorenyl, and 2-phenylfluorenyl groups, fluorenyl groups monosubstituted at position 4, such as 4-methylfluorenyl, 4-t-butylfluorenyl, and 4-phenylfluorenyl groups, and fluorenyl groups disubstituted at positions 2 and 7 or 3 and 6, such as 2,7-di-t-butylfluorenyl, and 3,6-di-t-butylfluorenyl groups, fluorenyl groups tetrasubstituted at positions 2, 3, 6, and 7, such as 2,7-dimethyl-3,6-di-t-butylfluorenyl, and 2,7-diphenyl-3,6-di-t-butylfluorenyl groups, and fluorenyl groups tetrasubstituted at positions 2, 3, 6, and 7 in which $R^6$ together with $R^7$ and $R^{10}$ together with $R^{11}$ each form a ring, as represented by the formulae [V-I] and [V-II].

[Chem. 4]

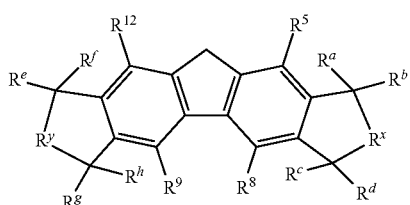

[V-I]

[Chem. 5]

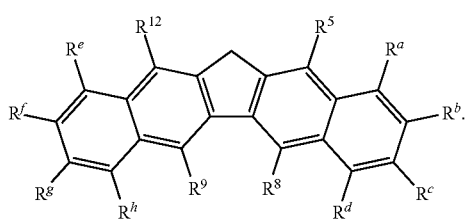

[V-II]

In the formulae [V-I] and [V-II], $R^5$, $R^8$, $R^9$, and $R^{12}$ are the same as the definitions in the formula [A1],
$R^a$, $R^b$, $R^c$, $R^d$, $R^e$, $R^f$, $R^g$, and $R^h$ are each independently a hydrogen atom or an alkyl group having 1 to 5 carbon atoms, and each may bond to an adjacent substituent to form together a ring.
The alkyl groups are specifically exemplified by methyl, ethyl, n-propyl, isopropyl, n-butyl, t-butyl, amyl, and n-pentyl groups. In the formula [V-I], $R^x$ and $R^y$ are each independently a hydrocarbon group having 1 to 3 carbon atoms which may have an unsaturated bond, $R^x$ may form a double-bond together with a carbon atom to which $R^a$ or $R^c$ bonds, $R^y$ may form a double-bond together with a carbon atom to which $R^e$ or $R^g$ bonds, and $R^x$ and $R^y$ are both preferably a saturated or unsaturated hydrocarbon group having one or two carbon atoms.

Specific examples of the compounds represented by the formula [V-I] or [V-II] include octamethyloctahydrodibenzofluorenyl group represented by the formula [V-III], tetramethyldodecahydrodibenzofluorenyl group represented by the formula [V-IV], octamethyltetrahydrodicyclopentafluorenyl group represented by the formula [V-V], hexamethyldihydrodicyclopentafluorenyl group represented by the formula [V-VI], and b,h-dibenzofluorenyl group represented by the formula [V-VII].

[Chem. 6]

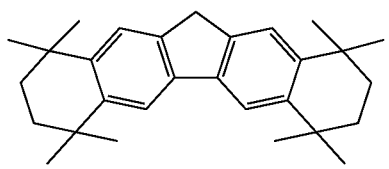

[V-III]

[Chem. 7]

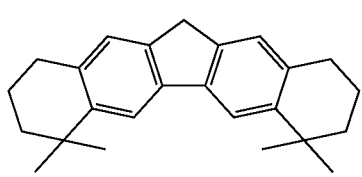

[V-IV]

[Chem. 8]

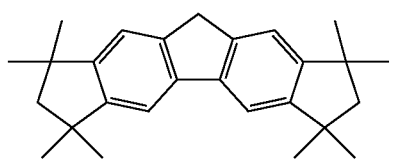

[V-V]

[Chem. 9]

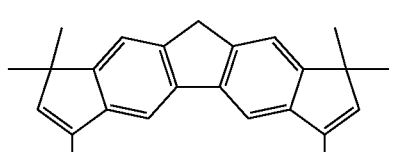

[V-Vi]

[Chem. 10]

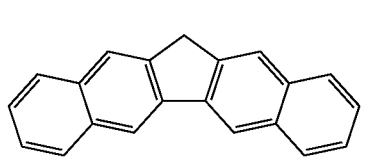
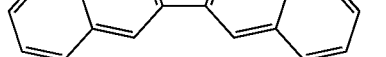

[V-VII]

A metallocene compound containing any of these fluorenyl groups and represented by the general formula [A1] is excellent in copolymerization ability for non-conjugated polyene, and when $Y^1$ is a silicon atom, transition metal compounds are particularly excellent which have any of a fluorenyl group disubstituted at positions 2 and 7, a fluorenyl group disubstituted at positions 3 and 6, a fluorenyl group tetrasubstituted at positions 2, 3, 6, and 7, and a fluorenyl group tetrasubstituted at positions 2, 3, 6, and 7 represented by the above general formula [V-I]. When Y is a carbon atom, metallocene compounds are particularly excellent which have any of a non-substituted fluorenyl group in which $R^5$ to $R^{12}$ are a hydrogen atom, a fluorenyl group disubstituted at positions 3 and 6, a fluorenyl group tetrasubstituted at positions 2, 3, 6, and 7, and a fluorenyl group tetrasubstituted at position 2, 3, 6, and 7 represented by the above general formula [V-I].

In the present invention, in a metallocene compound represented by the general formula [A1], when $Y^1$ is a silicon atom, with all substituents from $R^5$ to $R^{12}$ being a hydrogen atom, $R^{13}$ and $R^{14}$ are preferably selected from groups other than methyl, butyl, phenyl, silicon-substituted phenyl, cyclohexyl, and benzyl groups;
when $Y^1$ is a silicon atom, with both $R^6$ and $R^{11}$ being t-butyl group, and $R^5$, $R^7$, $R^8$, $R^9$, $R^{10}$, and $R^{12}$ not being t-butyl group, $R^{13}$ and $R^{14}$ are preferably selected from groups other than benzyl group, and silicon-substituted phenyl group;
when $Y^1$ is a carbon atom, with all substituents from $R^5$ to $R^{12}$ being a hydrogen atom, $R^{13}$ and $R^{14}$ are preferably selected from groups other than methyl, isopropyl, t-butyl, isobutyl, phenyl, p-t-butylphenyl, p-n-butylphenyl, silicon-substituted phenyl, 4-biphenyl, p-tolyl, naphthyl, benzyl, cyclopentyl, cyclohexyl, and xylyl groups;
when $Y^1$ is a carbon atom, with $R^6$ and $R^{11}$ being the same group selected from t-butyl, methyl, and phenyl groups, and being a different group or atom from $R^5$, $R^7$, $R^8$, $R^9$, $R^{10}$, and $R^{12}$, $R^{13}$ and $R^{14}$ are preferably selected from groups other than methyl, phenyl, p-t-butylphenyl, p-n-butylphenyl, silicon-substituted phenyl, and benzyl groups;

when $Y^1$ is a carbon atom, with $R^6$ being dimethylamino, methoxy, or methyl group, and $R^5$, $R^7$, $R^8$, $R^9$, $R^{10}$, $R^{11}$, and $R^{12}$ being a different group or atom from $R^6$, $R^{13}$ and $R^{14}$ are preferably selected from groups other than methyl and phenyl groups; and when $Y^1$ is a carbon atom, with sites constituted by a fluorenyl group and substituents from $R^5$ to $R^{12}$ being b,h-dibenzofluorenyl or a,i-dibenzofluorenyl groups, $R^{13}$ and $R^{14}$ are preferably selected from groups other than methyl and phenyl groups.

Although specific examples of the metallocene compound represented by the formula [A1] in the present invention will be described below, the scope of the invention is not particularly limited thereby.

Specific examples of the metallocene compound represented by the formula [A1] in the invention include,
when Y is a silicon atom,
diphenylsilylene(cyclopentadienyl)(2,7-di-t-butylfluorenyl)zirconium dichloride,
diphenylsilylene(cyclopentadienyl)(3,6-di-t-butylfluorenyl)zirconium dichloride,
diphenylsilylene(cyclopentadienyl)(2,7-dimethyl-3,6-di-t-butylfluorenyl)zirconium dichloride,
diphenylsilylene(cyclopentadienyl)(2,7-diphenyl-3,6-di-t-butyl fluorenyl)zirconium dichloride,
diphenylsilylene(cyclopentadienyl)(octamethyloctahydrodibenzofluorenyl)zirconium dichloride,
diphenylsilylene(cyclopentadienyl)(tetramethyldodecahydrobenzofluorenyl)zirconium dichloride,
diphenylsilylene(cyclopentadienyl)(octamethyltetrahydrodicyclopentafluorenyl)zirconium dichloride,
diphenylsilylene(cyclopentadienyl)(hexamethyldihydrodicyclopentafluorenyl)zirconium dichloride,
diphenylsilylene(cyclopentadienyl)(b,h-dibenzofluorenyl)zirconium dichloride
di(p-tolyl)silylene(cyclopentadienyl)(fluorenyl)zirconium dichloride,
di(p-tolyl)silylene(cyclopentadienyl)(2,7-di-t-butylfluorenyl)zirconium dichloride,
di(p-tolyl)silylene(cyclopentadienyl)(3,6-di-t-butylfluorenyl) zirconium dichloride,
di(p-tolyl)silylene(cyclopentadienyl)(2,7-dimethyl-3,6-di-t-butylfluorenyl)zirconium dichloride,
di(p-tolyl)silylene(cyclopentadienyl)(2,7-diphenyl-3,6-di-t-butylfluorenyl)zirconium dichloride,
di(p-tolyl)silylene(cyclopentadienyl)(octamethyloctahydrodibenzofluorenyl)zirconium dichloride,
di(p-tolyl)silylene(cyclopentadienyl)(tetramethyldodecahydrobenzofluorenyl)zirconium dichloride,
di(p-tolyl)silylene(cyclopentadienyl)(octamethyltetrahydrodicyclopentafluorenyl)zirconium dichloride,
di(p-tolyl)silylene(cyclopentadienyl)(hexamethyldihydrodicyclopentafluorenyl)zirconium dichloride,
di(p-tolyl)silylene(cyclopentadienyl)(b,h-dibenzofluorenyl)zirconium dichloride,
di(m-tolyl)silylene(cyclopentadienyl)(fluorenyl)zirconium dichloride,
di(m-tolyl)silylene(cyclopentadienyl)(2,7-di-t-butylfluorenyl)zirconium dichloride,
di(m-tolyl)silylene(cyclopentadienyl)(3,6-di-t-butylfluorenyl)zirconium dichloride,
di(m-tolyl)silylene(cyclopentadienyl)(2,7-dimethyl-3,6-di-t-butylfluorenyl)zirconium dichloride,
di(m-tolyl)silylene(cyclopentadienyl)(2,7-diphenyl-3,6-di-t-butylfluorenyl)zirconium dichloride,
di(m-tolyl)silylene(cyclopentadienyl)(octamethyloctahydrodibenzofluorenyl)zirconium dichloride,
di(m-tolyl)silylene(cyclopentadienyl)(tetramethyldodecahydrobenzofluorenyl)zirconium dichloride,
di(m-tolyl)silylene(cyclopentadienyl)(octamethyltetrahydrodicyclopentafluorenyl)zirconium dichloride,
di(m-tolyl)silylene(cyclopentadienyl)(hexamethyldihydrodicyclopentafluorenyl)zirconium dichloride,
di(m-tolyl)silylene(cyclopentadienyl)(b,h-dibenzofluorenyl)zirconium dichloride, and the like.

When Y is a carbon atom, they include
diphenylmethylene(cyclopentadienyl)(3,6-di-t-butylfluorenyl)zirconium dichloride,
diphenylmethylene(cyclopentadienyl)(2,7-dimethyl-3,6-di-t-butylfluorenyl)zirconium dichloride,
diphenylmethylene(cyclopentadienyl)(2,7-diphenyl-3,6-di-t-butylfluorenyl)zirconium dichloride,
diphenylmethylene(cyclopentadienyl)(octamethyloctahydrodibenzofluorenyl)zirconium dichloride,
diphenylmethylene(cyclopentadienyl)(tetramethyldodecahydrodibenzofluorenyl)zirconium dichloride,
diphenylmethylene(cyclopentadienyl)(octamethyltetrahydrodicyclopentafluorenyl)zirconium dichloride,
diphenylmethylene(cyclopentadienyl)(hexamethyldihydrodicyclopentafluorenyl)zirconium dichloride,
diphenylmethylene(cyclopentadienyl)(b,h-dibenzofluorenyl)zirconium dichloride,
di(p-tolyl)methylene(cyclopentadienyl)(2,7-di-t-butylfluorenyl)zirconium dichloride,
di(p-tolyl)methylene(cyclopentadienyl)(3,6-di-t-butylfluorenyl)zirconium dichloride,
di(p-tolyl)methylene(cyclopentadienyl)(2,7-dimethyl-3,6-di-t-butylfluorenyl)zirconium dichloride,
di(p-tolyl)methylene(cyclopentadienyl)(2,7-diphenyl-3,6-di-t-butylfluorenyl)zirconium dichloride,
di(p-tolyl)methylene(cyclopentadienyl)(octamethyloctahydrodibenzofluorenyl)zirconium dichloride,
di(p-tolyl)methylene(cyclopentadienyl)(tetramethyldodecahydrodibenzofluorenyl)zirconium dichloride,
di(p-tolyl)methylene(cyclopentadienyl)(octamethyltetrahydrodicyclopentafluorenyl)zirconium dichloride,
di(p-tolyl)methylene(cyclopentadienyl)(hexamethyldihydrodicyclopentafluorenyl)zirconium dichloride,
di(p-tolyl)methylene(cyclopentadienyl)(b,h-dibenzofluorenyl)zirconium dichloride,
di(m-tolyl)methylene(cyclopentadienyl)(fluorenyl)zirconium dichloride,
di(m-tolyl)methylene(cyclopentadienyl)(2,7-di-t-butylfluorenyl)-zirconium dichloride,
di(m-tolyl)methylene(cyclopentadienyl)(3,6-di-t-butylfluorenyl)-zirconium dichloride,
di(m-tolyl)methylene(cyclopentadienyl)(2,7-dimethyl-3,6-di-t-butylfluorenyl)zirconium dichloride,
di(m-tolyl)methylene(cyclopentadienyl)(2,7-diphenyl-3,6-di-t-butylfluorenyl)zirconium dichloride,
di(m-tolyl)methylene(cyclopentadienyl)(octamethyloctahydrodibenzofluorenyl)zirconium dichloride,
di(m-tolyl)methylene(cyclopentadienyl)(tetramethyldodecahydrobenzofluorenyl)zirconium dichloride,
di(m-tolyl)methylene(cyclopentadienyl)(octamethyltetrahydrodicyclopentafluorenyl)zirconium dichloride,
di(m-tolyl)methylene(cyclopentadienyl)(hexamethyldihydrodicyclopentafluorenyl)zirconium dichloride,
di(m-tolyl)methylene(cyclopentadienyl)(b,h-dibenzofluorenyl)zirconium dichloride,
di(p-t-butylphenyl)methylene(cyclopentadienyl)(3,6-di-t-butyl fluorenyl)zirconium dichloride,
di(p-t-butylphenyl)methylene(cyclopentadienyl)(2,7-dimethyl-3,6-di-t-butylfluorenyl)zirconium dichloride, di(p-t-butylphenyl)methylene(cyclopentadienyl)(2,7-diphenyl-3,6-di-t-butylfluorenyl)zirconium dichloride,
di(p-t-butylphenyl)methylene(cyclopentadienyl)(octamethyloctahydrodibenzofluorenyl)zirconium dichloride,
di(p-t-butylphenyl)methylene(cyclopentadienyl)(tetramethyldodecahydrodibenzofluorenyl)zirconium dichloride,
di(p-t-butylphenyl)methylene(cyclopentadienyl)(octamethyltetrahydrodicyclopentafluorenyl)zirconium dichloride,
di(p-t-butylphenyl)methylene(cyclopentadienyl)(hexamethyldihydrodicyclopentafluorenyl)zirconium dichloride,
di(p-t-butylphenyl)methylene(cyclopentadienyl)(b,h-dibenzofluorenyl)zirconium dichloride,
di(4-biphenyl)methylene(cyclopentadienyl)(2,7-di-t-butylfluorenyl)zirconium dichloride,
di(4-biphenyl)methylene(cyclopentadienyl)(3,6-di-t-butylfluorenyl)zirconium dichloride,
di(4-biphenyl)methylene(cyclopentadienyl)(2,7-dimethyl-3,6-di-t-butylfluorenyl)zirconium dichloride,
di(4-biphenyl)methylene(cyclopentadienyl)(2,7-diphenyl-3,6-di-t-butylfluorenyl)zirconium dichloride,
di(4-biphenyl)methylene(cyclopentadienyl)(octamethyloctahydrodibenzofluorenyl)zirconium dichloride,
di(4-biphenyl)methylene(cyclopentadienyl)(tetramethyldodecahydrodibenzofluorenyl)zirconium dichloride,
di(4-biphenyl)methylene(cyclopentadienyl)(octamethyltetrahydrodicyclopentafluorenyl)zirconium dichloride,
di(4-biphenyl)methylene(cyclopentadienyl)(hexamethyldihydrodicyclopentafluorenyl)zirconium dichloride,
di(4-biphenyl)methylene(cyclopentadienyl)(b,h-dibenzofluorenyl)-zirconium dichloride,
di(p-chlorophenyl)methylene(cyclopentadienyl)(fluorenyl)zirconium dichloride,
di(p-chlorophenyl)methylene(cyclopentadienyl)(2,7-di-t-butylfluorenyl)zirconium dichloride,
di(p-chlorophenyl)methylene(cyclopentadienyl)(3,6-di-t-butylfluorenyl)zirconium dichloride,
di(p-chlorophenyl)methylene(cyclopentadienyl)(2,7-dimethyl-3,6-di-t-butylfluorenyl)zirconium dichloride,
di(p-chlorophenyl)methylene(cyclopentadienyl)(2,7-diphenyl-3,6-di-t-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(tetramethyldodecahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(hexamethyldihydrodicyclopentafluorenyl)zirconium dichloride,
di(p-chlorophenyl)methylene(cyclopentadienyl)(b,h-dibenzofluorenyl)zirconium dichloride,
di(m-chlorophenyl)methylene(cyclopentadienyl)(fluorenyl)zirconium dichloride,
di(m-chlorophenyl)methylene(cyclopentadienyl)(2,7-di-t-butylfluorenyl)zirconium dichloride,
di(m-chlorophenyl)methylene(cyclopentadienyl)(3,6-di-t-butylfluorenyl)zirconium dichloride,
di(m-chlorophenyl)methylene(cyclopentadienyl)(2,7-dimethyl-3,6-di-t-butylfluorenyl)zirconium dichloride,
di(m-chlorophenyl)methylene(cyclopentadienyl)(2,7-diphenyl-3,6-di-t-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(tetramethyldodecahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(hexamethyldihydrodicyclopentafluorenyl)zirconium dichloride,
di(m-chlorophenyl)methylene(cyclopentadienyl)(b,h-dibenzofluorenyl)zirconium dichloride,
di(m-trifluoromethylphenyl)methylene(cyclopentadienyl)(fluorenyl)zirconium dichloride,
di(m-trifluoromethylphenyl)methylene(cyclopentadienyl)(2,7-di-t-butylfluorenyl)zirconium dichloride,
di(m-trifluoromethylphenyl)methylene(cyclopentadienyl)(3,6-di-t-butylfluorenyl)zirconium dichloride,
di(m-trifluoromethylphenyl)methylene(cyclopentadienyl)(2,7-dimethyl-3,6-di-t-butylfluorenyl)zirconium dichloride,
di(m-trifluoromethylphenyl)methylene(cyclopentadienyl)(2,7-diphenyl-3,6-di-t-butylfluorenyl)zirconium dichloride,
di(m-trifluoromethylphenyl)methylene(cyclopentadienyl)(octamethyloctahydrodibenzofluorenyl)zirconium dichloride,
di(m-trifluoromethylphenyl)methylene(cyclopentadienyl)(tetramethyldodecahydrodibenzofluorenyl)zirconium dichloride,
di(m-trifluoromethylphenyl)methylene(cyclopentadienyl)(octamethyltetrahydrodicyclopentafluorenyl)zirconium dichloride,
di(m-trifluoromethylphenyl)methylene(cyclopentadienyl)(hexamethyldihydrodicyclopentafluorenyl)zirconium dichloride,
di(m-trifluoromethylphenyl)methylene(cyclopentadienyl)(b,h-dibenzofluorenyl)zirconium dichloride,
di(2-naphthyl)methylene(cyclopentadienyl)(2,7-di-t-butylfluorenyl)zirconium dichloride,
di(2-naphthyl)methylene(cyclopentadienyl)(3,6-di-t-butylfluorenyl)zirconium dichloride,
di(2-naphthyl)methylene(cyclopentadienyl)(2,7-dimethyl-3,6-di-t-butylfluorenyl)zirconium dichloride,
di(2-naphthyl)methylene(cyclopentadienyl)(2,7-diphenyl-3,6-di-t-butylfluorenyl)zirconium dichloride,
di(2-naphthyl)methylene(cyclopentadienyl)(octamethyloctahydrodibenzofluorenyl)zirconium dichloride,
di(2-naphthyl)methylene(cyclopentadienyl)(tetramethyldodecahydrodibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(hexamethyldihydrodicyclopentafluorenyl)zirconium dichloride,
di(2-naphthyl)methylene(cyclopentadienyl)(b,h-dibenzofluorenyl)zirconium dichloride, and the like.

The following exemplary structural formulae of these metallocene compounds depict
di(p-tolyl)methylene(cyclopentadienyl)(octamethyloctahydrodibenzofluorenyl)zirconium dichloride (in the following formula (A1-1)) and
di(p-chlorophenyl)methylene(cyclopentadienyl)(octamethyloctahydrodibenzofluorenyl)zirconium dichloride (in the following formula (A1-2)).

[Chem. 11]

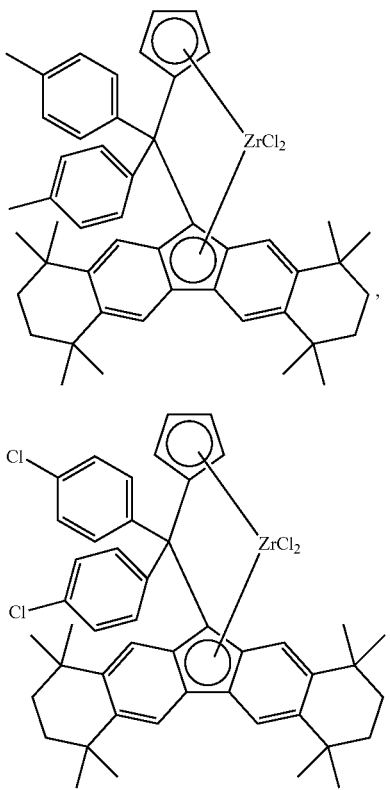

The above compounds may be used singly or in combination of the two or more kinds.

The metallocene compound represented by the formula [A1] which can be suitably used for preparing the ethylene/α-olefin/non-conjugated polyene copolymer of the invention can be produced by any process without any special limitation. Specifically, it can be produced, for example, in accordance with processes described in J. Organomet. Chem., 63, 509(1996), and WO 2005/100410, WO 2006/123759, WO 01/27124, JP-A-2004-168744, JP-A-2004-175759, and JP-A-2000-212194, which are documents according to the applications by the present applicants.

Catalyst Containing Metallocene Compound

Examples of polymerization catalysts which can be suitably used for producing the ethylene/α-olefin/non-conjugated polyene copolymer of the present invention include catalysts which contain the metallocene compound represented by the aforementioned formula [A1] and are capable of copolymerizing monomers.

Preferably, they include catalysts consisting of:

(a) a metallocene compound represented by the aforementioned formula [A1];

(b) at least one compound selected from (b-1) an organometallic compound, (b-2) an organoaluminum oxycompound, and (b-3) a compound reacting with the metallocene compound (a) to form an ion pair;

and as necessary, (c) a particulate carrier.

Each of the components will be specifically explained below.

(b-1) Organometallic Compound

The organometallic compound (b-1) to be used in this invention is an organometallic compound of Groups 1, 2 and 12, 13 specifically represented by the following general formulae from [VII] to [IX].

(b-1a) Organoaluminum compound represented by a general formula of $$R^a_m Al(OR^b)_n H_p X_q \qquad [VII]$$

(In the formula [VII], $R^a$ and $R^b$ may be the same or different from each other, and represent a hydrocarbon group having 1 to 15 carbon atoms, and preferably 1 to 4 carbon atoms, X represents a halogen atom, m is a number of $0<m\leq3$, n is a number of $0\leq n<3$, p is a number of $0\leq p<3$, q is a number of $0\leq q<3$, and m+n+p+q=3.)

Such compounds can be exemplified by trialkylaluminums, such as trimethylaluminum, triethylaluminum, triisobutylaluminum, and tri-n-octylaluminum, tricycloalkylaluminums, isobutylaluminum dichloride, diethylaluminum chloride, ethylaluminum dichloride, ethylaluminum sesquichloride, methylaluminum dichloride, dimethylaluminum chloride, and diisobutylaluminum hydride.

(b-1b) Complex alkylated product of Group 1 metal and aluminum, represented by a general formula of $$M^2 AlR^a_4 \qquad [VIII]$$

(In the formula [VIII], $M^2$ represents Li, Na, or K, $R^a$ is a hydrocarbon group having 1 to 15 carbon atoms, and preferably 1 to 4 carbon atoms.)

Such compounds can be exemplified by $LiAl(C_2H_5)_4$, $LiAl(C_7H_{15})_4$, and the like.

(b-1c) Dialkyl compound having Group 2 or 12 metal, represented by a general formula of $$R^a R^b M^3 \qquad [IX]$$

(In the formula [IX], $R^a$ and $R^b$ may be the same or different from each other, and represent a hydrocarbon group having 1 to 15 carbon atoms, and preferably 1 to 4 carbon atoms, and $M^3$ is Mg, Zn, or Cd.)

Among the above organometallic compounds (b-1), organoaluminum compounds, such as triethylaluminum, triisobutylaluminum, and tri-n-octylaluminum are preferable. Such organometallic compounds (b-1) can be used singly or in combination with the two or more kinds.

(b-2) Organoaluminum Oxy-Compound

Organoaluminum oxycompounds (b-2) to be used in the invention may be conventionally well-known aluminoxanes, or organoaluminum oxycompounds insoluble into benzene as described in JP-A-H2-78687.

Conventionally known aluminoxanes can be produced, for example, by the following processes, and usually obtained as a solution with a hydrocarbon solvent.

(1) A process in which an organoaluminum compound such as a trialkylaluminum is added to a hydrocarbon solution suspending a compound containing adsorbed water or a salt containing crystallization water, such as magnesium chloride hydrate, copper sulfate hydrate, aluminum sulfate hydrate, nickel sulfate hydrate, and cerous chloride hydrate, to make the adsorbed water or the crystallization water react with the organoaluminum compound.

(2) A process in which water, ice, or water vapor is directly applied to an organoaluminum compound such as a trialkylaluminum in a medium such as benzene, toluene, ethyl ether, and tetrahydrofuran.

(3) A process in which an organo-tin oxide such as dimethyltin oxide and dibutyltin oxide is made react with an organoaluminum compound such as a trialkylaluminum in a medium, such as decane, benzene, and toluene.

The aluminoxanes may contain a small amount of an organic metal component. Furthermore, aluminoxane in the above recovered aluminoxane solution may be separated by distillation from the solvent or the non-reacted organoaluminum compound, to be dissolved again into a solvent or suspended into a poor solvent for aluminoxane.

Specific examples of organoaluminum compounds used for preparing the aluminoxane include those which are the same as organoaluminum compounds exemplified by (b-1a).

Among them, trialkylaluminums and tricycloalkylaluminums are preferable, and trimethylaluminum and triisobutylaluminum are particularly preferable.

The organoaluminum compounds as described above can be used singly or in combination of the two or more kinds.

A benzene-insoluble organoaluminum oxycompound which is one aspect of the organoaluminum oxycompound (b-2) used in the present invention is preferably a compound in which the Al component soluble into benzene at 60° C. is usually 10% or less by weight in terms of Al atom with respect to 100% by weight of benzene, preferably 5% or less by weight, and especially preferably 2% or less by weight, and in other words, the organoaluminum oxycompounds are preferably insoluble or poorly soluble into benzene.

Examples of the organoaluminum oxycompound (b-2) to be used in the invention can include those which contain boron and are represented by the following general formula [X]

[Chem. 12]

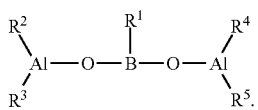

[X]

[In the formula [X], $R^1$ represents a hydrocarbon group having 1 to 10 carbon atoms, and substituents from $R^2$ to $R^5$ may be the same or different from each other and represent a hydrogen atom, a halogen atom, or a hydrocarbon group having 1 to 10 carbon atoms.] Organoaluminum oxycompounds containing boron, represented by the above general formula [X] can be produced by reacting an alkylboronic acid represented by the following general formula [XI],

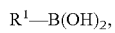 [XI]

(In the formula [XI], $R^1$ represents the same group as $R^1$ in the above general formula [X].) with an organoaluminum compound in an inert solvent under an inert gas atmosphere at a temperature within the range from −80° C. to room temperature for 1 minute to 24 hours.

Specific examples of the alkylboronic acid represented by the above general formula [XI] include methylboronic acid, ethylboronic acid, isopropylboronic acid, n-propylboronic acid, n-butylboronic acid, isobutylboronic acid, n-hexyl boronic acid, cyclohexylboronic acid, phenylboronic acid, 3,5-difluorophenylboronic acid, pentafluorophenylboronic acid, and 3,5-bis(trifluoromethyl)phenylboronic acid, and the like.

Among them, methylboronic acid, n-butylboronic acid, isobutylboronic acid, 3,5-difluorophenylboronic acid, and pentafluorophenylboronic acid are preferable. These are used singly or in combination of the two or more kinds.

Specific examples of organoaluminum compounds to be reacted with these alkylboronic acids include those which are the same as an organoaluminum compound exemplified by the above compound represented by (b-1a).

Among them, trialkylaluminums and tricycloalkylaluminums are preferable, and trimethylaluminum, triethylaluminum, and triisobutylaluminum are particularly preferable. These are used singly or in combination with the two or more kinds. The above organoaluminum oxycompound (b-2) is used singly or in combination with the two or more kinds.

(b-3) Compound to be Reacted with Transition Metal Compound (A) to Form an Ion Pair Examples of the compound (b-3) to be reacted with a crosslinked metallocene compound (A) used in the present invention, to form an ion pair (hereinafter referred to as "ionized ionic compounds") includes Lewis acids, ionic compounds, borane compounds, and carborane compounds described in, for example, JP-A-H1-501950, JP-A-H1-502036, JP-A-H3-179005, JP-A-H3-179006, JP-A-H3-207703, JP-A-H3-207704, U.S. Pat. No. 5,321,106, and the like. Further, they can include heteropolycompounds and isopolycompounds. The ionized ionic compound (b-3) is used singly or in combination with the two or more kinds.

Specific examples of the Lewis acids includes compounds represented by $BR_3$ (R is fluorine or a phenyl group which may have a substituent, such as fluorine, methyl, and trifluoromethyl groups), and includes, for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl)boron.

Examples of the ionic compound include, for example, compounds represented by following general formula [XII],

[Chem. 13]

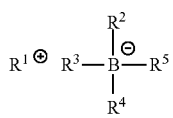

[XII]

(In the formula [XII], examples of $R^{1+}$ include $H^+$, carbonium cations, oxonium cations, ammonium cations, phosphonium cations, cycloheptyltrienyl cations, and ferrocenium cations having a transition metal. Substituents from $R^2$ to $R^5$ may be the same or different from each other, and are an organic group, preferably an aryl or substituted aryl group.) Specific examples of the carbonium cation include trisubstituted carbonium cations such as triphenyl carbonium cation, tri(methylphenyl)carbonium cation, tri(dimethylphenyl)carbonium cation, and the like.

Specific examples of the ammonium cations include trialkylammonium cations, such as trimethylammonium cation, triethylammonium cation, tripropylammonium cation, tributylammonium cation, and tri(n-butyl)ammonium cation; N,N-dialkylanilinium cations, such as N,N-dimethylanilinium cation, N,N-diethylanilinium cation, and N,N,2,4,6-pentamethylanilinium cation; and dialkylammonium cations, such as di(isopropyl)ammonium cation and dicyclohexyl ammonium cation.

Specific examples of the phosphonium cation include triarylphosphonium cations, such as triphenylsulfonium cation, tri(methylphenyl)phosphonium cation, and tri(dimethylphenyl)phosphonium cation.

Examples of $R^{1+}$ are preferably carbonium cations or ammonium cations, and triphenylcarbonium cation, N,N-dimethylanilinium cation, and N,N-diethylanilinium cation are particularly preferable.

Examples of the ionic compound can also include, for example, trialkyl-substituted ammonium salts, N,N-dialkylanilinium salts, dialkylammonium salts, and triarylphosphonium salts.

Specific examples of the trialkyl-substituted ammonium salts include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl) ammonium tetra(pentafluorophenyl)boron, tripropylammonium tetra(o,p-dimethylphenyl)boron, tri(n-butyl) ammonium tetra(N,N-dimethylphenyl)boron, tri(n-butyl) ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and the like.

Specific examples of the N, N-dialkylanilinium salts include N,N-dimethylanilinium tetra(phenyl)boron, N,N-diethylanilinium tetra(phenyl)boron, N,N,2,4,6-pentamethylanilinium tetra(phenyl)boron, and the like.

Specific examples of the dialkylammonium salts include di(1-propyl)ammonium tetra(pentafluorophenyl)boron, dicyclohexylammonium tetra(phenyl)boron, and the like.

Examples of the ionic compounds also can include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbenium pentaphenylcyclopentadienyl complex, N,N-diethylanilinium pentaphenylcyclopentadienyl complex, boron compounds represented by the following general formula [XIII] or [XIV], and the like. In the formulae, Et represents an ethyl group.

[Chem. 14]

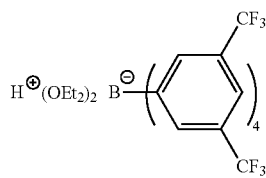

[XIII]

[Chem. 15]

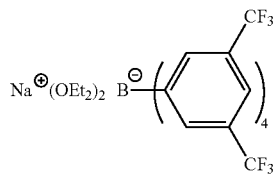

[XIV]

Specific examples of the borane compounds include:
decaborane;
anionic salts, such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, and bis[tri(n-butyl)ammonium]dodecachlorododecaborate;
salts of metal borane anion, such as tri(n-butyl)ammonium bis(dodecahydridedodecaborate)cobaltate (III), bis[tri(n-butyl)ammonium]bis(dodecahydridedodecaborate)nickelate (III), and the like.

Specific examples of the carborane compounds include anionic salts, such as 4-carbanonaborane, 1,3-dicarbanonaborane, 6,9-dicarbadecaborane, dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammonium bromo-1-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, and tri(n-butyl)ammonium undecahydride-4,6-dibromo-7-carbaundecaborate; and
salts of metal carborane anion, such as tri(n-butyl)ammonium bis(nonahydride-1,3-dicarbanonaborate)cobaltate (III), tri(n-butyl)ammonium bis(undecahydride-7,8-dicarbaundecaborate)ferrate (III), tri(n-butyl)ammonium bis(undecahydride-7,8-dicarbaundecaborate)cobaltate (III), tri(n-butyl)ammonium bis(undecahydride-7,8-dicarbaundecaborate)nickelate (III), tri(n-butyl)ammonium bis(undecahydride-7,8-dicarbaundecaborate)cuprate (III), tri(n-butyl)ammonium bis(undecahydride-7,8-dicarbaundecaborate)aurate (III), tri(n-butyl)ammonium bis(nonahydride-7,8-dimethyl-7,8-dicarbaundecaborate)ferrate (III), tri(n-butyl)ammonium bis(nonahydride-7,8-dimethyl-7,8-dicarbaundecaborate)chromate (III), tri(n-butyl)ammonium bis(tribromooctahydride-7,8-dicarbaundecaborate)cobaltate (III), tris[tri(n-butyl)ammonium]bis(undecahydride-7-carbaundecaborate)chromate (III), bis[tri(n-butyl)ammonium]bis(undecahydride-7-carbaundecaborate)manganate (IV), bis[tri(n-butyl)ammonium]bis(undecahydride-7-carbaundecaborate)cobaltate (III), bis[tri(n-butyl)ammonium]bis(undecahydride-7-carbaundecaborate)nickelate (IV), and the like.

The heteropolycompounds consist of an atom selected from silicon, phosphorus, titanium, germanium, arsenic, and tin, and one or more kinds of atoms selected from vanadium, niobium, molybdenum, and tungsten. Specifically, those which can be used include, but are not limited to, phosphovanadic acid, germanovanadic acid, arsenovanadic acid, phosphoniobic acid, germanoniobic acid, siliconomolybdic acid, phosphomolybdic acid, titanomolibdic acid, germanomolybdic acid arsenomolybic acid, tin molybdic acid, phosphotungstic acid, germanotungstic acid, tin tungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, and salts of these acids, for example, salts with Group 1 or Group 2 metals, specifically, with lithium, sodium, potassium, rubidium, cesium, beryllium, magnesium, calcium, strontium, and barium, and organic salts such as triphenylethyl salt.

Among the ionized ionic compounds (b-3), the above ionic compounds are preferable, and especially triphenylcarbenium tetrakis(pentafluorophenyl)borate and N,N-dimethylanilinium tetrakis(pentafluorophenyl)borate are more preferable. The ionized ionic compounds (b-3) are used singly or in combination of the two or more kinds.

In the invention, when a metallocene catalyst containing the metallocene compound (a) represented by the above general formula [A1], an organometallic compound (b-1) such as triisobutylaluminum, an organoaluminum oxycompound (b-2) such as methylaluminoxane, and an ionized ionic compound (b-3) such as triphenylcarbenium tetrakis (pentafluorophenyl)borate is used as a catalyst, it can exhibit very high polymerization activity in the production of the ethylene/α-olefin/non-conjugated polyene copolymer.

The metallocene catalyst used for the present invention can utilize the above metallocene compound (a) and at least one kind of compound (b) selected from the organometallic compound (b-1), the organoaluminum oxycompound (b-2), and the ionized ionic compound (b-3), and as necessary, it can also utilize a carrier (c).

(C) Carrier

The carrier (c) used as necessary in the present invention (microparticulate carrier) is an inorganic or organic compound, which is a granular or microparticulate solid.

Examples of the inorganic compound are preferably porous oxides, inorganic halides, clays, clay minerals, or ion-exchangeable layered compounds.

Specific examples of the porous oxides which can be used include $SiO_2$, $Al_2O_3$, $MgO$, $ZrO$, $TiO_2$, $B_2O_3$, $CaO$, $ZnO$, $BaO$, $ThO_2$, and the like, or composites or mixtures containing any of them, for example, natural or synthesized zeolite, $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, and the like. Among them, those mainly composed of $SiO_2$ and/or $Al_2O_3$ are preferable. Although these porous oxides are different in nature depending on their kinds and production processes, the carrier preferably used in the present invention desirably has a particle diameter within a range from 10 to 300 μm, preferably from 20 to 200 μm, a specific surface area within a range from 50 to 1,000 m²/g, preferably 100 to 700 m²/g, and a pore volume within a range from 0.3 to 3.0 cm³/g. Such a carrier is used, as necessary, after calcination at a temperature with in a range from 100 to 1,000° C., preferably from 150 to 700° C.

Examples of the inorganic halides to be used are $MgCl_2$, $MgBr_2$, $MnCl_2$, $MnBr_2$, and the like. The inorganic halides may be used as-is, or after trituration by ball milling or vibration milling. Alternatively, they can also be used in a microparticulate form which is obtained by precipitating, using a precipitating agent, inorganic halide dissolved into a solvent such as alcohol.

The clays to be used in the present invention are usually composed mainly of clay minerals. The ion-exchangeable layered compounds to be used in the present invention are compounds which have a structure in which planes formed by, for example, ionic bonds are piled in parallel on each other by a weak bonding force, and are compounds containing exchangeable ions. Most clay minerals are ion-exchangeable layered compounds. These clays, clay minerals, and ion-exchangeable layered compounds are not limited to natural materials, and synthesized ones can also be used.

The clays, clay minerals, and ion-exchangeable layered compounds can be exemplified by clays, clay minerals, or ionic crystal compounds having a layered crystalline structure, such as the hexagonal close-packed structure, the antimony structure, the $CdCl_2$ structure, and the $CdI_2$ structure. Examples of the clays and clay minerals include kaolin, bentonite, kibushi clay, gairome clay, allophane, hisingerite, pyrophyllite, mica group, montmorilonite group, vermiculite, chlorite group, palygorskite, kaolinite, nakhlite, dickite, halloysite, and the like, and examples of the ion-exchangeable layered compound include crystalline acidic salts of multivalent metal, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$, γ-$Ti(NH_4PO_4)_2 \cdot H_2O$, and the like.

Such clays and clay minerals, or ion-exchangeable layered compounds have a pore volume preferably of 0.1 cc/g or more, and particularly preferably of from 0.3 to 5 cc/g, as measured for pores of 20 Å or more in radius by using a mercury intrusion method. The pore volume is measured for pores of 20 to 30,000 Å in a radius by a mercury intrusion method using a mercury porosimeter.

When a carrier is used which has a pore volume of less than 0.1 cc/g as measured for pores of 20 Å or more in radius, it tends to be difficult to yield high polymerization activity.

Clay and clay mineral used in the present invention are also preferably chemically treated. Any chemical treatment can be used such as a treatment for removing impurity attached to the surface of the materials and a treatment affecting the crystalline structure of the clay. Specific examples of the chemical treatment include acid treatments, basic treatments, treatments with salts, and treatments with organics. The acid treatments not only remove impurities on the surface of the materials, but also increase their surface area by eluting cations, such as Al, Fe, and Mg. The basic treatments destroy the crystalline structure of the clay, resulting in a change in its structure. The treatments with salts or organics can create ionic complexes, molecular composites, organic derivatives, and the like, to change the surface area or the interlayer distance of the materials.

Ion-exchangeable layered compounds to be used in the present invention may be those having an increased interlayer distance owing to the replacement of exchangeable ions between the layers with other bulkier ions by using their ion-exchangeability. Such bulky ions play a role of poles supporting the layered structure and are usually called "pillars." Inserting another substance between the layers of a layered compound is called "intercalation." Examples of the intercalated guest compound include cationic inorganic compounds such as $TiCl_4$ and $ZrCl_4$, metal alkoxides, such as $Ti(OR)_4$, $Zr(OR)_4$, $PO(OR)_3$, and $B(OR)_3$ (R is, for example, a hydrocarbon group), metal hydroxide ions, such as $[Al_{13}O_4(OH)_{24}]^{7+}$, $[Zr_4(OH)_{14}]^{2+}$, and $[Fe_3O(OCO-CH_3)_6]^+$, and the like. These compounds are used singly or in combination of the two or more kinds. These compounds can be intercalated in the presence of polymers obtained through hydrolysis of metal alkoxides, such as $Si(OR)_4$, $Al(OR)_3$, and $Ge(OR)_4$ (R is, for example, a hydrocarbon group), colloidal inorganic compounds such as $SiO_2$, and the like. Examples of the pillars include an oxide produced by thermal dehydration of the above intercalated metal hydroxide ion.

The clay, clay mineral, and ion-exchangeable layered compound to be used in the present invention can be used as-is or after treated by, for example, ball milling or sieving. They can also be used after fresh adsorption of water or thermal dehydration. Further, they can be used singly or in combination of the two or more kinds.

Among them, preferable are clays or clay minerals, and particularly preferable are montmorilonite, vermiculite, hectorite, taeniolite, and synthesized mica.

Examples of the organic compound include granular or microparticulate solids ranging from 10 to 300 μm in particle diameter. Specifically, they can be exemplified by polymers or copolymers mainly composed of an α-olefin having 2 to 14 carbon atoms, such as ethylene, propylene, 1-butene, and 4-methyl-1-pentene, polymers or copolymers mainly composed of vinylcyclohexane or styrene, and modified products thereof.

The metallocene catalyst to be used in the present invention contains not only the metallocene compound (a), at least one kind of compound (b) selected from the organometallic compound (b-1), the organoaluminum oxycompound (b-2), the ionized ionic compound (b-3), and the carrier (c) used as necessary, but also the following specific organic compound component (d), as necessary.

(d) Organic Compound Component

In the present invention, the organic compound component (d) is used, as necessary, in order to improve polymerization performance and the physical properties of the produced polymer. Examples of such organic compound include, but are not limited to, alcohols, phenol compounds, carboxylic acids, phosphorus compounds, and sulfonate salts.

Process for Producing Ethylene/α-Olefin/Non-Conjugated Polyene Copolymer (A)

The ethylene/α-olefin/non-conjugated polyene copolymer (A) according to the present invention can be produced by copolymerizing monomers consisting of ethylene (a1), an α-olefin (a2) having 3 to 20 carbon atoms, a non-conjugated polyene (a3) containing intramolecularly two or more partial structures in total selected from the group consisting of the structures represented by the following general formulae (I) and (II), and as necessary, a non-conjugated polyene (a4) containing intramolecularly only one partial structure selected from the group consisting of the structure represented by the following general formulae (I) and (II),

[Chem. 16]

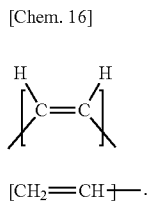

(I)

[CH$_2$=CH$\dashv$—.   (II)

When such monomers are copolymerized, processes of how to use respective components composing the above polymerization catalyst and the order of adding the components are arbitrarily selected, and some exemplary processes are given below:

(1) A process in which the metallocene compound (a) alone is added to a polymerizer.
(2) A process in which the metallocene compound (a) and the compound (b) are added to the polymerizer in an arbitrary order.
(3) A process in which a catalyst component including the carrier (c) and the metallocene compound (a) supported on the carrier, and the compound (b) are added to the polymerizer in an arbitrary order.
(4) A process in which a catalyst component including the carrier (c) and the compound (b) supported on the carrier, and the metallocene compound (a) are added to the polymerizer in an arbitrary order.
(5) A process in which a catalyst component including the carrier (c) and metallocene compound (a) and the compound (b) both supported on the carrier is added to the polymerizer.

In each of the above methods (2) to (5), at least two of the metallocene compound (a), the compound (b), and the carrier (c) may be contacted with each other in advance.

In each of the above processes (4) and (5) in which the compound (b) is supported on the carrier, an additional unsupported compound (b) may be added in an arbitrary order as necessary. In this case, the additional compound (b) may be the same as or different from the compound (b) supported on the carrier (c).

The solid catalyst component including the above carrier (c) and the metallocene compound (a) supported on the carrier and the solid catalyst component including the carrier (c) and the metallocene compound (a) and the compound (b) both supported on the carrier may be prepolymerized with olefin, and an additional catalyst component may be supported on the prepolymerized solid catalyst component.

In the invention, the ethylene/α-olefin/non-conjugated polyene copolymer can be suitably obtained by copolymerizing monomers in the presence of the metallocene catalyst as described above.

When the olefin is polymerized by using the metallocene catalyst as described above, the metallocene compound (a) is used usually in an amount with in a range from $10^{-12}$ to $10^{-2}$ mol, preferably from $10^{-10}$ to $10^{-8}$ mol per one liter of the reaction volume.

The compound (b-1) is used in an amount such that the molar ratio of the compound (b-1) to all atoms of the transition metal (M) in the metallocene compound (a), represented by [(b-1)/M], is usually within a range from 0.01 to 50,000, preferably from 0.05 to 10,000. The compound (b-2) is used in an amount such that the molar ratio of aluminum atoms of the compound (b-2) to all atoms of the transition metal (M) in the metallocene compound (a), represented by [(b-2)/M], is usually within a range from 10 to 50,000, preferably from 20 to 10,000. The compound (b-3) is used in an amount such that the molar ratio of the compound (b-3) to all atoms of the transition metal (M) in the metallocene compound (a), represented by [(b-3)/M], is usually within a range from 1 to 20, preferably 1 from 15.

In the present invention, the ethylene/α-olefin/non-conjugated polyene copolymer can be produced in either liquid phase polymerization processes such as solution (dissolution) polymerization, suspension polymerization, or vapor phase polymerization processes, and the processes preferably include, but are not especially limited to, the following steps of obtaining a polymerization-reaction solution.

The step of obtaining a polymerization-reaction solution is a step to obtain a polymerization-reaction solution of the ethylene/α-olefin/non-conjugated polyene copolymer by polymerizing monomers consisting of ethylene (a1), an α-olefin (a2) having 3 to 20 carbon atoms, a non-conjugated polyene (a3), and as necessary, a non-conjugated polyene (a4), by using an aliphatic hydrocarbon as a polymerization solvent, in the presence of a metallocene catalyst according to the present invention, the metallocene catalyst containing a transition metal compound wherein $R^{13}$ and $R^{14}$ bonding to $Y^1$ in the aforementioned general formula [A1] are preferably a phenyl group, or a phenyl group substituted by an alkyl or halogen group, and $R^7$ and $R^{10}$ preferably contain an alkyl substituent.

When the concentration of the ethylene/α-olefin/non-conjugated polyene copolymer in the polymerization solvent exceeds the above range, the viscosity of the polymerization solution too high to be stirred uniformly may cause a difficulty in the polymerization reaction.

Examples of the polymerization solvent include aliphatic hydrocarbons and aromatic hydrocarbons. Specific examples thereof include aliphatic hydrocarbons, such as propane, butane, pentane, hexane, heptane, octane, decane, dodecane, and kerosene, alicyclic hydrocarbons, such as cyclopentane, cyclohexane, and methyl cyclopentane, aromatic hydrocarbons, such as benzene, toluene, and xylene, halogenated hydrocarbons, such as ethylene chloride, chlorobenzene, and dichloromethane, and they can be used singly or in combination of the two or more kinds. Olefins themselves can also be used as a solvent. Among them, hexane is preferable from the viewpoint of the separation and purification of the obtained ethylene/α-olefin/non-conjugated polyene copolymer.

Polymerization temperature is usually within a range from −50 to +200° C., preferably from 0 to +200° C., more preferably from +80 to +200° C., and a higher temperature (+80° C. or more) is preferable from the viewpoint of catalyst activity, copolymerization ability, and productivity, although depending on a molecular weight to be achieved and the polymerization activity of a metallocene catalyst system to be used.

Polymerization pressure is generally within a range from atmospheric pressure to 10 MPa gauge pressure, preferably from atmospheric pressure to 5 MPa gauge pressure, and polymerization reaction can be carried out by any one of batchwise, semi-continuous, and continuous methods. The polymerization can also be carried out in two or more steps under different reaction conditions. In the present invention, it is preferable to adopt, among them, a step of carrying out copolymerization by feeding monomers continuously into a reactor.

Reaction time (average residence time in the case that copolymerization is carried out continuously) varies depending on conditions such as catalyst concentration and polymerization temperature, but it is usually within a range from 0.5 minutes to 5 hours, preferably 5 minutes to 3 hours.

The molecular weight of the obtained ethylene/α-olefin/non-conjugated polyene copolymer can also be controlled by adding hydrogen in the polymerization system or by changing the polymerization temperature. It can also be controlled by the amount of the compound (b) to be used. Specific examples of the compound include triisobutylaluminum, methylaluminoxane, and diethyl zinc. When hydrogen is added, its amount is suitably with in a range from about 0.001 to about 100 NL per 1 kg of olefin.

The charged molar ratio of ethylene (a1) to the above α-olefin (a2), (ethylene (a1)/α-olefin (a2)), is preferably with in a range from 40/60 to 99.9/0.1, more preferably from 50/50 to 90/10, still more preferably from 55/45 to 85/15, and most preferably from 55/45 to 78/22.

The charged amount of the non-conjugated polyene (a3) is usually within a range from 0.07 to 10% by weight, preferably from 0.1% by weight to 8.0% by weight, more preferably from 0.5% by weight to 5.0% by weight, with respect to 100% by weight of the sum of ethylene (a1), α-olefin (a2), and non-conjugated polyene (a3) (amount of the total charged monomers).

(B) Organic Peroxide

The resin composition of the present invention includes organic peroxide (B).

Any organic peroxide that can act as a crosslinking agent for the ethylene/α-olefin/non-conjugated polyene copolymer (A) can be suitably used as the organic peroxide (B).

Specific examples of the organic peroxide (B) include dicumyl peroxide, di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, peroxybenzoate, p-chloroperoxybenzoate, 2,4-dichloroperoxybenzoate, tert-butylperoxybenzoate, tert-butylperoxyisopropylcarbonate, diacetyl peroxide, lauroyl peroxide, tert-butylcumyl peroxide, and the like.

From the view point of their reactivity, odor, and scorch stability, bi-functional organic peroxides having two intramolecular peroxide bonds (—O—O—) are preferable among them, such as 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, and in particular, 2,5-di-(tert-butylperoxy)hexane and 2,5-dimethyl-2,5-di-(tert-butylperoxy)hexane are most preferable.

The organic peroxide (B) can be used singly or in combination of two or more kinds.

The organic peroxide (B) is used preferably in an amount with in a range of 0.1 to 5 parts by mass, preferably 0.5 to 5 parts by mass, and more preferably 0.5 to 4 parts by mass, with respect to 100 parts by mass of the ethylene/α-olefin/non-conjugated polyene copolymer (A). The compounded amount of the organic peroxide (B) within the above range is suitable because shaped articles and crosslinked shaped articles obtained from the resin composition have no bloom on the surface thereof and the rubber shaped articles exhibit excellent crosslinking characteristics.

(C) Carbon Black

The resin composition of the present invention may include carbon black (C), as necessary. Examples of the carbon black (C) include various carbon blacks such as SRF, GPF, FEF, MAF, HAF, ISAF, SAF, FT, and MT, and surface treated carbon blacks which are these carbon blacks surface-treated with an agent such as a silane coupling agent.

The compounded amount of the carbon black (C) in the resin composition is not particularly limited as long as it is effective in the present invention, but is preferably 10 to 300 parts by mass, preferably 10 to 200 parts by mass, more preferably 10 to 120 parts by mass, still more preferably 10 to 100 parts by mass, with respect to 100 parts by mass of the ethylene/α-olefin/non-conjugated polyene copolymer (A).

The resin composition of the present invention containing such an amount of carbon black (C) is preferable because it can provide crosslinked shaped articles having improved mechanical properties such as tensile strength and abrasion resistance, increase the hardness thereof without impairing other physical properties thereof, and reduce the production cost thereof.

(D) Antioxidant

The resin composition of the present invention can contain an antioxidant (D), as necessary. When the resin composition of the present invention contains an antioxidant (D), it can prolong the life-time of products obtained therefrom. Antioxidants (D) which may be used are conventionally well-known antioxidants, for example, amine-based antioxidants, phenol-based antioxidants, and sulfur-based antioxidants.

Specific examples of the antioxidant (D) include aromatic-secondary-amine-based antioxidants such as phenylbutylamine and N,N-di-2-naphthyl-p-phenylenediamine, and 4,4'-bis(α,α-dimethylbenzyl)diphenylamine, amine-based antioxidants such as 2,2,4-trimethyl-1,2-dihydroquinoline polymer, phenol-based antioxidants such as dibutylhydroxytoluene and tetrakis[methylene(3,5-di-t-butyl-4-hydroxy)hydrocinnamate]methane; thioether antioxidants such as bis[2-methyl-4-(3-n-alkylthiopropionyloxy)-5-t-butylphenyl]sulfide; dithiocarbamate-based antioxidants such as nickel dibutyldithiocarbamate; zinc salts of 2-mercaptobenzoylimidazole and 2-mercaptobenzoimidazole; sulfur-based antioxidants such as dilaurylthiodipropionate and distearylthiodipropionate, and the like.

These antioxidants (D) can be used singly or in combination of two or more kinds.

The compounded amount of the antioxidant (D) in the resin composition of the present invention can be usually 5 parts by mass or less, preferably 0.5 to 5.0 parts by mass, more preferably 0.5 to 4.5 parts by mass, still more preferably about 0.5 to 4.0 parts by mass, with respect to 100 parts by mass of the ethylene/α-olefin/non-conjugated polyene copolymer (A).

Specifically, in a second resin composition described later which is suitably used for applications such as a turbocharger hose, the compounded amount of the antioxidant (D) is, for example, 0.5 to 5.0 parts by mass, preferably 0.5 to 4.5 parts by mass, more preferably 0.5 to 4.0 parts by mass, with respect to 100 parts by mass of the ethylene/α-olefin/non-conjugated polyene copolymer (A).

In a third resin composition described later which is suitably used for applications such as sealing materials and lamp seal packings, the content of the antioxidant (D) is usually 0 to 5 parts by mass, preferably 0.5 to 5.0 parts by mass, more preferably 0.5 to 4.5 parts by mass, still more preferably 0.5 to 4.0 parts by mass, with respect to 100 parts by mass of the ethylene/α-olefin/non-conjugated polyene copolymer (A).

In a fourth resin composition described later which is suitably used for applications such as sliding members and wiper blades, the compounded amount of the antioxidant (D) is usually 0 to 5 parts by mass, preferably 0.5 to 5.0 parts by mass, more preferably 0.5 to 4.5 parts by mass, still more preferably 0.5 to 4.0 parts by mass, with respect to 100 parts by mass of the ethylene/α-olefin/non-conjugated polyene copolymer (A).

In a fifth resin composition described later which is suitably used for applications such as water hoses, the compounded amount of the antioxidant (D) is, although not particularly limited as long as it is effective in the present invention, 5 parts by weight or less, preferably 0.5 to 5.0 parts by weight, more preferably 0.5 to 4.5 parts by weight, still more preferably 0.5 to 4.0 parts by weight, with respect to 100 parts by mass of ethylene/α-olefin/non-conjugated polyene copolymer (A).

The above ranges are preferable because shaped articles and crosslinked articles obtained from the resin composition of the invention have excellent heat aging resistance.

(E) Softening Agent

The resin composition of the present invention may contain a softening agent (E), as necessary. Agents known as components conventionally compounded in rubber, such as softening agents and processing aids can be widely used as the softening agent (E).

Specific examples of the agent include:

petroleum-based softening agents such as paraffin-based processed oils, naphthene-based processed oils, and aromatic processed oils;

softening materials based on synthesized oils;

cooligomer of ethylene and α-olefin;

paraffin wax;

liquid paraffin;

white oil;

petrolatum;

softening agents based on coal tar such as coal tar and coal tar pitch;

softening agents based on vegetable oils, such as castor oil, cotton oil, linseed oil, canola oil, coconut oil, palm oil, soya oil, groundnut oil, Japan wax, rosin, pine oil, dipentene, pine tar, and tall oil;

substitutes (factices), such as black substitute, white substitute, and candy substitute;

waxes, such as beeswax, carnauba wax, and lanolin;

fatty acids, fatty acid salts and esters, such as ricinoleic acid, palmitic acid, stearic acid, linoleic acid, lauric acid, myristic acid, barium stearate, calcium stearate, magnesium stearate, zinc stearate, and zinc laurate;

ester-based plasticizers, such as dioctyl phthalate, dioctyl adipate, and dioctyl sebacate;

coumarone-indene resin;

phenol-formaldehyde resin;

terpene-phenol resin;

polyterpene resin;

petroleum-based hydrocarbon resins, such as synthesized polyterpene resins, aromatic hydrocarbon resins, aliphatic hydrocarbon resins, aliphatic ring hydrocarbon resins, aliphatic/alicyclic petroleum resins, aliphatic/aromatic petroleum resins, hydrogenated modified alicyclic hydrocarbon resins, hydrogenated hydrocarbon resins, liquid polybutene, liquid polybutadiene, atactic polypropylene, and the like.

Among them, petroleum-based softening agents, phenol-formaldehyde resin, petroleum-based hydrocarbon resins are preferable, and petroleum-based softening agents, petroleum-based hydrocarbon resins are more preferable, and petroleum-based softening agents are particularly preferable.

Among the petroleum-based softening agents, preferable are petroleum-based processed oils, among which paraffin-based processed oils, naphthene-based processed oils, aromatic processed oils are more preferable, and paraffin-based processed oils are particularly preferable. Among the petroleum-based hydrocarbon resins, aliphatic ring hydrocarbon resins are preferable.

Among these softening agents, paraffin-based processed oils are particularly preferable.

These softening agents can be used singly or in combination of the two or more kinds.

In the resin composition of the present invention, the compounded amount of the softening agent (E) is not particularly limited as long as it achieves a desired hardness, but it can be usually less than 100 parts by mass and can be preferably 0 to 80 parts by mass, with respect to 100 parts by mass of the ethylene/α-olefin/non-conjugated polyene copolymer (A).

Specifically, for example in a second resin composition described later which is suitably used for applications such as a turbocharger hose, the content of the softening agent (E) is preferably less than 20 parts by mass, more preferably 0 to 19 parts by mass, still more preferably 0 to 10 parts by mass, still more preferably 0 to 5 parts by mass, and particularly preferably 0.1 to 5 parts by mass, with respect to 100 parts by mass of ethylene/α-olefin/non-conjugated polyene copolymer (A).

In a third resin composition described later which is suitably used for applications such as sealing materials and a lamp seal packings, the content of the softening agent (E) is usually within a range from 0 to 40 parts by mass, and is preferably 0 to 20 parts by mass, more preferably 0 to 10 parts by mass, still more preferably 0 to 5 parts by mass, and particularly preferably 0.1 to 5 parts by mass, with respect to 100 parts by mass of the ethylene/α-olefin/non-conjugated polyene copolymer (A).

In a fourth resin composition described later which is suitably used for applications such as sliding members and wiper blades, the content of the softening agent (E) is usually within a range from 5 to 50 parts by mass, and is preferably 10 to 50 parts by mass, more preferably 10 to 40 parts by mass, still preferably 10 to 30 parts, with respect to 100 parts by mass of the ethylene/α-olefin/non-conjugated polyene copolymer (A).

In a fifth resin composition described later which is suitably used for applications such as water hoses, the compounded softening agent (E) is usually in an amount of 80 parts by mass or less, preferably 0 to 80 parts by mass, more preferably 0 to 70 parts by mass, still more preferably 0 to 50 parts by mass, particularly preferably 0.1 to 50 parts by mass, with respect to 100 parts by mass of the ethylene/α-olefin/non-conjugated polyene copolymer (A).

(F) Crosslinking Aid

The resin composition of the present invention may contain a crosslinking aid (F), as necessary. In the resin composition of the present invention, the compounded amount of the crosslinking aid (F) is not particularly limited, but it is usually 0 to 4.0 parts by mass, and is preferably 0.1 to 4.0 parts by mass, more preferably 0 to 3.5 parts by mass, more preferably 0 to 3.0 parts by mass, still more preferably 0.1 to 3.0 parts by mass, with respect to 100 parts by mass of the ethylene/α-olefin/non-conjugated polyene copolymer (A).

It is also desirable that the compounded amount of the crosslinking aid (F) is preferably with in a range from 0.5 to 2 mols, more preferably approximately equimolar, with respect to 1 mol of the organic peroxide (B).

When a crosslinked shaped article is produced using a fifth resin composition described later using a mandrel made of a resin, a small amount of the crosslinking aid is preferably included in consideration of suppression of the oxidative deterioration of the resin mandrel and improvement of the mechanical properties the article. In this case, the compounded amount of the (F) crosslinking aid is usually 0 to 4.0 parts by mass, preferably 0.1 to 3.0 parts by mass in the fifth resin composition, with respect to 100 parts by mass of the ethylene/α-olefin/non-conjugated polyene copolymer (A).

Examples of the crosslinking aid (F) include: sulfur; quinonedioxime compounds such as p-quinonedioxime; (meth) acrylate compounds, such as polyfunctional monomers, such as trimethylolpropane triacrylate and polyethylene glycol dimethacrylate; allyl compounds such as diallylphthalate and triallyl cyanurate; maleimide compounds such as m-phenylene bismaleimide; divinylbenzene, and the like. The crosslinking aid (F) may be used singly or in combination of two or more kinds.

(G) White Filler

The resin composition of the present invention may include a white filler (G), as necessary. White fillers except for silica can be used as the white filler (G), and those conventionally known as fillers can be used without any particular limitation, except for a black filler such as carbon black and silica. Examples of the white filler (G) include inorganic fillers such as activated calcium carbonate, light calcium carbonate, heavy calcium carbonate, fine powdered talc, talc, fine powdered silicic acid, and clay. The white filler (G) may be used singly or in combination of two or more kinds. The white filler (G) is suitably compounded in a third resin composition described later which is suitably used for applications such as sealing materials or lamp seal packings.

When contained in the resin composition, the white filler (G) is used in an amount within a range from 10 to 250 parts by mass, preferably 20 to 200 parts by mass, more preferably from 30 to 150 parts by mass, with respect to 100 parts by mass of the ethylene/α-olefin/non-conjugated polyene copolymer (A). The white filler (G), when in a compounded amount within the above range, is preferable because a shaped article and a crosslinked shaped article obtained from the resin composition have excellent mechanical strength and heat resistance, and a sealing material obtained from the resin composition not only exhibits suitable mechanical properties as packings, but also is excellent in appearance and can be colored arbitrarily, as necessary. In addition, adjusting the type and compounded amount of the white filler (G) enables not only providing desired mechanical properties such as tensile strength, tear strength, and hardness, but also lowering the production cost of the crosslinked shaped article.

(H) Magnesium Oxide

The resin composition of the present invention contains (H) magnesium oxide, as necessary. When the resin composition of the present invention contains magnesium oxide, a crosslinked shaped article excellent in mechanical strength and heat aging resistance can be produced. In addition, the copolymer (A) according to the present invention is excellent in compatibility with magnesium oxide, and therefore, a crosslinked shaped article containing magnesium oxide can be suitably produced with a small amount of a crosslinking agent.

Examples of the magnesium oxide include, for example, powdered magnesium oxide used for industrial use. Examples of the magnesium oxide which can also be used include those surface-treated with a fatty acid (for example, stearic acid, hydroxystearic acid, higher fatty acid, alkali metal salt thereof), resin acid (for example, abietic acid), fatty acid amide, ester of fatty acid.

Examples of the magnesium oxide include KYOWAMAG® 150, KYOWAMAG® 30, MAGSARAT® 30 (surface treated product), from Kyowa Chemical Industry Co., Ltd.

The magnesium oxide (H) in the resin composition does not have any particular limitation in its compounded amount as long as it exerts the effect of the present invention, but it is preferably compounded in a material such as a fifth resin composition described later which is suitably used for applications such as water hoses, and the compounding amount thereof is usually 0.1 to 10 parts by mass, preferably 0.5 to 8 parts by mass, more preferably 1 to 8 parts by mass, with respect to 100 parts by mass of the ethylene/α-olefin/non-conjugated polyene copolymer (A). When the compounded amount of magnesium oxide is within this range, a crosslinked shaped article particularly excellent in mechanical strength and heat aging resistance can be produced.

(I) Zinc Oxide

The resin composition of the present invention may contain zinc oxide (I) as a filler, but when it contains magnesium oxide (H), it desirably is substantially free from zinc oxide (I), and in particular in a fifth resin composition described later, it is preferably substantially free from zinc oxide (I). When a crosslinked shaped article, particularly a heat-resistant hose, is produced through crosslinking using an organic peroxide, with zinc oxide included in the composition, the zinc oxide becomes a zinc salt and will react with acid in cooling water flowing through the hose, to form an insoluble component, potentially causing clogging of the radiator.

In the present invention, the amount of zinc oxide can be measured as the total amount of zinc contained in the resin composition in accordance with the Rubber products-Determination of zinc contents-EDTA titrimetric method of JIS K 6232 (1998). The expression "is substantially free from zinc oxide" means that when the total amount of zinc (total zinc amount) in the resin composition of the present invention detected by the above JIS method is converted to the amount of zinc oxide, the content of the zinc oxide is less than 0.01 parts by mass with respect to 100 parts by mass of the ethylene/α-olefin/non-conjugated polyene copolymer (A).

Similarly, the amount of zinc oxide in the crosslinked article can also be measured as the total amount of zinc contained in the crosslinked product in accordance with the Rubber products-Determination of zinc contents-EDTA titrimetric method of JIS K 6232 (1998). In the present invention, it is preferable that the crosslinked article is substantially free from zinc component derived from zinc oxide among others. The amount of zinc in the crosslinked article detected by the above JIS method is usually less than 0.01 parts by mass with respect to 100 parts by mass of the crosslinked article.

In the present invention, "zinc oxide" refers to a solid solution of metallic zinc and zinc oxide in a ratio of 1:1, and zinc contained in rubber compositions or crosslinked articles is usually attributed to that compounded as zinc oxide.

(J) Additional Component

The resin composition of the present invention may contain an additional component (J) depending on its desired properties within the scope not to impair the object of the present invention.

Examples of the additional component (J) include various additive components conventionally added to the rubber composition such as a filler, a foaming agent, an antioxidant, a processing aid, surfactants, and a weathering agent. The resin composition of the present invention may contain a resin component other than the ethylene/α-olefin/non-conjugated polyene copolymer (A) as the additional component (J), as necessary.

Examples of the filler include inorganic fillers such as silica, activated calcium carbonate, light calcium carbonate, heavy calcium carbonate, fine powdered talc, talc, fine powder silicic acid, and clay. These fillers can be in an amount of not more than 300 parts by mass, preferably from 10 to 300 parts by mass, more preferably from about 10 to 200 parts by mass, with respect to 100 parts by mass of the ethylene/α-olefin/non-conjugated polyene copolymer (A). When the resin composition of the present invention contains such a filler, a crosslinked shaped article can be obtained which has improved mechanical properties, such as tensile strength, tear strength, and abrasion resistance, and increased hardness without impairing its other physical properties, and which enables reducing its manufacturing cost.

The resin composition according to the present invention preferably contains an antioxidant from the viewpoint of capability to prolong its material life. Examples of the antioxidant include:

stabilizing agents based on aromatic secondary amines, such as phenylnaphthylamine, 4,4'-(α,α-dimethylbenzyl)diphenylamine, N,N'-di-2-naphthyl-p-phenylenediamine;

stabilizing agents based on phenol, such as 2,6-di-t-butyl-4-methylphenol, tetrakis-[methylene-3-(3',5'-di-t-butyl-4'-hydroxyphenyl)propionate]methane;

stabilizing agent based on thioether such as bis[2-methyl-4-(3-n-alkylthiopropionyloxy)-5-t-butylphenyl]sulfide;

stabilizing agent based on benzoimidazole such as 2-mercaptobenzoimidazole;

stabilizing agent based on dithiocarbamates such as nickel dibutyldithiocarbamate;

stabilizing agent based on quinoline such as a polymerized product of 2,2,4-trimethyl-1,2-dihydroquinoline, and the like. These may be used alone or in combination of two or more kinds.

The antioxidant can be used in an amount of, for example, 5 parts by mass or less, preferably 3 parts by mass or less, with respect to 100 parts by mass of the ethylene/α-olefin/non-conjugated polyene copolymer (A).

The resin composition according to the present invention also can appropriately contain, if necessary, various additives that can be compounded in known rubber compositions.

The resin composition according to the present invention may contain a surfactant. Examples of the surfactant include amines, such as di-n-butylamine, dicyclohexylamine, monoethanolamine, triethanolamine, "Acting B" (manufactured by YOSHITOMI PHARMACEUTICAL INDUSTRIES, LTD.), "Acting SL" (manufactured by YOSHITOMI PHARMACEUTICAL INDUSTRIES, LTD.), polyethylene glycol, diethylene glycol, lecithin, triallyltrimellitate, and compounds of zinc aliphatic or aromatic carboxylate (example; "Struktol activator 73", "Struktol IB 531", and "Struktol FA 541", manufactured by Schill+Seilacher GmbH), "ZEONET ZP" (manufactured by ZEON CORPORATION), octadecyltrimethylammonium bromide, synthesized hydrotalcite, and special quaternary ammonium compounds (example; "Arquad 2HF" (manufactured by LION AKZO Co., Ltd.), and the like.

When the resin composition of the present invention contains a surfactant, the compounded amount of the surfactant is, for example, about 0.2 to 10 parts by mass, preferably about 0.3 to 5 parts by mass, more preferably about 0.5 to 4 parts by mass, with respect to 100 parts by mass of the ethylene/α-olefin/non-conjugated polyene copolymer (A). The surfactant can be appropriately selected depending on its use, and it can be used singly or in combination of the two or more kinds.

The resin composition of the present invention may contain a pseudo-gel inhibitor. Examples of the pseudo-gel inhibitor include, for example, "NHM-007" (manufactured by Mitsui Chemicals, Inc.).

When the resin composition of the present invention contains a pseudo-gel inhibitor, the compounded amount thereof is within a range usually from 0.1 to 15 parts by mass, and preferably from 0.5 to 12 parts by mass, more preferably 1.0 to 10 parts by mass, with respect to 100 parts by mass of the ethylene/α-olefin/non-conjugated polyene copolymer (A).

The resin composition of the present invention may further contain an additional additive, as necessary. Examples of the additional additive include agents such as heat stabilizers, weathering stabilizers, antistatic agents, colorants, lubricants, and thickeners.

The resin composition of the present invention may contain an additional resin component other than the ethylene/α-olefin/non-conjugated polyene copolymer (A), as necessary. Examples of the additional resin component include, but are not particularly limited to, polyolefin resins.

The resin composition of the present invention containing a polyolefin resin enables controlling the hardness of products from the composition and decreasing its compound viscosity at processing temperature, resulting in further improvement of its processability. It is also preferable because it can be treated as a thermoplastic elastomer, resulting in its easier handling property and more choices of kneading methodology.

The polyolefin resin having a number-average molecular weight, as measured by GPC, of 10,000 or more in terms of polystyrene standard is suitably used.

Examples of the polyolefin resin include an α-olefin homopolymer and an α-olefin copolymer. Examples of the α-olefin homopolymer include polyethylene, polypropylene, and the like, and examples of the α-olefin copolymer include a copolymer of ethylene/α-olefin having 3 to 20 carbon atoms and a copolymer of ethylene/α-olefin having 3 to 20 carbon atoms/non-conjugated polyene (which is, however, different from the ethylene/α-olefin/non-conjugated polyene copolymer according to the present invention). Examples of the copolymer of ethylene/α-olefin having 3 to 20 carbon atoms include ethylene-propylene rubber (EPR), propylene-ethylene rubber (PER), ethylene-butene rubber (EBR), ethylene-octene rubber (EOR), and the like.

Examples of the copolymer of ethylene/α-olefin having 3 to carbon atoms/non-conjugated polyene (which is, however, different from the ethylene/α-olefin/non-conjugated polyene copolymer according to the invention) include ethylene-propylene terpolymer (EPT), ethylene-butene terpolymer (EBT), and the like.

Among these polyolefin resins, polyethylene, ethylene/α-olefin copolymer, and polypropylene are preferable.

The polyolefin resins can be used singly or in combination of the two or more kinds.

When the resin composition of the present invention contains the polyolefin resin, the content of the polyolefin resin is within a range, for example, from 1 to 100 parts by mass, preferably from 5 to 80 parts by mass, more preferably from 10 to 50 parts by mass, with respect to 100 parts by mass of the ethylene/α-olefin/non-conjugated polyene copolymer (A). The resin composition within the above ranges enables controlling the hardness of products from the composition and decreasing its compound viscosity at processing temperature, resulting in further improvement of its processability. It is also preferable because it can be treated as a thermoplastic elastomer, resulting in its easier handling property and more choices of kneading methodology.

<Method for Preparing Resin Composition>

The resin composition of the present invention can be prepared by compounding the respective components of the above-mentioned resin composition, that is, the ethylene/α-olefin/non-conjugated polyene copolymer (A) and the organic peroxide (B), both of which are essential components, and as necessary, one or more selected from the group consisting of the carbon black (C), the antioxidant (D), the softener (E), the crosslinking aid (F), the white filler (G), and the magnesium oxide (H), and an additional component (J).

Methods of preparing the resin composition include, but are not particularly limited to, a method, such as a method of mixing each component contained in the resin composition by using a conventionally known kneading machine such as a mixer, a kneader, and a roll, and a method of preparing a solution in which each component contained in the resin composition is dissolved or dispersed, followed by removing the solvent.

<First Resin Composition and Crosslinked Shaped Article>

A first resin composition of the present invention contains 100 parts by mass of the ethylene/α-olefin/non-conjugated polyene copolymer (A) and 0.1 to 5 parts by mass of the organic peroxide (B). The content of the organic peroxide (B) which is preferable for the ethylene/α-olefin/non-conjugated polyene copolymer (A) is as described above in the description on the organic peroxide (B).

It is preferable that the first resin composition of the present invention contains an ethylene/α-olefin/non-conjugated polyene copolymer (A) which preferably has an intrinsic viscosity [η] of 1.0 to 4.0 dl/g measured in decalin at 135° C. It is also preferable that the nonconjugated polyene (a3) constituting the ethylene/α-olefin/non-conjugated polyene copolymer (A) contains 5-vinyl-2-norbornene (VNB).

The first resin composition of the present invention exhibits excellent crosslinking properties owing to containing the above-mentioned ethylene/α-olefin/non-conjugated polyene copolymer (A) and the organic peroxide (B), and it can be suitably used for producing a crosslinked shaped article which can be used for various applications.

The first resin composition of the present invention may contain a component other than the ethylene/α-olefin/non-conjugated polyene copolymer (A) and the organic peroxide (B) without any limitation, depending on the desired properties of the resin composition.

Examples of the component other than the ethylene/α-olefin/non-conjugated polyene copolymer (A) and the organic peroxide (B) include the respective above-mentioned components, and the preferable compounded amounts of which are as in the description on the respective components.

Production of Crosslinked Shaped Article

The crosslinked shaped article composed of the first resin composition of the present invention can be obtained through shaping as necessary, and crosslinking the first resin composition. The crosslinking may or may not use molds. When molds are not used, the first resin composition is normally shaped and crosslinked continuously.

Processes of crosslinking the resin composition include, for example: (a) a process of preforming the resin composition into a desired shape by a molding method such as extrusion molding, press molding, and injection molding, and by roll processing, and heating the composition simultaneously with preforming it or after introducing it into a crosslinking tub; and (b) a process of preforming the resin composition in the same manner as described above and then irradiating it with a radiation such as an electron beam.

In the process (a), heating triggers a crosslinking reaction by the crosslinking agent (organic peroxide) in the resin composition, which reaction yields a crosslinked product. In the process (b), the electron beam triggers a crosslinking reaction, which yields a crosslinked product. In the process (b), the preformed resin composition is usually irradiated with an electron beam having an energy of 0.1 to 10 MeV so that the dose absorbed into the resin composition may be usually 0.5 to 36 Mrads, preferably 0.5 to 20 Mrads, and more preferably 1 to 10 Mrads.

•Application

The first resin composition of the present invention and crosslinked shaped articles obtained from the resin composition can be used for various applications, and are used, without any limitation, in conventional applications as a composition or crosslinked shaped article having rubber properties.

<Second Resin Composition and Crosslinked Shaped Article>

A second resin composition of the present invention contains, among the above-mentioned components:

(A) 100 parts by mass of the ethylene/α-olefin/non-conjugated polyene copolymer;
(B) 0.1 to 5 parts by mass of the organic peroxide,
(C) 10 to 300 parts by mass of the carbon black; and
(D) 0.5 to 5 parts by mass of the antioxidant.

In other words, the second resin composition of the present invention is a first resin composition, which further contains:
(C) 10 to 300 parts by mass of the carbon black; and
(D) 0.5 to 5 parts by mass of the antioxidant,
with respect to 100 parts by mass of the ethylene/α-olefin/non-conjugated polyene copolymer (A).

Such a second resin composition of the present invention preferably contains a softening agent (E) in an amount of less than 20 parts by mass with respect to 100 parts by mass of the ethylene/α-olefin/non-conjugated polyene copolymer (A), and also preferably contains 0 to 4 parts by mass of a crosslinking aid (F), with respect to 100 parts by mass of the ethylene/α-olefin/non-conjugated polyene copolymer (A). The softening agent (E) and the crosslinking aid (F) may be used singly, or in a combination thereof.

The second resin composition of the present invention also can be prepared through compounding, according to its desired properties, the ethylene/α-olefin/non-conjugated polyene copolymer (A), the organic peroxide (B), carbon black (C), and the antioxidant (D), and components to be compounded as necessary, that is, the softener (E), the crosslinking aid (F), and the additional component described above. The compounded amount of these components is as described above in the description on the respective components.

Crosslinked shaped articles composed of the second resin composition can be produced through crosslinking and shaping in the same manner as in the first resin composition described above.

•Application

The second resin composition of the present invention is a resin composition suitable for producing crosslinked shaped articles.

The second resin composition of the present invention enables producing crosslinked shaped articles excellent in heat aging resistance and fatigue resistance. Crosslinked shaped articles obtained by shaping and crosslinking the second resin composition of the present invention exhibit excellent heat aging resistance and fatigue resistance and can be suitably used also for use at high temperatures, and for example, as horses for motorbikes, industrial machinery, construction machinery, agricultural machinery, and particularly as turbocharger hoses among others.

The second resin composition and its crosslinked shaped article of the present invention are suitably used for automotive interior and exterior parts and applications requiring heat resistance, and for example, hoses requiring heat resistance such as turbocharger hoses, brake reservoir hoses, and radiator hoses. Although the hose of the present invention does not have any particular limitation in its use, it is preferably a hose used in anyone of applications for automobiles, motorbikes, industrial machinery, construction machinery, and agricultural machinery, and is more preferably a hose used as a turbocharger hose for automobiles.

The second resin composition of the present invention is highly excellent in low temperature characteristics, mechanical properties, moldability such as extrusion moldability, press formability, and injection moldability, and roll processability, and whereby it can suitably yield a shaped article excellent in properties, such as heat aging resistance, low temperature characteristics (flexibility at low temperature, rubber elasticity, etc.), and mechanical properties.

The second resin composition of the present invention contains the ethylene/α-olefin/non-conjugated polyene copolymer (A) described above, whereby also enabling producing a crosslinked product excellent in moldability and crosslinking property and excellent in thermal stability, and therefore, crosslinked shaped articles obtained from the second resin composition of the present invention can be suitably used in applications in which their long-term use under high temperature is expected. In addition, crosslinked shaped articles obtained from the second resin composition of the present invention are superior in flexural fatigue resistance to conventionally known acrylic rubbers.

The second resin composition of the present invention and the crosslinked shaped article obtained from the composition can be used for various applications. Specifically, they are suitably used for rubber for tires, o-rings, rolls for industrial use, packings (for example, capacitor packings), gaskets, belts (for example, heat-insulating belt, belt for copying machines, and conveyance belt), hoses such as hoses for cars (for examples, turbocharger hose, water hose, brake reservoir hose, radiator hose, and air hose), anti-vibration rubbers, anti-vibration or vibration-controlling (damping) materials (for example, engine mount and motor mount), muffler hangers, sponges (for example, weather strip sponge, heat-insulating sponge, protection sponge, and microfoam sponge), cables (ignition cable, cabtire cable, and high tension cable), materials for wire cover (materials for covering high voltage wire, low voltage wire, and wire used in vessels), glass run channels, colored skin materials, paper-feeding rolls, roofing sheets, and the like.

The second resin composition and its crosslinked shaped article of the present invention are suitably used for automotive interior and exterior parts and applications requiring heat resistance among others, and more suitably used in applications for hoses requiring heat resistance, which specifically include the turbocharger hose, the brake reservoir hose, and the radiator hose.

The hose of the present invention has a layer formed through crosslinking the above-described second resin composition of the present invention. In other words, the hose of the present invention may be a crosslinked shaped article the whole of which is formed through crosslinking the second resin composition of the present invention, or may have two or more layers, at least one of which is a layer formed through crosslinking the second resin composition of the present invention.

Although the hose of the present invention does not have any particular limitation in its use, it is preferably a hose used in anyone of applications for automobiles, motorbikes, industrial machinery, construction machinery, and agricultural machinery, and more preferably a turbocharger hose used for automobiles.

The turbocharger hose of the present invention preferably has a layered structure made of composite material having not only a layer formed through crosslinking the resin composition of the present invention, but also a layer made of another material, in order to withstand severe use conditions under high temperature and high pressure. When the turbocharger hose has a plurality of layers, only one of the layers may be a layer formed through crosslinking the second resin composition of the present invention, or two or more of the layers may be layers formed through crosslinking the second resin composition of the present invention.

Examples of layers constituting the turbocharger hose of the present invention other than the layer formed through crosslinking the second resin composition of the present invention include, for example, a fluororubber layer, a silicone elastomer layer, and a reinforcing yarn layer. When the turbocharger hose has such a layer, it is preferable because it has a combination of heat resistance, durability, oil resistance, and stretchability.

Processes of producing the turbocharger hose of the present invention does not have any particular limitation, and they include, for example, a method of crosslinking a layer made of at least the second resin composition of the present invention, which method shapes an uncured layer-structured turbocharger hose by using extrusion molding, coextrusion molding, winding of a sheet material, or a combination thereof, and then heats it by using steam among others. The uncured turbocharger hose is preferably highly capable of retaining its shape without shrinking or deformation. Since the second resin composition of the present invention can be shaped in an uncrosslinked state and retain its shape, depending on its compounding, it is suitably used as a material for forming at least one layer of the turbocharger hose.

The turbocharger hose of the present invention is particularly excellent in fatigue resistance since it has a layer formed through crosslinking the second resin composition of the present invention.

<Third Resin Composition and Crosslinked Shaped Articles>

A third resin composition of the present invention is a resin composition including:
(A) 100 parts by mass of the ethylene/α-olefin/non-conjugated polyene copolymer;
(B) 0.1 to 2.0 parts by mass of the organic peroxide; and
(G) 10 to 250 parts by mass of the white filler (excluding silica),
among the aforementioned components.

In other words, the third resin composition of the present invention is a first resin composition, which further contains:
(G) 10 to 250 parts by mass of the white filler (excluding silica),
with respect to 100 parts by mass of the ethylene/α-olefin/non-conjugated polyene copolymer (A).

Such a third resin composition preferably contains 0 to 40 parts by mass of the softening agent (E) with respect to 100 parts by mass of the ethylene/α-olefin/non-conjugated polyene copolymer (A), and preferably also contains 0 to 5 parts by mass of the antioxidant (D), and 0 to 4 parts by mass of a crosslinking aid (F), with respect to 100 parts by mass of the ethylene/α-olefin/non-conjugated polyene copolymer (A). The third resin composition of the present invention may contain the softening agent (E), the antioxidant (D) and the crosslinking aid (F) singly, or in combination thereof.

The third resin composition of the present invention also can be prepared, according to its desired properties, through compounding the ethylene/α-olefin/non-conjugated polyene copolymer (A), the organic peroxide (B), and the white filler (G), and components to be compounded as necessary, that is, the softening agent (E), the antioxidant (D), and the crosslinking aid (F), and the additional component described above. The compounded amount of these components is as described above in the description on the respective components.

Crosslinked shaped articles composed of the third resin composition can be produced through crosslinking and shaping in the same manner as in the first resin composition described above.

• Application

The third resin composition of the present invention is a resin composition suitable for producing crosslinked shaped articles.

The third resin composition of the present invention is highly excellent in low temperature characteristics, mechanical properties, moldability such as extrusion moldability, press formability, and injection moldability, and roll processability, and whereby the third resin composition of the present invention can suitably yield shaped articles excellent in properties, such as heat aging resistance, low temperature characteristics (flexibility at low temperature, rubber elasticity, etc.), mechanical properties, and the like.

The third resin composition of the present invention contains the ethylene/α-olefin/non-conjugated polyene copolymer (A) described above, and whereby also enabling producing crosslinked products excellent in moldability and crosslinking property, and excellent in thermal stability, and therefore, crosslinked shaped articles obtained from the third resin composition of the present invention can be suitably used in applications in which their long-term use under high temperature is expected. Further, the third resin composition of the present invention exhibits sufficient crosslinked physical properties owing to the excellent crosslinking property of the composition even when it contains a reduced compounded amount of the peroxide-based crosslinking agent in comparison with conventionally known rubber compositions.

The third resin composition of the present invention and the crosslinked shaped article obtained from the composition can be used for various applications. Specifically, they are suitably used for rubber for tires, o-rings, rolls for industrial use, packings (for example, lamp seal packing, meter packing, condenser packing), gaskets, belts (for example, heat-insulating belt, belt for copying machines, and conveyance belt), hoses such as hoses for cars (for examples, turbocharger hose, water hose, brake reservoir hose, radiator hose, and air hose), anti-vibration rubbers, anti-vibration or vibration-controlling materials (for example, engine mount and motor mount), muffler hangers, sponges (for example, weather strip sponge, heat-insulating sponge, protection sponge, and microfoam sponge), cables (ignition cable, cabtire cable, and high tension cable), materials for wire cover (materials for covering high voltage wire, low voltage wire, and wire used in ships), glass run channels, colored skin materials, paper-feeding rolls, roofing sheets, and the like.

The third resin composition and its crosslinked shaped article of the present invention are suitably used for automotive interior and exterior parts and applications requiring heat resistance among others, and more suitably used in applications for sealing materials/packings, for example, applications for sealing materials and packings for automobiles, motorbikes, industrial machinery, construction machinery, agricultural machinery, and specifically, particularly suitably used in applications for sealing materials/packings such as lamp seal packings and packings for meters for automobiles and motorbikes.

The sealing material and packing according to the present invention are excellent not only in mechanical properties as a sealing material/packing, but also in heat resistance and heat aging resistance, and unlikely to emit a volatile component even under high temperature conditions, and when applied to an application to be used together with a transparent substrate such as a lamp seal packing and a packing for meters, it can exhibit excellent fogging resistance.

<Fourth Resin Composition and Crosslinked Shaped Article>

A fourth resin composition of the present invention is a resin composition which contains:
(A) 100 parts by mass of the ethylene/α-olefin/non-conjugated polyene copolymer;
(B) 0.1 to 5 parts by mass of the organic peroxide;
(C) 10 to 300 parts by mass of the carbon black;
(E) 10 to 50 parts by mass of the softening agent; and
(F) 0.1 to 4 parts by mass of the crosslinking aid, among the above-described components.

In other words, the fourth resin composition of the present invention is a first resin composition, which further contains:
(C) 10 to 300 parts by mass of the carbon black;
(E) 10 to 50 parts by mass of the softening agent; and
(F) 0.1 to 4 parts by mass of the crosslinking aid,
in terms of 100 parts by mass of the ethylene/α-olefin/non-conjugated polyene copolymer (A).

Such a fourth resin composition preferably contains 0 to parts by mass of the antioxidant (D) with respect to 100 parts by mass of the ethylene/α-olefin/non-conjugated polyene copolymer (A).

The fourth resin composition of the present invention also can be prepared through compounding, according to its desired properties, the ethylene/α-olefin/non-conjugated polyene copolymer (A), the organic peroxide (B), carbon black (C), the softening agent (E), the crosslinking aid (F), and components to be compounded as necessary, that is, an antioxidant (D) and the additional component described above. The compounded amount of these components is as described above in the description on the respective components.

A crosslinked shaped article composed of the fourth resin composition of the present invention can be produced through crosslinking and shaping in the same manner as in the first resin composition described above.

•Application

The fourth resin composition of the present invention is a resin composition suitable for producing crosslinked shaped articles.

The fourth resin composition of the present invention is highly excellent in low temperature characteristics, mechanical properties, moldability such as extrusion moldability, press formability, and injection moldability, and roll processability, and whereby it can suitably yield a shaped article and a crosslinked shaped article excellent in properties, such as heat aging resistance, weather resistance, fatigue resistance, impact resilience, abrasion resistance, low temperature characteristics (flexibility at low temperature, rubber elasticity, etc.), and mechanical properties.

The fourth resin composition of the present invention contains the ethylene/α-olefin/non-conjugated polyene copolymer (A) described above, whereby also enabling producing a crosslinked article excellent not only in moldability and crosslinking property but also in properties such as thermal stability and heat aging resistance, and therefore, crosslinked shaped articles obtained from the fourth resin composition of the present invention can be suitably used in applications in which their long-term use under high temperature is expected. In addition, crosslinked shaped articles obtained from the fourth resin composition of the present invention are well balanced between abrasion resistance and flexural fatigue resistance, causing no unexpectedly deteriorated flexural fatigue resistance.

The fourth resin composition of the present invention and the crosslinked shaped article obtained from the composition can be used in various applications. Specifically, they are suitably used for sliding members, wiper blades, rubber for tires, o-rings, industrial rolls, packings (for example, lamp seal packing, meter packing, and condenser packing), gaskets, belts (for example, heat-insulating belt, belt for copying machines, and conveyance belt), horses such as hoses for cars (for example, a turbo charger hose, a water hose, a brake reservoir hose, a radiator hose, an air hose), anti-vibration rubbers, anti-vibration or vibration-controlling materials (for example, engine mount and motor mount), muffler hangers, sponges (for example, weatherstrip sponge, heat insulating sponge, protective sponge, and microfoam sponge), cables (ignition cable, cabtire cable, high tension cable), materials for wire cover (materials for covering high voltage wire, low voltage wire, and wire used in vessels), glass run channels, colored skin materials, paper-feeding rolls, roofing sheets, and the like.

The fourth resin composition and its crosslinked shaped article of the present invention are suitably used for automotive interior and exterior parts, applications requiring heat resistance and slidability among others, and more suitably used for applications such as various sliding members and wiper blades, and still more suitably used for a sliding member in various applications, such as automobiles, motorcycles, other vehicles, industrial machinery, construction machinery, and agricultural machinery, and applications of wiper blades of vehicles, such as automobiles, motorbikes, trains, aircrafts, and ships.

The sliding member and the wiper blade according to the present invention is excellent not only in mechanical properties, but also in heat aging resistance and weather resistance, and moreover, excellent in characteristics such as fatigue resistance, impact resilience, and abrasion resistance, enabling long-term use even under high temperature conditions.

<Fifth Resin Composition and Crosslinked Shaped Article>

The fifth resin composition of the present invention is a resin composition which contains, among the aforementioned components:
(A) 100 parts by mass of the ethylene/α-olefin/non-conjugated polyene copolymer;
(B) 0.1 to 5 parts by mass of the organic peroxide; and
(H) 0.1 to 10 parts by mass of magnesium oxide,
wherein the resin composition is substantially free from zinc oxide (I).

In other words, the fifth resin composition of the present invention is a first resin composition, which contains:
(H) 0.1 to 10 parts by mass of magnesium oxide with respect to 100 parts by mass of the ethylene/α-olefin/non-conjugated polyene copolymer (A),
wherein the resin composition is substantially free from zinc oxide (I).

Such a fifth resin composition of the present invention preferably also contains the antioxidant (D) in an amount of 5 parts by mass or less with respect to 100 parts by mass of the ethylene/α-olefin/non-conjugated polyene copolymer (A), and preferably also contains the softening agent (E) in an amount of 80 parts by mass or less with respect to 100 parts by mass of the ethylene/α-olefin/non-conjugated polyene copolymer (A), and further, preferably also contains the crosslinking aid (F) in an amount of 4 parts by mass or less with respect to 100 parts by mass of the ethylene/α-olefin/non-conjugated polyene copolymer (A). The fifth resin composition of the present invention may contain the antioxidant (D), the softening agent (E), and the crosslinking aid (F) singly, or in combination thereof.

The fifth resin composition of the present invention also can be prepared, according to its desired properties, through compounding the ethylene/α-olefin/non-conjugated polyene copolymer (A), the organic peroxide (B), and magnesium oxide (H), and components to be compounded as necessary, that is, the antioxidant (D), the softening agent (E), the crosslinking aid (F), and an additional component (I) other than zinc oxide. The compounded amount of these components is as described above in the description of the respective components.

In the fifth resin composition of the present invention, elongation at break of obtained crosslinked shaped articles is unlikely to lower in comparison with conventionally known α-olefin/polyene copolymers even when the copolymerized amount of nonconjugated polyene is small, and therefore, post-crosslinking can be suitably prevented by reducing the polyene copolymerization amount. Even when the compounded amount of the crosslinking agent is reduced, the elongation at break is unlikely to lower.

•Crosslinked Article

A crosslinked shaped article containing the fifth resin composition of the present invention can be obtained through shaping as necessary, and crosslinking the fifth resin composition of the present invention. The crosslinking may or may not use molds. When molds are not used, the resin composition is normally shaped and crosslinked continuously.

Processes of crosslinking the fifth resin composition include, similarly to the methods of crosslinking the first to fourth resin compositions, for example, following methods (a) and (b) can be exemplified; (a) a process of preforming the resin composition into a desired shape by a molding method such as extrusion molding, press molding, and injection molding, or roll processing, and heating the composition simultaneously with preforming it or after introducing it into a crosslinking tub, (b) a process of preforming the resin composition in the same manner as described above and then irradiating it with a radiation such as an electron beam.

In the process (a), heating triggers a crosslinking reaction by the crosslinking agent (organic peroxide) in the resin composition, which reaction yields a crosslinked product. In the process (b), the electron beam triggers a crosslinking reaction, which yields a crosslinked product. In the process (b), the preformed resin composition is usually irradiated with an electron beam having an energy of 0.1 to 10 MeV so that the dose absorbed into the resin composition may be usually 0.5 to 36 Mrads, preferably 0.5 to 20 Mrads, and more preferably 1 to 10 Mrads.

(Crosslinked Shaped Article and Manufacturing Method Thereof Using Mandrel)

The crosslinked shaped article composed of the fifth resin composition of the present invention also can be produced in a step of crosslinking and shaping the fifth resin composition of the present invention by using a mandrel. The crosslinking and shaping is as described above.

Examples of the material of the mandrel include, but are not particularly limited to, metal (iron) and resin, but a resin mandrel having heat resistance is preferable from the viewpoint of its light weight and in that, even when it is used, oxidative deterioration on its surface (roughed surface) is unlikely to occur, because the fifth resin composition of the present invention can be suitably crosslinked with a small amount of a crosslinking agent, causing the transition of an only small amount of crosslinking agent to the mandrel.

Examples of the resin mandrel include those of poly 4-methylpentene resin, nylon, EPDM, and the like, but from the viewpoint of durability against the crosslinking agent and heat resistance, a mandrel of poly 4-methylpentene resin is preferable. The mandrel made of poly 4-methylpentene resin is also preferable in that it is easy to pull out from a rubber hose after crosslinking because it has a low surface tension next to fluororesin.

The shape of the mandrel depends on the shape of a crosslinked shaped article to be targeted, but in general, it has a pipe-like shape or a rod-like shape. The mandrel also may be provided with an incorporated core wire, such as a reinforcing wire, a piano wire, and a rope made of a fiber such as a polyester yarn and a tinsel fiber.

Examples of crosslinked shaped articles produced using the mandrel include a rubber hose such as a water hose, a steam hose, and an air hose. Examples of the rubber hose includes various type of hoses such as straight-pipe-like rubber hoses and curved-pipe-like rubber hoses curved two- or three-dimensionally, and they are usually formed by using a mandrel having a straight rod shape or a curved shape which conforms to the shape of a rubber hose to be formed. It is also preferable that the rubber hose has a layer obtained from a crosslinked shaped article.

General methods of producing a curved-pipe-like rubber hose include, for example, a method in which a mandrel is formed in advance into a predetermined curved shape conforming to the shape of a product, and into the mandrel is inserted a non-crosslinked or semi-crosslinked rubber hose formed into a linear shape from a resin composition, to be crosslinked to obtain a predetermined curved shape. The curved-pipe-like rubber hose formed into a curved shape is taken out from the mandrel as a product.

In addition to the above method, methods of producing a rubber hose using a mandrel made of poly 4-methylpentene resin include a method in which a poly 4-methylpentene resin mandrel having heat-resistance as a hose core material is extrusion-coated with an uncrosslinked rubber containing a crosslinking agent, and then, the outer periphery of the resin-coated mandrel is further covered with a poly 4-methylpentene resin, followed by crosslinking the rubber, peeling off the covering material, and removing the core material, to produce a rubber hose. The covering layer made of the used poly 4-methylpentene resin is peeled and pulverized to be used again for extrusion coating, and the mandrel made of poly 4-methylpentene resin taken out from the rubber hose is again used repeatedly as a core material.

The fifth resin composition of the present invention contains a small compounded amount of the crosslinking agent and is substantially free from crosslinking aid, and therefore, the oxidation deterioration of the mandrel is reduced. Therefore, the environmental loading of the mandrel can be greatly reduced since the frequency of replacing it can be reduced.

•Application

The fifth resin composition of the present invention is a resin composition suitable for producing crosslinked shaped articles.

The fifth resin composition of the present invention is very excellent not only in formabilities such as mechanical properties, extrusion moldability, press formability, and injection moldability, but also in roll processability, and the fifth resin composition of the present invention can suitably provide shaped articles excellent in mechanical properties such as mechanical strength and heat aging resistance.

The fifth resin composition of the present invention contains the ethylene/α-olefin/non-conjugated polyene copolymer (A) described above, whereby also enabling producing a crosslinked product excellent not only in moldability and crosslinking property, but also in thermal stability, and therefore, crosslinked shaped articles obtained from the fifth resin composition of the present invention can be suitably used in applications in which their long-term use under high temperature is expected.

The fifth resin composition of the present invention and crosslinked shaped articles obtained from the composition can be used in various applications such as automobiles, motorbikes, industrial machinery, construction machinery, and agricultural machinery. Specifically, they are suitably used for rubber for tires, o-rings, rolls for industrial use, packings (for example, capacitor packing), gaskets, belts (for example, heat-insulating belt, belt for copying machines, and conveyance belt), hoses such as hoses for cars (for examples, turbocharger hose, water hose, brake reservoir hose, radiator hose, and air hose), anti-vibration rubbers, anti-vibration or vibration-controlling materials (for example, engine mount and motor mount), muffler hangers, sponges (for example, weather strip sponge, heat-insulating sponge, protection sponge, and microfoam sponge), cables (ignition cable, cabtire cable, and high tension cable), materials for wire cover (materials for covering high voltage wire, low voltage wire, and wire used in vessels), glass run channels, colored skin materials, paper-feeding rolls, roofing sheets, and the like.

In particular, the fifth resin composition and its crosslinked shaped article of the present invention are suitably used for automotive interior and exterior parts and applications requiring heat resistance, and it can be more suitably used for hose applications requiring heat resistance, which specifically include the water hose for automobiles, the turbocharger hose, the brake reservoir hose, and the radiator hose.

The hose of the present invention has a layer formed through crosslinking the above-described fifth resin composition of the present invention. In other words, the hose of the present invention may be a crosslinked shaped article the whole of which is formed through crosslinking the fifth resin composition of the present invention, or may have two or more layers, at least one of which is a layer formed through crosslinking the fifth resin composition of the present invention.

Although the hose of the present invention does not have any particular limitation in its use, but it is preferably a hose used in any one of applications for automobiles, motorbikes, industrial machinery, construction machinery, and agricultural machinery, and more preferably a water hose used for automobiles, such as a radiator hose of automobiles or a heater hose for automobile heating. The water hose for automobiles is required to have hot-water-resistance since liquid flowing through the hose is antifreeze liquid which contains hot water as a main component. Furthermore, with the miniaturization of the engine room of cars and increase in front-wheel-drive cars and cars equipped with an automatic transmission or a power steering device, piping in their engine room has become complicated and water hoses for automobiles are often equipped near their exhaust pipe. Further, water hoses are often equipped in a part exposed to high temperature in the engine room. The crosslinked shaped article of the present invention is excellent not only in heat resistance, but also in heat aging resistance and mechanical strength, and therefore, it is suitable for a water hose for automobiles.

The water hose for automobiles preferably has a layered structure of composite material which has not only a layer formed through crosslinking the fifth resin composition of the present invention, but also a layer made of another material. When the water hose has a plurality of layers, only one of the layers may be a layer formed through crosslinking the fifth resin composition of the present invention, or two or more of the layers may be layers formed through crosslinking the fifth resin composition of the present invention.

Examples of layers constituting the water hose of the present invention other than the layer formed through crosslinking the fifth resin composition of the present invention include, for example, a fluororubber layer, a silicone elastomer layer, and a reinforcing yarn layer. When a turbocharger hose has such a layer, it is preferable because it has a combination of heat resistance, durability, oil resistance, and stretchability.

Processes of producing the water hose of the present invention does not have any particular limitation and include, for example, a method in which an uncured water hose having a layered structure is shaped by extrusion molding, coextrusion molding, winding of a sheet material, or a combination thereof, and then it is heated by using, for example, steam, to crosslink the layer made of the at least fifth resin composition of the present invention. The uncured water hose is preferably highly capable of retaining its shape without shrinking or deformation. Since the fifth resin composition of the present invention can be shaped and retain its shape in an uncrosslinked state, depending on its compounding, it is suitably used as a material for forming at least one layer of the water hose.

As described above, it is also possible to produce the water hose for automobiles of the present invention by using a mandrel.

The water hose of the present invention is particularly excellent in heat aging resistance and mechanical strength since it includes a layer formed through crosslinking the fifth resin composition of the present invention.

EXAMPLES

Although the present invention will be described more specifically based on the following Examples, the invention is not limited thereto.

In Examples and Comparative examples below, ethylene (a1), propylene as an α-olefin (a2), VNB as a non-conjugated polyene (a3), ENB as a non-conjugated polyene (a4) are appropriately used to produce a copolymer to demonstrate advantageous effects of the present invention, but the α-olefin (a2), and the non-conjugated polyene (a3) are not at all limited to these compounds. A copolymer containing a non-conjugated polyene (a4) may also be used in the present invention.

Measurement and Evaluation Method

In Examples and Comparative examples below, measurement and evaluation methods of respective characteristics are as follows.

<Ethylene/α-Olefin/Non-Conjugated Polyene Copolymer>
(1) Composition of Ethylene/α-Olefin/Non-Conjugated Polyene Copolymer The weight fraction (% by weight) of each structural unit of the ethylene/α-olefin/non-conjugated polyene copolymer and the molar ratio of the ethylene to the α-olefin were determined from measurement values by using $^{13}$C-NMR. The measurement values were obtained by measuring the $^{13}$C-NMR spectrum of the copolymer by using a nuclear magnetic resonance apparatus, Model ECX400P (manufactured by JEOL Ltd.) at a measurement temperature of 120°

C., in a measurement solvent of orthodicholorbenzene/ deuterated benzene=4/1, with a cumulative number of 8,000.

(2) Intrinsic Viscosity [η]

The intrinsic viscosity [η] (dl/g) was measured by using a fully automated intrinsic viscometer manufactured by RIGO CO., LTD., at a temperature of 135° C. in a measurement solvent of decalin.

(3) Weight-average molecular weight ($M_w$), number-average molecular weight ($M_n$), and molecular weight distribution ($M_w/M_n$)

The weight-average molecular weight ($M_w$), the number-average molecular weight ($M_n$), and the molecular weight distribution ($M_w/M_n$) are numerical values in terms of polystyrene, measured by gel permeation chromatography (GPC). The measuring apparatus and a measurement condition are as follows. The molecular weight was calculated based on the conversion method using a calibration curve generated by using commercial monodispersed polystyrene.

Apparatus: gel permeation chromatograph Model Alliance GP2000 (manufactured by Waters),
Analyzer: Empower2 (manufactured by Waters),
Column: TSKgel GMH6-HT×2+TSKgel GMH6-HTL×2 (7.5 mm I.D. 30 cm, manufactured by Tosoh Corporation),
Column temperature: 140° C.,
Mobile phase: o-dichlorobenzene (containing 0.025% of BHT),
Detector: refractive index detector (RI),
Flow rate: 1.0 mL/min,
Load quantity: 400 μL,
Sampling interval: 1 s,
Column calibration: monodispersed polystyrene (manufactured by Tosoh Corporation),
Molecular-weight: expressed in terms of EPR in the old method/calibrating method taking viscosity into account.

(4) Complex viscosity η* and P value

A rheometer used was Ares, a viscoelastic measurement apparatus (manufactured by Rheometric Scientific), which was operated under a condition of 190° C. and distortion of 1.0% to measure complex viscosities $\eta^*_{(\omega=0.01)}$ at a frequency of ω=0.01 rad/s, $\eta^*_{(\omega=0.1)}$ at a frequency of ω=0.1 rad/s, $\eta^*_{(\omega=10)}$ at a frequency of ω=10 rad/s, and $\eta^*_{(\omega=100)}$ at a frequency of ω=100 rad/s (all in a unit of Pa·sec).

Based on the obtained results, a P value was calculated, which was a ratio (η* ratio) of complex viscosity of $\eta^*_{(\omega=0.1)}$ to $\eta^*_{(\omega=100)}$, represented by ($\eta^*_{\omega=0.1}/\eta^*_{\omega=100}$).

<Uncrosslinked Resin Composition>

(1) Mooney Viscosity

Mooney viscosity $ML_{(1+4)}$ 125° C. was measured in accordance with JIS K6300 (1994) using a Mooney viscometer (Model SMV202 manufactured by Shimadzu Corporation).

(2) Physical Properties of Uncrosslinked Rubber

The crosslinking rate tc (90) (minute) at 180° C. for 15 minutes was measured using a rotorless rheometer MDR2000P (MDR2000P, manufactured by Alpha Technologies, Inc.) in accordance with JIS K6300-2 (2001).

(3) Extrudability

A resin composition was extruded using an extruder equipped with a Garvey die at its tip (uniaxial barrel diameter of 20 mm, rotation speed of 30 rpm, barrel temperature of 60° C., and head temperature of 80° C.). The state of an obtained extrusion molded article was evaluated in accordance with Method A of ASTM D2230 (Garvey die extrusion test, scoring method A). Specifically, the obtained extrusion-molded article was evaluated by giving a score of one to its worst state and a score of four to its best state based on a visual observation with respect to the smoothness of the surface skin (skin), the continuity of the 30° edge (edge), and the sharpness of the corner other than the 30° edge (corner), of the extruded article. A higher score means a better extrusion processability, and a better surface smoothness and dimensional accuracy.

<Crosslinked Shaped Article/Crosslinked Rubber>

(1) Hardness Test (Shore a Hardness)

According to JIS K 6253, sheet hardness (Type A durometer, HA) was measured by using a test piece of about 12 mm in thickness, which was made of six sheet-like rubber shaped articles of 2 mm in thickness having a smooth surface, the rubber shaped articles being stacked on the top of a flat portion of each other. A test piece which was contaminated by foreign substances, or which had foams or a scratch was not used. The dimension of the measurement surface of the test piece was taken to be large enough so that a pressure needle tip might enable measuring the hardness at a point distant by 12 mm or more from the edge of the test piece.

(2) Tensile Test

A crosslinked rubber sheet was punched out to prepare a dumbbell test piece of Type 3 described in JIS K 6251, which was used for a tensile test, to measure the tensile strength at break ($T_B$) [MPa], the elongation at break ($E_B$) [%], and as necessary, the 100% modulus ($M_{100}$) [MPa], the 200% modulus ($M_{200}$) [MPa], and the 300% modulus ($M_{300}$) [MPa], under a condition of a measurement temperature of 23° C. and a tension rate of 500 mm/min, according to the method specified in the section 3 of JIS K 6251.

(3) Heat Aging Resistance Test

A heat aging resistance test was carried out according to JIS K 6257. Specifically, a crosslinked sheets was placed in an oven at 160° C. for 96 hours to be aged, and then a tensile test was carried out under a condition of a measurement temperature of 23° C., a tension rate of 500 mm/minute, to measure the elongation and strength at break of the crosslinked sheet, to calculate the tensile strength retention AR (TB) (%) and the elongation retention AR (EB) (%). Further, a hardness test was carried out, to calculate the change rate of hardness AH (ΔH).

$$AH = H_1 - H_0$$

AH; change in hardness: $H_0$; hardness before aging: $H_1$; hardness after aging (4) Flexural Fatigue Resistance In accordance with JIS K 6260, the resistance against crack generation of a test piece having no groove and the crack growth thereof were evaluated which were observed when repeated bending was given to the test piece by using a Demacha type bending tester. The measurement temperature was 23° C. and the number of cases in which the crack length exceeded 3.0 mm was recorded.

(5) Impact Resilience

Impact resilience (%) was measured by a pendulum test at a test temperature of 23° C. in accordance with JIS K 6255, using a columnar test piece of 12.5±0.5 mm in thickness and 29±0.5 mm in diameter, fabricated according to the section 8 of JIS K 6250 and left indoors at 23° C. in an atmosphere of 50% humidity for 16 hours or longer.

(6) Abrasion Resistance

In accordance with JIS K 6264, the weight loss (mg) of a disk-shaped test piece of 120 mm in diameter and of 2 mm in thickness was measured by using a Taber abrasion tester in which a pair of polishing wheels (H-18) were pressed, under a load of 1 kg, against the test piece rotating at 60 rpm, to abrade the test piece under a condition of 1,000 test repetitions.

<Fogging Resistance>

Fogging resistance was evaluated in accordance with ISO 6452 by using a cylindrical test piece of 80±1 mm in diameter and 2 mm in thickness which had been left indoors at 23° C. in an atmosphere of 50% humidity for 16 hours or more.

In an oil bath kept at a test temperature of 100° C.±0.5° C. was placed a beaker of 90±1 mm in outer diameter Φ, 83.6±1 mm in inner diameter Φ, and 190±1 mm in length containing the test piece, on which was placed a silicone packing, on which was further placed a glass plate (110× 110×3 tmm), on which was still further placed a cooling plate (1 kg or more).

Haze (%) at 5 points on the glass plate surface before and after the test at a test temperature of 180° C. for 180 minutes was measured using a haze meter (Model NDH-2000, manufactured by Nippon Denshoku Industries Co., Ltd.).

A smaller haze value means a lower haze degree, and therefore, excellent fogging resistance.

<TPX Durability Test>

A TPX durability test was carried out according to (1) and (2) below, by using poly 4-methylpentene resin (TPX, MLL 411 manufactured by Mitsui Chemicals, Inc., Melt Flow Rate (MFR) 25 (g/10 min), as measured at 260° C. and 5 kgf (load of 5 kg) in accordance with ASTM D 1238) as a mandrel made of resin. The method of the test is shown below.

(1) MFR of TPX (g/10 min)

The durability of TPX was evaluated using MFR of TPX.

Specifically, the Melt Flow Rate (MFR) of each TPX was measured at 260° C. and 5 kgf (load of 5 kg) in accordance with ASTM D 1238, by using MELT INDEXER (Model No. L244) manufactured by Takara Thermistor Co., Ltd.

(2) Measurement of Hue Value b of TPX

The durability of the TPX was evaluated using the hue value b of TPX.

Specifically, a spectrocolorimeter (SE-2000, manufactured by Nippon Denshoku Industries Co., Ltd.) was used to measure the hue value b of the initial TPX stage before stacking the resin composition, by using the transmission method in accordance with JIS Z 8722.

(3) Test Method

An obtained resin composition was cut into a shape of 6 cm in length and 6 cm in width by using scissors. TPX was also cut into the same shape of 6 cm in length and 6 cm in width by using scissors, to measure its MFR and hue value b. The respective values were referred to as "pre-insertion MFR (g/10 min)" and "pre-insertion hue value b."

Subsequently, the TPX (6 cm in length, 6 cm in width) and the resin composition (6 cm in length, 6 cm in width) stacked thereon were sandwiched between LUMIRRORs, to be pressed by a 50 ton press. The condition of the press was a pressure of 1 MPa at 185° C. for 12 minutes. After pressing, the test piece was further pressed by cold press for 5 minutes and taken out. Then, after removing the resin composition (6 cm in length, 6 cm in width) from the TPX (6 cm in length, 6 cm in width), the MFR and the hue value b of this TPX were measured and their values were referred to as "MFR after first press (g/10 min)" and "hue value b after first press."

Subsequently, the reversed TPX after the first press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the MFR and the hue value b of this TPX were measured and their values were referred to as "MFR after second press (g/10 min)" and "hue value b after second press."

Subsequently, the reversed TPX after the second press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the MFR and the hue value b of this TPX were measured and their values were referred to as "MFR after third press (g/10 min)" and "hue value b after third press."

Subsequently, the reversed TPX after the third press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the hue value b of this TPX was measured and the value was referred to as "hue value b after fourth press."

Subsequently, the reversed TPX after the fourth press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the hue value b of this TPX was measured and the value was referred to as "hue value b after fifth press."

Subsequently, the reversed TPX after the fifth press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the hue value b of this TPX was measured and the value was referred to as "hue value b after sixth press."

In a similar procedure, the reversed TPX after the sixth press and a new resin composition (6 cm in length, 6 cm in width) stacked thereon were pressed again, further pressed by cold press for 5 minutes, and then taken out. After removing the resin composition (6 cm in length, 6 cm in width) from the TPX (6 cm in length, 6 cm in width), the hue value b of this TPX was measured and the value was referred to as "hue value b after seventh press."

[Production Example 1] (Production of Ethylene/Propylene/VNB Copolymer (A-1))

A continuous polymerization reaction of ethylene, propylene, and 5-vinyl-2-norbornene (VNB) was carried out at 87° C. by using a 300 L polymerization vessel equipped with a stirring blade.

The polymerization vessel was continuously fed with ethylene so that its feed rate might be 3.6 kg/h, propylene 6.1 kg/h, VNB 290 g/h, and hydrogen 6.3 NL/h, with hexane as a polymerization solvent (feed rate: 32.6 L/h).

The polymerization vessel was continuously fed with di (p-tolyl)methylene(cyclopentadienyl)(octamethyloctahydrodibenzofluorenyl)zirconium dichloride as a main catalyst so that its feed rate might be 0.0015 mmol/h, with a polymerization pressure kept to be 1.6 MPaG and a polymerization temperature 87° C. Further, the polymerization vessel was continuously fed with $(C_6H_5)_3CB(C_6F_5)_4$ as a co-catalyst so that its feed rate might be 0.0075 mmol/h, and triisobutyl aluminum (TIBA) as an organoaluminum compound 20 mmol/h.

In this way, a solution was obtained which contained 15.2% by mass of ethylene/propylene/VNB copolymer formed from ethylene, propylene, and VNB. A small amount of methanol was added to the polymerization reaction solution extracted from the bottom of the polymerization vessel, to quench the polymerization reaction, and the ethylene/propylene/VNB copolymer was separated from the solvent by a steam stripping treatment, and then dried under reduced pressure at 80° C. for 24 hours.

By the above operation, ethylene/propylene/VNB copolymer (A-1) formed from ethylene, propylene, and VNB was obtained at a rate of 4.7 kg/hr.

Physical properties of the obtained copolymer (A-1) were measured by the aforementioned methods. The results are listed in Table 1.

[Production Example 2] (Production of Ethylene/Propylene/VNB-ENB Copolymer (A'-2))

A continuous polymerization reaction of ethylene, propylene, 5-ethylidene-2-norbornene (ENB), and 5-vinyl-2-norbornene (VNB) was carried out at 95° C. by using a 300 L polymerization vessel equipped with a stirring blade.

The polymerization vessel was continuously fed with ethylene so that its feed rate might be 5.0 kg/h, propylene 5.4 kg/h, ENB 900 g/h, VNB 65 g/h, and hydrogen 50 NL/h, with hexane as a polymerization solvent (feed rate: 40 L/h).

The polymerization vessel was continuously fed with titanium, [N-(1,1-dimethylethyl)-1,1-dimethyl-1-[1,2,3,3a, 8a-.eta)-1,5,6,7-tetrahydro-2-methyl-s-indacen-1-yl]silanaminato (2-)-.Kappa.N][(1,2,3,4-,eta)-1,3-pentadiene]-,stereoisomer so that its feed rate might be 0.047 mmol/h, with a polymerization pressure kept to be 1.6 MPaG and a polymerization temperature 95° C. Further, the polymerization vessel was continuously fed with $(C_6H_5)_3CB(C_6F_5)_4$ as a co-catalyst so that its feed rate might be 0.235 mmol/h, and triisobutyl aluminum (TIBA) asanorganoaluminum compound 10 mmol/h.

In this way, a solution was obtained which contained 21% by mass of ethylene/propylene/ENB/VNB copolymer formed from ethylene, propylene, ENB, and VNB. A small amount of methanol was added to the polymerization reaction solution extracted from the bottom of the polymerization vessel, to quench the polymerization reaction, and the ethylene/propylene/ENB/VNB copolymer was separated from the solvent by a steam stripping treatment, and then dried under reduced pressure at 80° C. for 24 hours.

By the above operation, ethylene-propylene/ENB/VNB copolymer (A'-2) formed from ethylene, propylene, ENB, and VNB was obtained at a rate of 7.8 kg/h. Physical properties of the obtained copolymer (A'-2) were measured by the aforementioned methods. The results are listed in Table 1.

[Production Example 3] Production of Ethylene/Propylene/ENB Copolymer (a-1)

A continuous polymerization reaction of ethylene, propylene, and 5-ethylidene-2-norbornene (ENB) was carried out at 110° C. using a 300 L polymerization vessel equipped with a stirring blade.

The polymerization vessel was continuously fed with ethylene so that its feed rate might be 3.8 kg/h, propylene 3.3 kg/h, ENB 340 g/h, and hydrogen 1.2 NL/h, with hexane as a polymerization solvent (feed rate: 32.7 L/h).

The polymerization vessel was continuously fed with titanium, [N-(1,1-dimethylethyl)-1,1-dimethyl-1-[1,2,3,3a, 8a-.eta)-1,5,6,7-tetrahydro-2-methyl-s-indacen-1-yl]silanaminato (2-)-.Kappa.N][(1,2,3,4-,eta)-1,3-pentadiene]-,stereoisomer so that its feed rate might be 0.0125 mmol/h, with a polymerization pressure kept to be 1.6 MPaG and a polymerization temperature 110° C. Further, the polymerization vessel was continuously fed with $(C_6H_5)_3CB(C_6F_5)_4$(CB-3) as a co-catalyst so that its feed rate might be 0.0625 mmol/h, and triisobutyl aluminum (TIBA) as an organoaluminum compound 2.0 mmol/h.

In this way, a solution was obtained which contained 16.7% by weight of ethylene/propylene/ENB copolymer formed from ethylene, propylene, and ENB. A small amount of methanol was added to the polymerization reaction solution extracted from the bottom of the polymerization vessel, to quench the polymerization reaction, and the ethylene/propylene/ENB copolymer was separated from the solvent by a steam stripping treatment, and then dried under reduced pressure at 80° C. for 24 hours.

By the above operation, ethylene/propylene/ENB copolymer (a-1) formed from ethylene, propylene, and ENB was obtained at a rate of 4.8 kg/h.

Physical properties of the obtained copolymer (a-1) were measured by the aforementioned methods. The results are listed in Table 1.

[Production Example 4] (Production of Ethylene/Propylene/ENB/VNB Copolymer (a-2))

A continuous polymerization reaction of ethylene, propylene, 5-ethylidene-2-norbornene (ENB), and 5-vinyl-2-norbornene (VNB) was carried out at 95° C. by using a 300 L polymerization vessel equipped with a stirring blade.

The polymerization vessel was fed continuously with ethylene so that its feed rate might be 2.9 kg/h, propylene 4.6 kg/h, ENB 1170 g/h, VNB 16 g/h, and hydrogen 2.2 NL/h, with hexane as a polymerization solvent (feed rate: 32.6 L/h).

The polymerization vessel was continuously fed with titanium, [N-(1,1-dimethylethyl)-1,1-dimethyl-1-[1,2,3,3a, 8a-.eta)-1,5,6,7-tetrahydro-2-methyl-s-indacen-1-yl]silanaminato (2-)-.kappa.N][(1,2,3,4-,eta)-1,3-pentadiene]-,stereoisomer so that its feed rate might be 0.02 mmol/h, with a polymerization pressure kept to be 1.6 MPaG and a polymerization temperature 95° C. Further, the polymerization vessel was continuously fed with $(C_6H_5)_3CB(C_6F_5)_4$ (CB-3) as a co-catalyst so that its feed rate might be 0.10 mmol/h, and triisobutyl aluminum (TIBA) as an organoaluminum compound 10 mmol/h.

In this way, a solution was obtained which contained 16.8% by weight of ethylene/propylene/ENB/VNB copolymer formed from ethylene, propylene, ENB, and VNB. A small amount of methanol was added to the polymerization reaction solution extracted from the bottom of the polymerization vessel, to quench the polymerization reaction, and the ethylene/propylene/ENB/VNB copolymer was separated from the solvent by a steam stripping treatment, and then dried under reduced pressure at 80° C. for 24 hours.

By the above operation, ethylene/propylene/ENB/VNB copolymer (a-2) formed from ethylene, propylene, ENB and VNB was obtained at a rate of 5.0 kg/h.

Physical properties of the obtained copolymer (a-2) were measured by the aforementioned methods. The results are listed in Table 1.

TABLE 1

| copolymer | A-1 | A'-2 | a-1 | a-2 |
|---|---|---|---|---|
| ethylene/propylene [molar ratio] | 68/32 | 62/38 | 69/31 | 58/42 |
| VNB content [% by weight] | 1.6 | 0.38 | — | 0.15 |
| ENB content [% by weight] | — | 9.5 | 5.0 | 14.0 |
| Mw | 178000 | 423000 | 223000 | 313000 |
| Mw × VNB content/100/VNB molecular weight | 22.5 | 13.4 | 0 | 3.9 |
| [η][dl/g] | 2.3 | 1.6 | 2.7 | 2.3 |
| P value ($\eta^*_{(\omega=0.1)}/\eta^*_{(\omega=100)}$) | 29.1 | 43.4 | 94.3 | 72.0 |

TABLE 1-continued

| copolymer | A-1 | A'-2 | a-1 | a-2 |
|---|---|---|---|---|
| $P/([\eta]^{2.9})$ | 1.7 | 10.9 | 5.2 | 6.4 |
| VNB content × 6 | 9.6 | 2.3 | 0 | 0.9 |
| $LCB_{1000\,C.}$ | 0.14 | 0.30 | | |
| $1 - 0.07 \times Ln(Mw)$ | 0.15 | 0.09 | | |

Example 1

As a first step, 100 parts by mass of the ethylene/propylene/VNB copolymer (A-1) obtained in Production Example 1 as the component (A) was roughly kneaded for 30 seconds by a Banbury mixer, Model BB-2 (manufactured by KOBE STEEL, LTD.), to which copolymer were added 60 parts by mass of HAF carbon black (Asahi #70G, manufactured by Asahi Carbon Co., Ltd.) as the component (C), one part by mass of stearic acid as the softening agent component (E), five parts by mass of zinc oxide, and 2 parts by mass of NOCRAC CD (manufactured by OUCHI SHINKO CHEMICAL INDUSTRIAL CO., LTD.) as the antioxidant component (D), and then kneaded at 140° for 2 minutes. Then, the ram of the mixer was raised to be cleaned, and they were kneaded for one more minute, and discharged at about 150° C. to yield a compound of the first step.

Next, as a second step, the compound obtained in the first step was banded on an roll of an 8-inch roll mill (manufactured by Nippon Roll MFG. Co., Ltd., operating with a front roll at a surface temperature of 50° C. and a rotational rate of 16 rpm and aback roll at a surface temperature of 50° C. and a rotational rate of 18 rpm), and 5.1 parts by mass of master batch (DCP-40c manufactured by Kayaku Akzo Corporation) containing 40% by mass of dicumyl peroxide as the organic peroxide component (B) (2.04 parts by mass in terms of organic peroxide) was added to the compound, which was then kneaded for 10 minutes to yield an uncrosslinked resin composition (rubber compound). This resin composition was used to evaluate physical properties (physical properties of the uncrosslinked rubber).

This resin composition was sheeted into a sheet-like shape and pressed at 180° C. for 10 minutes using a 100-ton press-shaping machine to prepare a crosslinked rubber sheet of 2 mm in thickness. This sheet was used to evaluate various physical properties of the crosslinked shaped article. The results are listed in Table 2.

Example 2, Comparative Examples 1 to 3

Resin compositions and crosslinked rubber sheets were produced in the same manner as in Example 1, except that the compound in the first step, the compound in the second step, and the thermal crosslinking condition were the compositions (parts by mass) listed in Table 2 and the condition listed therein, and their physical properties were evaluated. The results are also listed in Table 2.

TABLE 2

| | | Example 1 | Example 2 | Comparative example 1 | Comparative example 2 | Comparative example 3 |
|---|---|---|---|---|---|---|
| first step | copolymer (A-1) | 100 | 100 | 100 | — | — |
| | acrylic rubber 1) | — | — | — | 100 | — |
| | ethylene acrylic elastomer 2) | — | — | — | — | 100 |
| | zinc oxide 3) | 5 | 5 | 5 | — | — |
| | stearic acid | 1 | 1 | 1 | 1 | 1 |
| | carbon black 4) | 60 | 60 | 60 | 60 | 60 |
| | oil 5) | — | — | — | | |
| | NOCRAC CD 6) | 2 | 2 | — | 2 | 2 |
| | lubricant 7) | — | — | — | 1 | 1 |
| second step | organic peroxide (DCP-40c) 8) | 5.1 | 1.7 | 1.7 | — | — |
| | diamine-based vulcanizing agent 9) | — | — | — | 0.5 | 0.5 |
| | vulcanization enhancer 10) | — | — | — | 2 | 2 |
| | thermal crosslinking condition | 180° C. × 10 min (press) | 180° C. × 10 min (press) | 180° C. × 10 min (press) | 170° C. × 20 min (press) 170° C. × 4 h (oven) | 170° C. × 20 min (press) |
| <physical properties of crosslinked shaped article> | | | | | | |
| | TB [MPa] | 19.6 | 15.6 | 15.2 | 11.5 | 11.6 |
| | EB [%] | 268 | 619 | 606 | 280 | 646 |
| | HA [Shore-A] | 72 | 70 | 70 | 71 | 74 |
| <heat aging resistance> 180° C. × 336 hrs | | | | | | |
| | AH | 10 | 12 | 16 | 14 | 10 |
| | AR(TB) [%] | 38 | 33 | 51 | 54 | 62 |
| | AR(EB) [%] | 25 | 20 | 13 | 83 | 14 |
| | <flexural fatigue resistance> (number of repetition) | >500,000 | >500,000 | >500,000 | 35.000 | >500,000 * a concave was generated at a bent region |

1) Nipol AR-12: manufactured by ZEON CORPORATION
2) Vamac ® G: manufactured by DuPont
3) zinc oxide(hydrozincite): manufactured by Hakusuitech Co., Ltd.
4) HAF carbon black (Asahi 70G): manufactured by Asahi Carbon Co., Ltd.
5) paraffin-based process oil(Diana Process PW-380): manufactured by Idemitsu Kosan Co., Ltd.
6) 4,4'-dicumyl diphenylamine (NOCRAC CD): manufactured by Ouchi Shinko Chemical Industrial Co., Ltd.
7) ester-based wax (PHOSPHANOL RL-210): manufactured by TOHO Chemical Industry Co., Ltd.
8) master batch containing 40% of di-cumyl peroxide (DCP-40c): manufactured by Kayaku Akzo Corporation
9) hexamethylenediamine carbamate (Diak #1): manufactured by DuPont
10) 1.3-di-orthotolyguanidine (NOCCELER DT): manufactured by Ouchi Shinko Chemical Industrial Co., Ltd.

Example 3

As a first step, 100 parts by mass of the ethylene/propylene/VNB copolymer (A-1) obtained in Production Example 1 as the component (A) was roughly kneaded for 30 seconds by using the Banbury mixer Model BB-2 (from KOBE STEEL, LTD.), to which copolymer were added 60 parts by mass of clay (iceberg clay, manufactured by SHIRAISHI CALCIUM KAISHA, Ltd.) as the white filler component (C), 40 parts by mass of SRF-Ls carbon black (Asahi #35, manufactured by Asahi Carbon Co., Ltd.), 0.5 parts by mass of stearic acid as the softener component (D), and 20 parts by mass of paraffin-based process oil (Diana Process PW-380, manufactured by Idemitsu Kosan Co., Ltd.), 5 parts by mass of zinc oxide (hydrozincite, manufactured by Hakusuitech Co., Ltd.), 2 parts by mass of the antioxidant component (E) (NOCRAC CD, manufactured by OUCHI SHINKO CHEMICAL INDUSTRIAL CO., LTD.), and polyethylene glycol (PEG #4000, manufactured by Sanyo Chemical Industries, Ltd.) as a surfactant, and then kneaded at 140° C. for 2 minutes. Then, the ram of the mixer was raised to be cleaned, and they were kneaded for one more minute, and discharged at about 150° C. to yield a compound of the first step.

Next, as a second step, the compound obtained in the first step was banded on an roll of an 8-inch roll mill (manufactured by Nippon Roll MFG. Co., Ltd., operating with a front roll at a surface temperature of 50° C. and a rotational rate of 16 rpm and a back roll at a surface temperature 50° C. and a rotational rate of 18 rpm), and 2 parts by mass (0.8 parts by mass in terms of organic peroxide) of master batch (KAYAHEXAAD-40c, manufactured by Kayaku Akzo Corporation) containing 40% by mass of 2,5-dimethyl-2,5-di(t-butylperoxy)hexane as the organic peroxide component (B) and one part by mass of ethylene dimethacrylate (Acrylester ED, manufactured by Mitsubishi Rayon CO., Ltd.) as the crosslinking aid (F) were added to the compound, which was then kneaded for 10 minutes to yield an uncrosslinked resin composition (rubber compound). This resin composition was used to evaluate physical properties (physical properties of the uncrosslinked rubber).

This resin composition was sheeted into a sheet-like shape and pressed at 180° C. for 10 minutes using a 100-ton press-shaping machine to prepare a crosslinked rubber sheet of 2 mm in thickness. This sheet was used to evaluate various physical properties of the crosslinked shaped article. The results are listed in Table 3.

Example 4, Comparative Examples 4 and 5

Resin compositions and crosslinked rubber sheets were produced in the same manner as in Example 3, except that the compound in the first step, the compound in the second step, and the thermal crosslinking condition were the compositions (parts by mass) listed in Table 3 and the condition listed therein, and their physical properties were evaluated. The results are also listed in Table 3.

TABLE 3

| | | Example 3 | Example 4 | Comparative example 4 | Comparative example 5 |
|---|---|---|---|---|---|
| first step | copolymer (A-1) | 100 | 100 | — | — |
| | ethylene/propylene/ENB copolymer (3062EM) 1) | — | — | 60 | 60 |
| | Ethylene/propylene/ENB copolymer (3045) 2) | — | — | 50 | 50 |
| | clay 3) | 60 | 60 | 60 | 60 |
| | SRF-Ls carbon black 4) | 40 | 40 | 40 | 40 |
| | zinc oxide 5) | 5 | 5 | 5 | 5 |
| | stearic acid | 0.5 | 0.5 | 0.5 | 0.5 |
| | paraffin-based process oil 6) | 20 | 20 | 20 | 20 |
| | NOCRAC CD 7) | 2 | — | 2 | 2 |
| | PEG#4000 8) | 1 | 1 | 1 | 1 |
| second step | KAYAHEXAAD-40c 9) | 2 | 2 | 7 | 4 |
| | Acrylester ED 10) | 1 | — | 2 | 1 |
| | thermal crosslinking condition | 170° C. × 15 min | 170° C. × 15 min | 170° C. × 15 min | 170° C. × 15 min |
| <physical properties of crosslinked shaped article> | | | | | |
| | TB [MPa] | 12.5 | 11.3 | 11.3 | 9.8 |
| | EB [%] | 680 | 650 | 420 | 466 |
| | HA [Shore-A] | 62 | 62 | 60 | 62 |
| <heat aging resistance> 180° C. × 72 h | | | | | |
| | HA | 62 | 63 | 63 | 62 |
| | TB [MPa] | 12.1 | 10.7 | 6.2 | 5.4 |
| | EB [%] | 680 | 618 | 223 | 284 |
| | AH | ±0 | ±1 | ±3 | ±1 |
| | AR(TB) [%] | 97 | 95 | 55 | 55 |
| | AR(EB) [%] | 100 | 95 | 59 | 61 |
| <fogging resistance> 180° C. × 3 hrs | | | | | |
| | haze (%) | 39 | 29 | 58 | 49 |

1) ethylene/propylene/EHB copolymer (3062EM): manufactured by Mitsui Chemicals, Inc.
2) ethylene/propylene/EMB copolymer (3045): manufactured by Mitsui Chemicals, Inc.
3) Iceberg clay: manufactured by Burgess Pigment Company (SHIRAISHI CALCIUM KAISHA, Ltd.)
4) SRF-Ls carbon black (Asahi 35): manufactured by Asahi Carbon Co., Ltd.
5) zinc oxide (hydrozincite): manufactured by Hakusuitech Co., Ltd.
6) paraffin-based process oil (Diana Process PW-380): manufactured by Idemitsu Kosan Co., Ltd.
7) 4,4'-dicumyl diphenylamine (NOCRAC CD): manufactured by Ouchi Shinko Chemical Industrial Co., Ltd.
8) polyethylene glycol (PEG#4000): manufactured by Sanyo Chemical Industries, Ltd.
9) master batch containing 40% of 2,5-di-methyl 2,5-di-t-buthylperoxyhexane (KAYAHEXAAD-40c): manufactured by Kayaku Akzo Corporation
10) Ethylene Dimethacrylate (Acrylester ED): manufactured by Mitsubishi Rayon CO., Ltd.

Example 5

As a first step, 100 parts by mass of ethylene/propylene/VNB copolymer (A-1) obtained in Production Example 1 as the component (A) was roughly kneaded for 30 seconds by using the Banbury mixer Model BB-2 (manufactured by KOBE STEEL, LTD.), to which copolymer were added 5 parts by mass of zinc oxide, 80 parts by mass of SRF carbon black (Asahi #50G, manufactured by Asahi Carbon Co., Ltd.) as the carbon black component (C), and one part by mass of stearin acid, and 20 parts by mass of paraffin-based process oil (Diana Process PW-380, manufactured by Idemitsu Kosan Co., Ltd.) as softening agent components (D), and then kneaded at 140° C. for 2 minutes. Then, the ram of the mixer was raised to be cleaned, and they were kneaded for one more minute, and discharged at about 150° C. to yield a compound of the first step.

Next, as a second step, the compound obtained in the first step was banded on a roll of an 8-inch roll mill (from Nippon Roll MFG. Co., Ltd., operating with a front roll at a surface temperature of 50° C. and a rotational rate of 16 rpm and a back roll at a surface temperature of 50° C. and a rotational rate of rpm), and 3.4 parts by mass of master batch (DCP-40c, manufactured by Kayaku Akzo Corporation) containing 40% by mass of dicumyl peroxide (1.36 parts by mass in terms of organic peroxide) as the organic peroxide component (B), and 2.0 parts by mass of triallyl isocyanurate (TAIC, manufactured by Nippon Kasei Chemical Co., Ltd.) as the crosslinking aid (E) were added to the compound, which was then kneaded for 10 minutes to yield an uncrosslinked resin composition (rubber compound). This resin composition was used to evaluate physical properties (properties of the uncrosslinked rubber).

This resin composition was sheeted into a sheet-like shape at 180° C. for 10 minutes using a 100-ton press-shaping machine to prepare a crosslinked rubber of 2 mm in thickness. This sheet was used to evaluate various physical properties of the crosslinked shaped article. The results are listed in Table 4.

Examples 6 and 7, Comparative Examples 6 and 7

Resin compositions and crosslinked rubber sheets were produced in the same manner as in Example 5, except that the compound in the first step, the compound in the second step, and the thermal crosslinking condition were the compositions (parts by mass) listed in Table 4 and the condition listed therein, and their physical properties were evaluated. The results are also listed in Table 4.

TABLE 4

|  |  | Example 5 | Example 6 | Example 7 | Comparative example 6 | Comparative example 7 |
|---|---|---|---|---|---|---|
| first step | copolymer(A-1) | 100 | 100 | 100 | — | — |
|  | copolymer(A'-2) | — | — | — | 100 | 100 |
|  | zinc oxide1) | 5 | 5 | 5 | 5 | 5 |
|  | stearic acid | 1 | 1 | 1 | 1 | 1 |
|  | SRF carbon black2) | 80 | 85 | 65 | 80 | 65 |
|  | paraffin-based process oil3) | 20 | 25 | 5 | 20 | 5 |
| second step | DCP-40c4) | 3.4 | 3.4 | 3.4 | 3.4 | 3.4 |
|  | TAIC5) | 2.0 | 2.0 | 2.0 | 2.0 | 2.0 |
| <extrudability> |  |  |  |  |  |  |
|  | skin/edge/corner | 4/3/3 | 4/4/4 | 1/1/1 | 3/2/2 | 1/1/1 |
|  | thermal crosslinking condition | 170° C. × 15 min | 170° C. × 15 min | 170° C. × 15 min | 170° C. × 15 min | 170° C. × 15 min |
| <physical properties of crosslinked shaped article> |  |  |  |  |  |  |
|  | TB [MPa] | 21.5 | 17.5 | 17.6 | 18.2 | 19.4 |
|  | EB [%] | 160 | 275 | 158 | 124 | 105 |
|  | HA [Shore-A] | 72 | 71 | 73 | 72 | 73 |
| <impact resilience> |  |  |  |  |  |  |
|  | (%) | 61 | 60 | 67 | 52 | 57 |
| <abrasion resistance> |  |  |  |  |  |  |
|  | weight loss (mg) | 131 | 135 | 113 | 196 | 174 |
| <flexural fatigue resistance> |  |  |  |  |  |  |
|  | number of repetition | >500,000 | >500,000 | >500,000 | 180,000 | 385,000 |

1) zinc oxide(hydrozincite): manufactured by Hakusuitech Co., Ltd.
2) SRF carbon black (Asahi 50G): manufactured by Asahi Carbon Co., Ltd.
3) paraffin-based process oil (Diana Process PW-380): manufactured by Idemitsu Kosan Co., Ltd.
4) master batch containing 40% of di-cumyl peroxide (DCP-40c): manufactured by Kayaku Akzo Corporation
5) triallyl isocyanurate (TAIC): manufactured by Nippon Kasei Chemical Co., Ltd.

Example 8

As a first step, 100 parts by mass of the ethylene/propylene/VNB copolymer (A-1) obtained in Production Example 1 as the component (A) was roughly kneaded for 30 seconds by a Banbury mixer, Model BB-2 (from KOBE STEEL, LTD.), to which copolymer were added 5 parts by mass of magnesium oxide (Kyowa Mag® 150, manufactured by Kyowa Chemical Industry Co., Ltd.) as the component (C), 30 parts by mass of FEF carbon (Asahi #60G, manufactured by Asahi Carbon Co., Ltd.), 45 parts by mass of SRF carbon (Asahi #50G, manufactured by Asahi Carbon Co., Ltd.), and 40 parts by mass of FT carbon (Asahi #15HS, manufactured by Asahi Carbon Co., Ltd.), as carbon components (G), one part by mass of stearic acid (Tsubaki, manufactured by NOF CORPORATION) and 47 parts by mass of paraffin-based process oil (SUNPAR® 2280, manufactured by Nippon Sun Petroleum Co., Ltd.) as the softening agent components (F), and then kneaded at 140° C. for 2 minutes. Then, the ram of the mixer was raised to be cleaned, and they were kneaded for one more minute, and discharged at about 150° C. to yield a compound of the first stage.

Next, as a second step, the compound obtained in the first step was banded on an roll of an 8-inch roll mill (manufactured by Nippon Roll MFG. Co., Ltd., operating with a front roll at a surface temperature of 50° C. at a rotational rate of 16 rpm and a back roll at a surface temperature 50° C. and a rotational rate of 18 rpm), and 2 parts by mass of Perhexa® 25B (manufactured by NOF CORPORATION) as the organic peroxide component (B) was added to the compound, which was then kneaded for 10 minutes to yield an uncrosslinked resin composition (rubber compound). This resin composition was used to evaluate physical properties (the physical properties of uncrosslinked rubber).

This resin composition was sheeted into a sheet-like shape and pressed at 180° C. for 10 minutes using a 100-ton press-shaping machine (from Kotaki Seiki Co., Ltd.) to prepare a crosslinked rubber sheet of 2 mm in thickness. This sheet was used to evaluate various physical properties of the crosslinked shaped article. The results are listed in Table 5.

Zinc oxide was measured as the total zinc content contained in the resin composition in accordance with the Rubber products-Determination of zinc contents-EDTA titrimetric method of JIS K 6232 (1998) using the resin composition, but zinc was not detected. Therefore, the content of zinc oxide was also less than 0.01 parts by mass with respect to 100 parts by mass of the ethylene/α-olefin/non-conjugated polyene copolymer (A), and was regarded as not to be contained.

Example 9, Comparative Examples 8 and 9

Resin compositions and crosslinked rubber sheets were produced in the same manner as in Example 8, except that the compound in the first step, the compound in the second step, and the thermal crosslinking condition were the compositions (parts by mass) listed in Table 5 and the condition listed therein, and their physical properties were evaluated. The results are also listed in Table 5.

In Example 9, and Comparative examples 8 and 9, two parts by mass of 2,2,4-trimethyl-1,2-dihydroquinoline polymer (Nocrac® 224, manufactured by Ouchi Shinko Chemical Industrial Co., Ltd.) as the antioxidant (E) was further added to the compound in the first step.

In Comparative example 8, 3 parts by mass of Hi-Cross M (manufactured by Seiko Chemical Co., Ltd.), in addition to 3 parts by mass of Perhexa® 25B (manufactured by NOF CORPORATION) as the organic peroxide component (B), was added to yield a resin composition (rubber compound).

TABLE 5

| <compounding> | Example 8 | Example 9 | Comparative example 8 | Comparative example 9 |
|---|---|---|---|---|
| copolymer (a-1) | — | — | 40 | 40 |
| copolymer (a-2) | — | — | 60 | 60 |
| copolymer (A-1) | 100 | 100 | — | — |
| magnesium oxide | 5 | 5 | 5 | 5 |
| stearic acid | 1 | 1 | 1 | 1 |
| FEF carbon | 30 | 30 | 30 | 30 |
| SRF carbon | 45 | 45 | 45 | 45 |
| FT carbon | 40 | 40 | 40 | 40 |
| NOCRAC ® 224 | — | 2 | 2 | 2 |
| paraffin-based process oil | 47 | 47 | 47 | 47 |
| <crosslinking system> | | | | |
| Perhexa ® 25B | 2 | 3 | 3 | 3 |
| Hi-Cross M | — | — | 3 | — |
| <physical properties of uncrosslinked resin composition> | | | | |
| Mooney viscosity (ML$_{(1+4)}$125° C.) | 50 | 48 | 59 | 61 |
| MDR2000P 180° C. × 15 min | | | | |
| tc90 [min] | 5.79 | 6.47 | 6.48 | 6.5 |
| <physical properties of crosslinked rubber> 180° C. × 10 min | | | | |
| HA | 65 | 64 | 67 | 66 |
| M$_{100}$ (MPa) | 3.3 | 3.2 | 3.1 | 3.6 |
| M$_{200}$ (MPa) | 8.7 | 8.1 | 8.7 | 9.7 |
| M$_{300}$ (MPa) | 12.1 | 11.2 | — | — |
| T$_B$ (MPa) | 12.3 | 12.1 | 14.8 | 15.3 |
| E$_B$ (%) | 310 | 335 | 295 | 280 |
| <heat aging resistance> | | | | |
| ΔH | +4(89) | +5(69) | +3(70) | +4(70) |
| AR(%)/TB (%) | 79(9.7) | 96(11.6) | 96(14.2) | 68(10.4) |
| AR(%)/EB (%) | 95(295) | 99(330) | 92(270) | 93(260) |
| <TPX durability test> | | | | |
| pre-insertion MFR (g/10 min) | 23.8 | 23.8 | 23.8 | 23.8 |
| MFR after first press (g/10 min) | 210.4 | 259.4 | 264.9 | 513.9 |
| MFR after second press (g/10 min) | — | 485.7 | — | — |
| MFR after third press (g/10 min) | 813.5 | — | 1327.3 | — |
| pre-insertion hue value b | 11.54 | — | 11.54 | — |
| hue value b after first press | 9.5 | — | 8.58 | — |
| hue value b after third press | 11.31 | — | 7.35 | — |
| hue value b after fourth press | — | — | 7.47 | — |

TABLE 5-continued

| <compounding> | Example 8 | Example 9 | Comparative example 8 | Comparative example 9 |
|---|---|---|---|---|
| hue value b after fifth press | 10.48 | — | 7.95 | — |
| hue value b after sixth press | 12.57 | — | — | — |
| hue value b after seventh press | 12.58 | — | — | — |

INDUSTRIAL APPLICABILITY

The first resin composition and its crosslinked shaped article of the present invention can be used without any limitation in various applications known as applications of rubber composition and they are suitable for applications for automotive interior and exterior parts and applications requiring heat resistance.

The second resin composition and its crosslinked shaped article of the present invention are suitably used in applications for automotive interior and exterior parts and applications requiring heat resistance, and for example, applications for hoses requiring heat resistance, such as turbocharger hose, brake reservoir hose, radiator hose, and the like. Although the hose of the present invention does not have any particular limitation in its use, it is preferably a hose used in any one of applications for automobiles, motorbikes, industrial machinery, construction machinery and agricultural machinery, and more preferably a hose used as a turbocharger hose for automobiles.

The third resin composition and its crosslinked shaped article of the present invention can be used, without any limitation, for various applications known as applications for rubber composition, but it can be suitably used in applications for interior and exterior parts for automobiles and applications requiring heat resistance, and can be more suitably used in applications for sealing materials/packings, and can be still more suitably used in applications for sealing materials and packings in various applications, such as automobiles, motorbikes, industrial machinery, construction machinery or agricultural machinery, and specifically, it can be used particularly suitably in applications for sealing materials/packings such as lamp seal packings for automobiles and motorcycles, and packings for meters.

The fourth resin composition and its crosslinked shaped article of the present invention can be used without any limitation in various applications known as applications of rubber composition, and are suitably used in applications such as interior and exterior parts for automobiles, and applications requiring heat resistance and slidability, and can be more suitably used in applications such as various sliding members and wiper blades, and can particularly suitably used in applications for sliding members for automobiles, motorbikes, and other vehicles, industrial machinery, construction machinery, and agricultural machinery, and applications for wiper blades for vehicles, such as automobiles, motorcycles, trains, aircraft, and ships.

The fifth resin composition and its crosslinked shaped article of the present invention are suitably used in applications for automobiles, motorbikes, industrial machinery, construction machinery, and agricultural machinery, and in particular, suitably used in applications for interior and exterior parts for automobiles and applications requiring heat resistance, and more suitably used, for example, for hoses among others. Although the hose of the present invention does not have any particular limitation in its use, it is preferably a hose used in any one of applications for automobiles, motorbikes, industrial machinery, construction machinery, and agricultural machinery, and is more preferably a hose used as a water hose for automobiles.

The invention claimed is:

1. A resin composition comprising
   (A) 100 parts by mass of an ethylene/α-olefin/non-conjugated polyene copolymer and
   (B) 0.1 to 5 parts by mass of an organic peroxide,
   wherein the ethylene/α-olefin/non-conjugated polyene copolymer (A) comprises structural units derived from ethylene (a1), an α-olefin (a2) having 3 to 20 carbon atoms, and a non-conjugated polyene (a3) comprising intramolecularly two or more partial structures in total selected from the group consisting of structures represented by the following general formulae (I) and (II),

[Chem. 1]

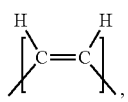
(I)

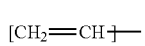
(II)

and satisfies the following requirements from (i) to (v):
(i) a molar ratio of ethylene/α-olefin is from 55/45 to 99.9/0.1;
(ii) a weight fraction of the structural unit derived from the non-conjugated polyene (a3) is from 0.07% by weight to 10% by weight in 100% by weight of the ethylene/α-olefin/non-conjugated polyene copolymer;
(iii) a weight-average molecular weight (Mw) of the ethylene/α-olefin/non-conjugated polyene copolymer, a weight fraction of the structural unit derived from the non-conjugated polyene (a3) (weight fraction of (a3)), and a molecular weight of the non-conjugated polyene (a3) (molecular weight of (a3)) satisfy the following Formula (1), $$4.5 \leq Mw \times \text{weight fraction of } (a3)/100/\text{molecular weight of } (a3) \leq 40; \quad \text{Formula (1)}$$

(iv) a ratio of a complex viscosity $\eta^*_{(\omega=0.1)}$(Pa·sec) at a frequency of $\omega=0.1$ rad/s to a complex viscosity $\eta^*_{(\omega=100)}$(Pa·sec) at a frequency of $\omega=100$ rad/s, both obtained by linear viscoelastic measurement (190° C.) by using a rheometer, represented by $P_{(\eta^*_{(\omega=0.1)}/\eta^*_{(\omega=100)})}$, an intrinsic viscosity represented by $[\eta]$, and the weight fraction of the structural unit derived from the non-conjugated polyene (a3) (weight fraction of (a3)) satisfy the following Formula (2), $$P/([\eta]^{2.9}) \leq \text{weight fraction of } (a3) \times 6; \quad \text{Formula (2)}$$

and
(v) a number of long-chain branches per 1000 carbon atoms ($LCB_{1000C}$) and a natural logarithmic number of the weight-average molecular weight (Mw) represented by $[Ln(Mw)]$, obtained by using 3D-GPC, satisfy the following Formula (3), $$LCB_{1000C} \leq 1 - 0.07 \times Ln(Mw).$$

2. The resin composition according to claim 1, wherein the ethylene/α-olefin/non-conjugated polyene copolymer (A) has an intrinsic viscosity [η] of 1.0 to 4.0 dl/g which is measured in decalin at 135° C.

3. The resin composition according to claim 1, wherein the non-conjugated polyene (a3) comprises 5-vinyl-2-norbornene (VNB).

4. The resin composition according to claim 1, comprising
(C) 10 to 300 parts by mass of carbon black, and
(D) 0.5 to 5 parts by mass of antioxidant,
with respect to 100 parts by mass of the ethylene/α-olefin/non-conjugated polyene copolymer (A).

5. The resin composition according to claim 1, comprising
(E) a softening agent in an amount of less than 20 parts by mass,
with respect to 100 parts by mass of the ethylene/α-olefin/non-conjugated polyene copolymer (A).

6. The resin composition according to claim 1, comprising
(F) a crosslinking aid in an amount of 0 to 4 parts by mass,
with respect to 100 parts by mass of the ethylene/α-olefin/non-conjugated polyene copolymer (A).

7. A crosslinked shaped article obtained by crosslinking the resin composition according to claim 1.

8. A process for producing a crosslinked shaped article comprising a step of crosslinking the resin composition according to claim 1.

9. A hose comprising a layer formed by crosslinking the resin composition according to claim 1.

10. An automobile, a motorbike, industrial machinery, construction machinery, or agricultural machinery comprising the hose according to claim 9.

11. A turbocharger hose for an automobile comprising the hose according to claim 9.

12. A process for producing a hose, comprising a step of shaping and crosslinking the resin composition according to claim 1 to form a layer of a crosslinked shaped article.

13. The resin composition according to claim 1, comprising
(G) 10 to 250 parts by mass of a white filler, except for silica,
with respect to 100 parts by mass of the ethylene/α-olefin/non-conjugated polyene copolymer (A).

14. The resin composition according to claim 13, comprising
(E) 0 to 40 parts by mass of a softening agent,
with respect to 100 parts by mass of the ethylene/α-olefin/non-conjugated polyene copolymer (A).

15. The resin composition according to claim 13, comprising
(D) 0 to 5 parts by mass of an antioxidant, and
(F) 0 to 4 parts by mass of a crosslinking aid,
with respect to 100 parts by mass of the ethylene/α-olefin/non-conjugated polyene copolymer (A).

16. A crosslinked shaped article obtained by crosslinking the resin composition according to claim 13.

17. A process for producing a crosslinked shaped article, comprising a step of crosslinking the resin composition according to claim 13.

18. A sealing material comprising the crosslinked shaped article according to claim 16.

19. An automobile, a motorbike, industrial machinery, construction machinery, or agricultural machinery comprising the sealing material according to claim 18.

20. A lamp seal packing or a packing for a meter comprising the sealing material according to claim 18.

21. The resin composition according to claim 1, comprising:
(C) 10 to 300 parts by mass of carbon black;
(E) 5 to 50 parts by mass of a softening agent; and
(F) 0.1 to 4 parts by mass of a crosslinking aid,
with respect to 100 parts by mass of the ethylene/α-olefin/non-conjugated polyene copolymer (A).

22. The resin composition according to claim 21, comprising:
(D) 0 to 5 parts by mass of an antioxidant,
with respect to 100 parts by mass of the ethylene/α-olefin/non-conjugated polyene copolymer (A).

23. A crosslinked shaped article obtained by crosslinking the resin composition according to claim 21.

24. A process for producing a crosslinked shaped article, comprising a step of crosslinking the resin composition according to claim 21.

25. A sliding member comprising the crosslinked shaped article according to claim 23.

26. An automobile, a motorbike, industrial machinery, construction machinery, or agricultural machinery comprising the sliding member according to claim 25.

27. A wiper blade comprising the crosslinked shaped article according to claim 23.

28. The resin composition according to claim 1, which comprises
(H) 0.1 to 10 parts by mass of magnesium oxide, with respect to 100 parts by mass of the ethylene/α-olefin/non-conjugated polyene copolymer (A),
wherein the resin composition is substantially free from zinc oxide (I).

29. The resin composition according to claim 28, comprising an antioxidant (D) in an amount of 5 parts by mass or less, with respect to 100 parts by mass of the ethylene/α-olefin/nonconjugated polyene copolymer (A).

30. The resin composition according to claim 28, comprising a softening agent (E) in an amount of 80 parts by mass or less with respect to 100 parts by mass of the ethylene/α-olefin/non-conjugated polyene copolymer (A).

31. The resin composition according to claim 28, comprising a crosslinking aid (F) in an amount of 4 parts by mass or less with respect to 100 parts by mass of the ethylene/α-olefin/non-conjugated polyene copolymer (A).

32. A crosslinked shaped article obtained by crosslinking the resin composition according to claim 28.

33. A process for producing a crosslinked shaped article, comprising a step of crosslinking the resin composition according to claim 28.

34. A rubber hose comprising a layer formed by crosslinking the resin composition according to claim 28 by using a resin mandrel.

35. The rubber hose according to claim 34, wherein the resin constituting the resin mandrel is a 4-methyl-1-pentene polymer.

36. A process for producing a rubber hose comprising a step of crosslinking and shaping the resin composition according to claim 28 by using a resin mandrel.

37. The process for producing a rubber hose according to claim 36, wherein a resin constituting the resin mandrel is a 4-methyl-1-pentene polymer.

38. An automobile, a motorbike, industrial machinery, construction machinery, or agricultural machinery comprising the crosslinked shaped article according to claim 32.

39. A water hose for an automobile comprising the crosslinked shaped article according to claim 32.

40. An automobile, a motorbike, industrial machinery, construction machinery, or agricultural machinery comprising the rubber hose according to claim 34.

41. A water hose for an automobile comprising the rubber hose according to claim 34.

* * * * *

UNITED STATES PATENT AND TRADEMARK OFFICE
CERTIFICATE OF CORRECTION

Page 1 of 1

PATENT NO. : 10,975,223 B2
APPLICATION NO. : 15/558987
DATED : April 13, 2021
INVENTOR(S) : Kotaro Ichino et al.

It is certified that error appears in the above-identified patent and that said Letters Patent is hereby corrected as shown below:

In the Claims

Claim 1, Column 25, Line 20:
Please delete:
"$\eta\%_{(\omega=100)}$(Pa·sec) at a frequency of $\omega = 100$ rad/s,"

Please replace with:
$\eta^*_{(\omega=100)}$ (Pa·sec) at a frequency of $\omega = 100$ rad/s, Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*